(12) United States Patent
Itoh

(10) Patent No.: US 6,493,142 B1
(45) Date of Patent: Dec. 10, 2002

(54) ZOOM LENS AND PHOTOGRAPHING APPARATUS HAVING IT

(75) Inventor: Yoshinori Itoh, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/627,445

(22) Filed: Jul. 27, 2000

(30) Foreign Application Priority Data

Jul. 30, 1999 (JP) ............................................. 11-217264
Oct. 20, 1999 (JP) ............................................. 11-298128

(51) Int. Cl.[7] ........................ G02B 27/64; G02B 23/00; G02B 15/14

(52) U.S. Cl. ...................... 359/557; 359/407; 359/554; 359/692

(58) Field of Search .................... 359/554–557, 359/676–677, 683–692; 396/52–55; 348/208

(56) References Cited

U.S. PATENT DOCUMENTS

| | | | | |
|---|---|---|---|---|
| 4,836,660 A | * | 6/1989 | Ito ............................... | 359/692 |
| 4,848,883 A | * | 7/1989 | Maruyama ................... | 359/684 |
| 5,000,549 A | | 3/1991 | Yamazaki .................... | 359/557 |
| 5,040,881 A | * | 8/1991 | Tsuji ........................... | 359/557 |
| 5,168,403 A | | 12/1992 | Umeda et al. ............... | 359/692 |
| 5,270,857 A | | 12/1993 | Oizumi et al. ............... | 359/554 |
| 5,442,486 A | * | 8/1995 | Sato ............................ | 359/557 |
| 5,530,589 A | * | 6/1996 | Sato ............................ | 359/557 |
| 5,638,210 A | | 6/1997 | Sato et al. ................... | 359/557 |
| 5,646,779 A | * | 7/1997 | Sato ............................ | 359/557 |
| 5,654,826 A | * | 8/1997 | Suzuki ........................ | 359/557 |
| 5,760,967 A | * | 6/1998 | Terasawa et al. ........... | 359/688 |

FOREIGN PATENT DOCUMENTS

| | | |
|---|---|---|
| JP | 1-189621 | 7/1989 |
| JP | 2-93620 | 4/1990 |
| JP | 3-179311 | 8/1991 |
| JP | 6-265827 | 9/1994 |
| JP | 7-318865 | 12/1995 |
| JP | 8-82769 | 3/1996 |

* cited by examiner

Primary Examiner—Thong Nguyen
(74) Attorney, Agent, or Firm—Fitzpatrick, Cella, Harper & Scinto

(57) ABSTRACT

A zoom lens includes the following lens units in the order named from the object side a first lens unit of a positive optical power, which has a first lens subunit, a second lens subunit, and a third lens subunit arranged in the order named from the object side, the second lens subunit being moved so as to have a component normal to the optical axis, thereby displacing an image, and a second lens unit of a negative optical power. The zoom lens varies a spacing between the first lens unit and the second lens unit in order to implement zooming. The following conditions are satisfied:

$-8.0 < flb/ft < -0.5$ $-9.0 < fla/ft < -0.3$ where ft is a focal length of the entire system at the telephoto extreme, flb a focal length of the second lens subunit, and fla a focal length of the first lens subunit.

26 Claims, 46 Drawing Sheets

FIG. 18A
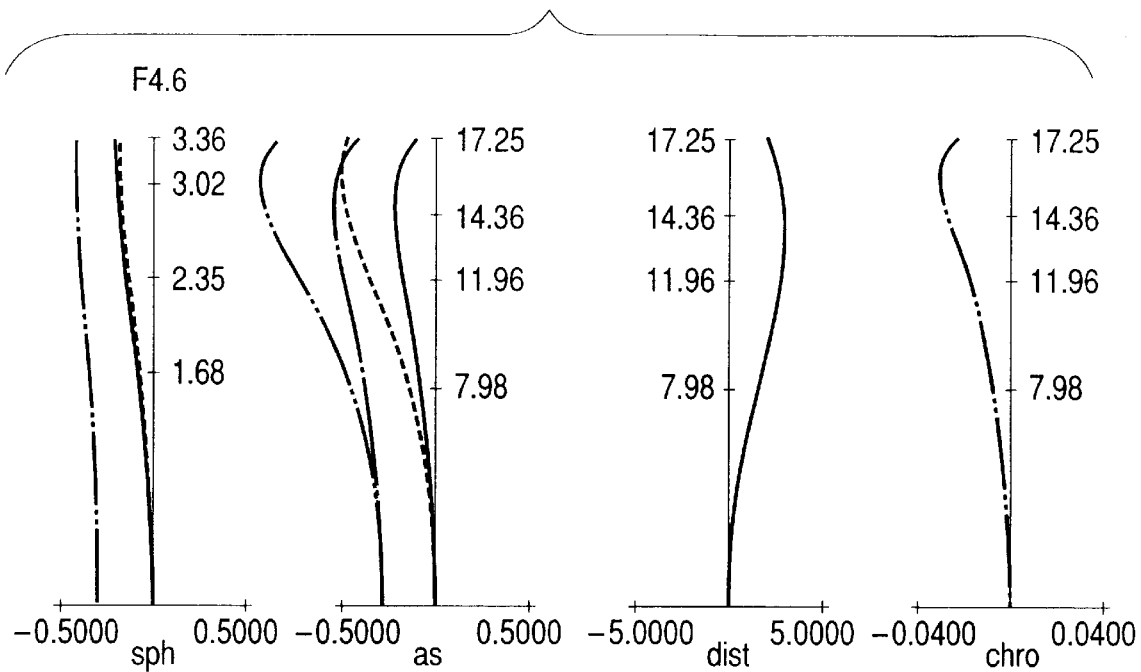
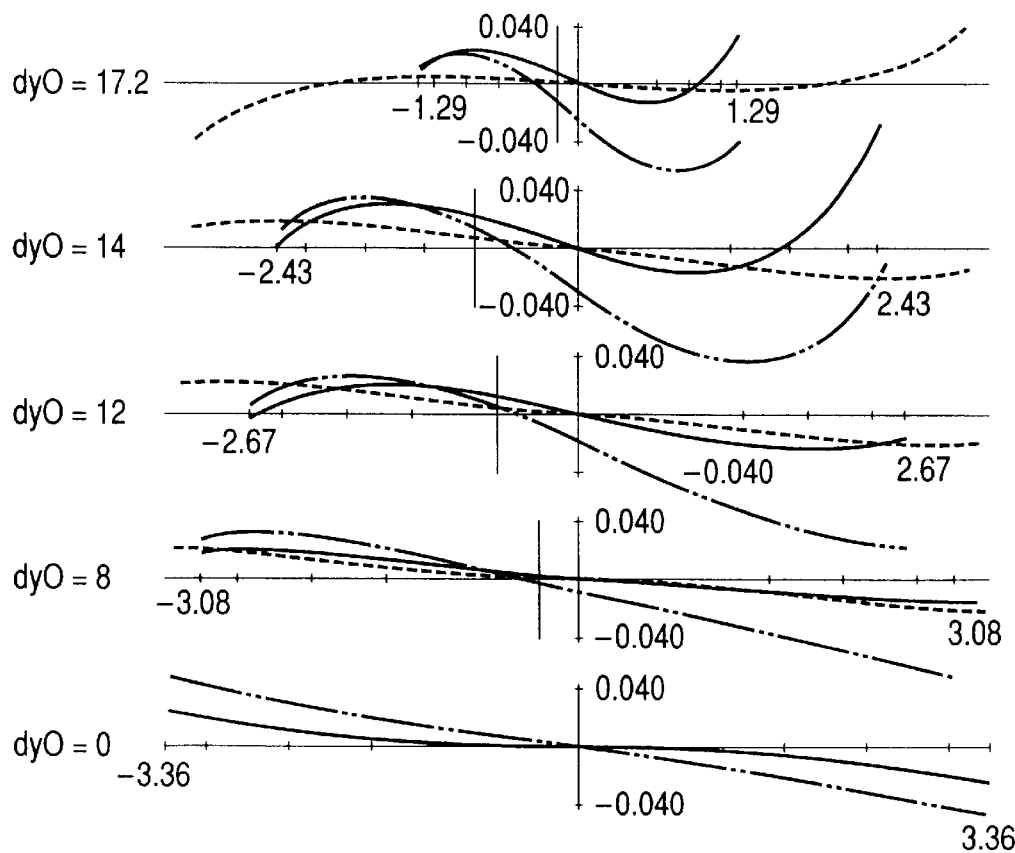

FIG. 20A
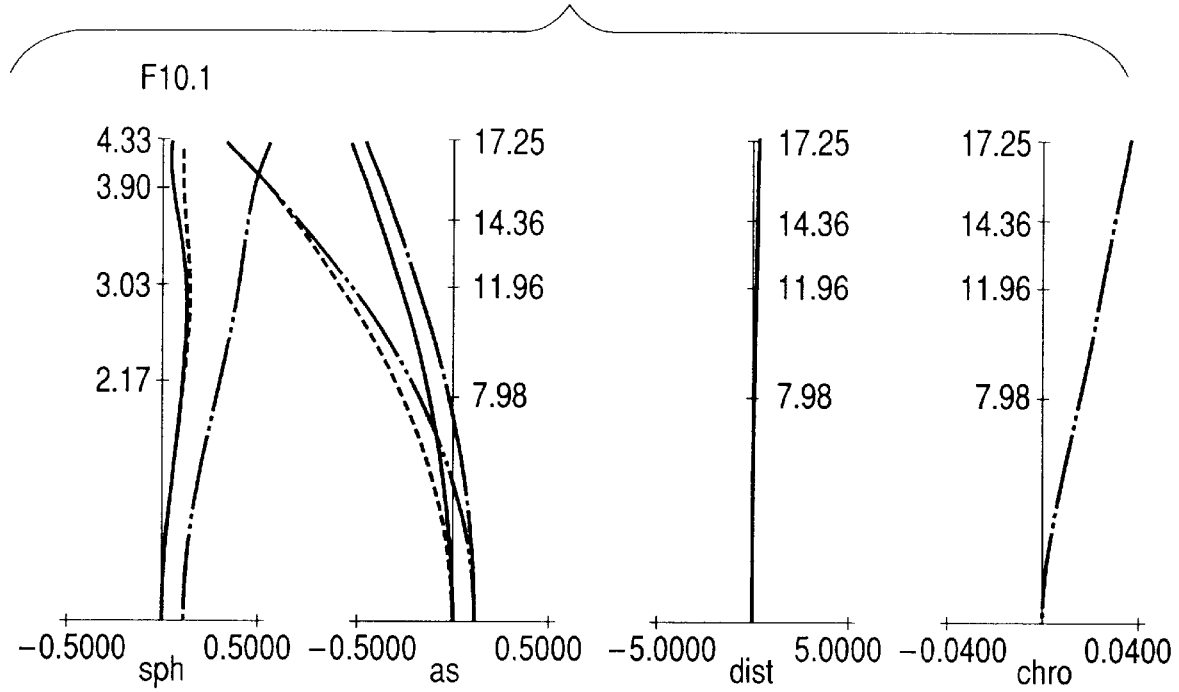
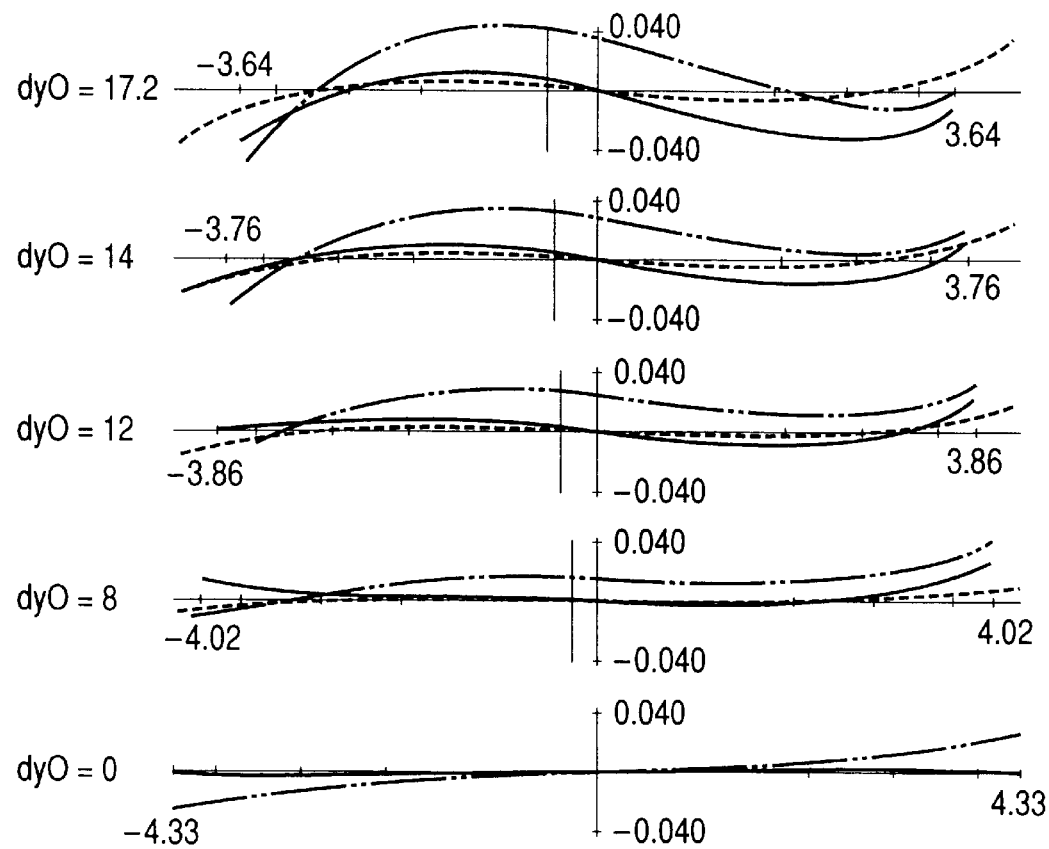

FIG. 22A
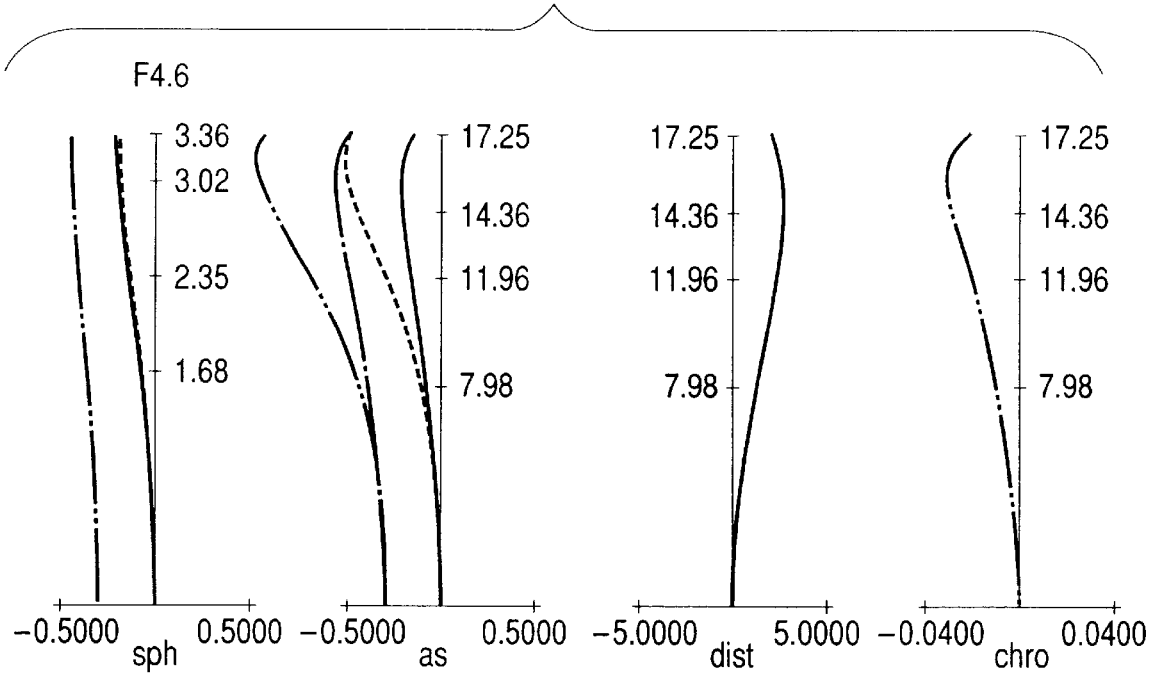
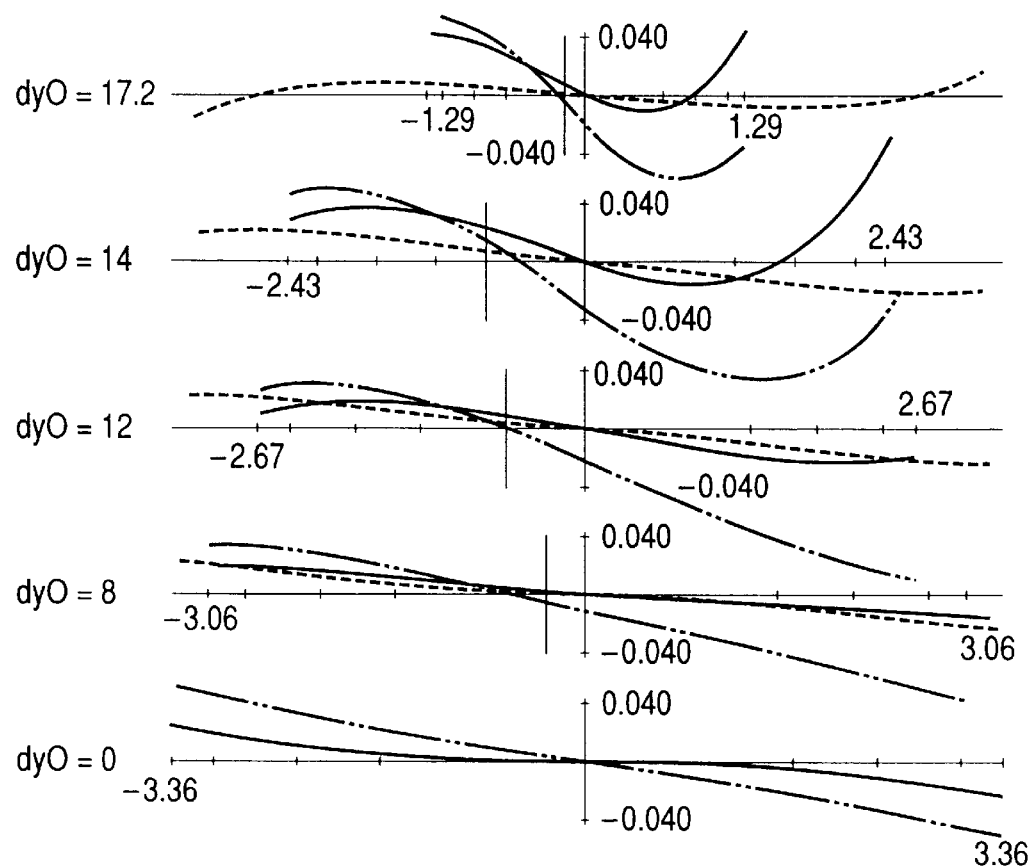

FIG. 24A
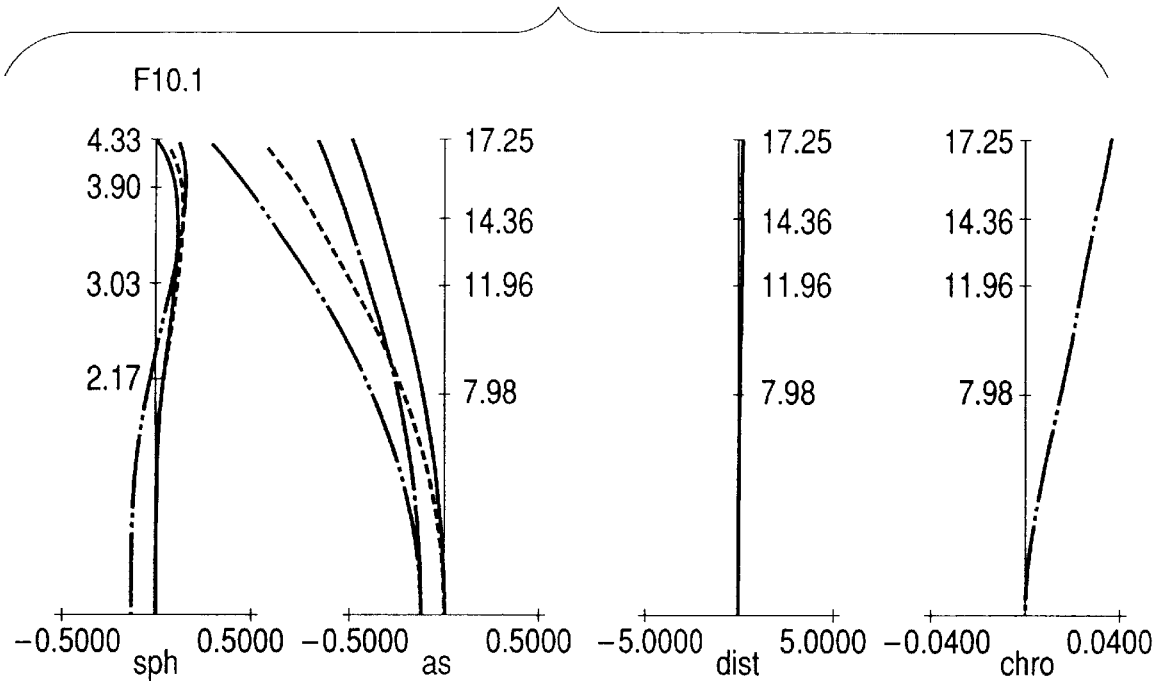
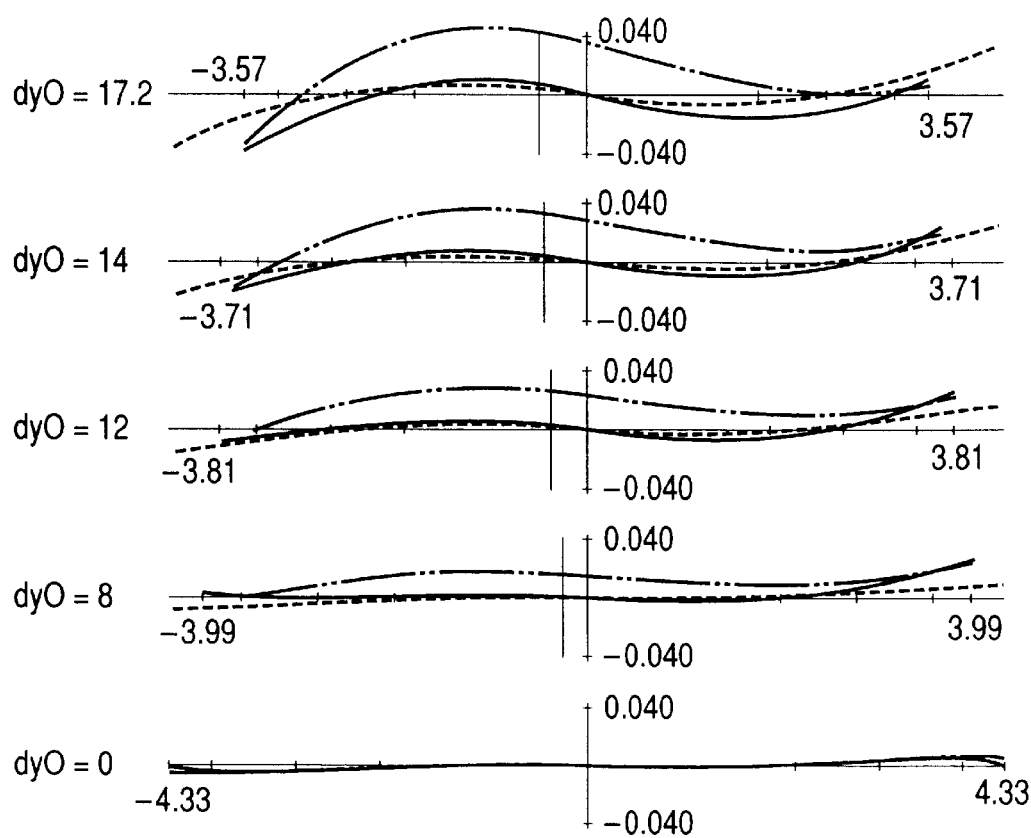

FIG. 26A
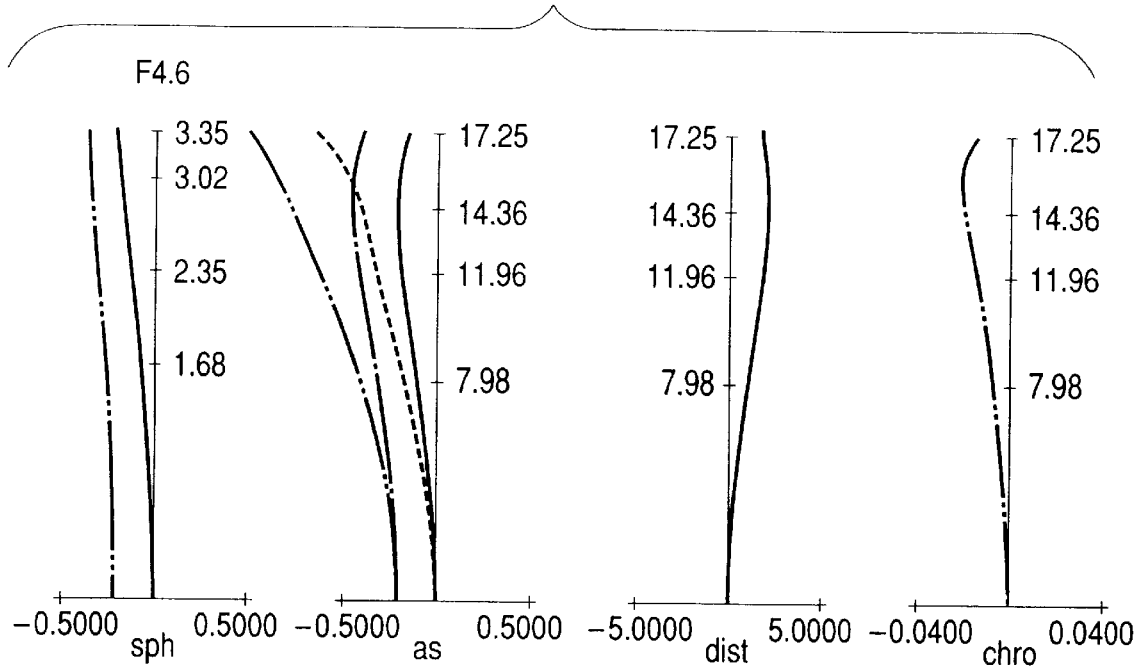
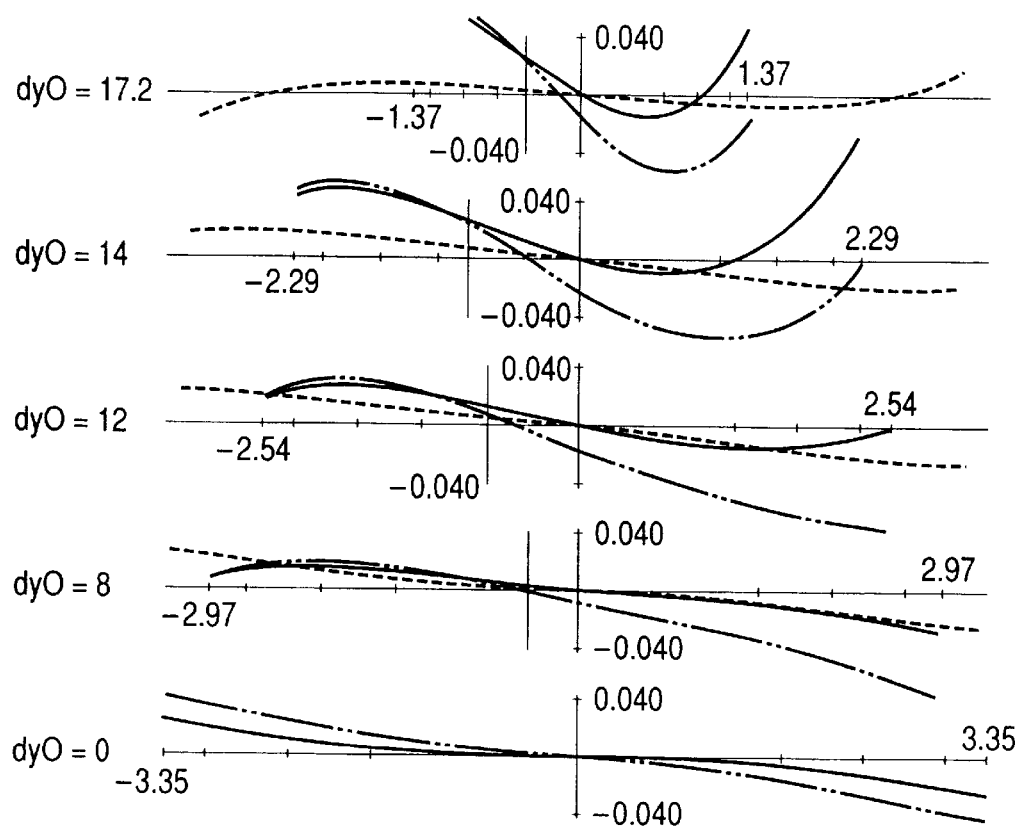

FIG. 28A
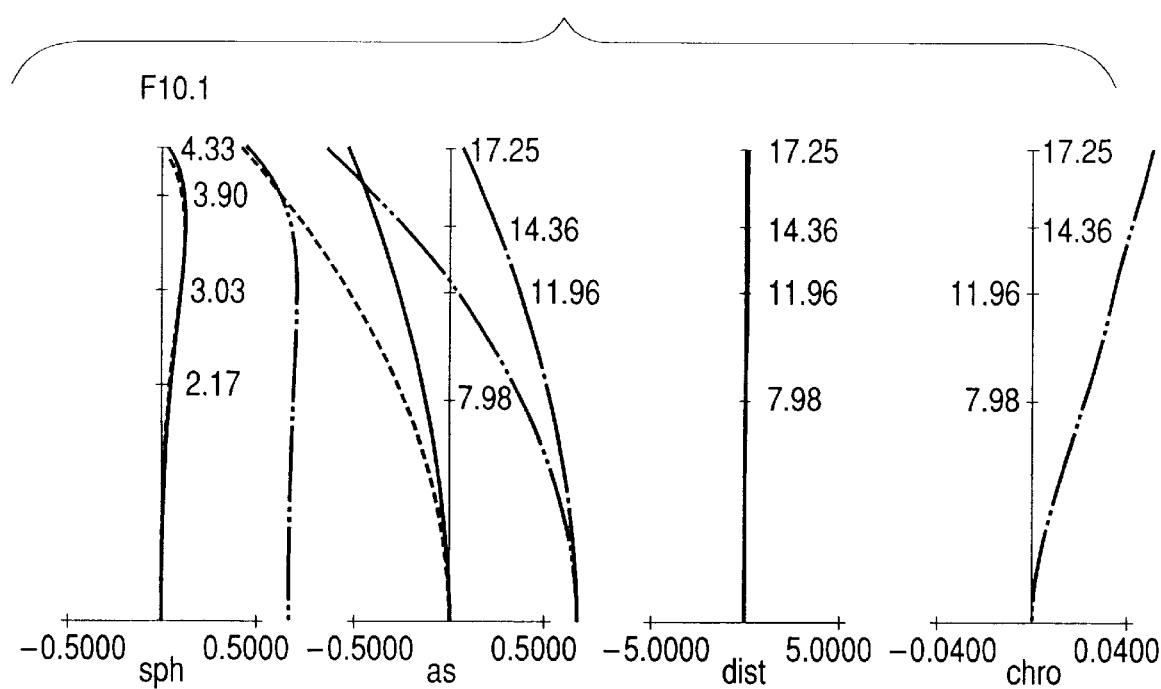
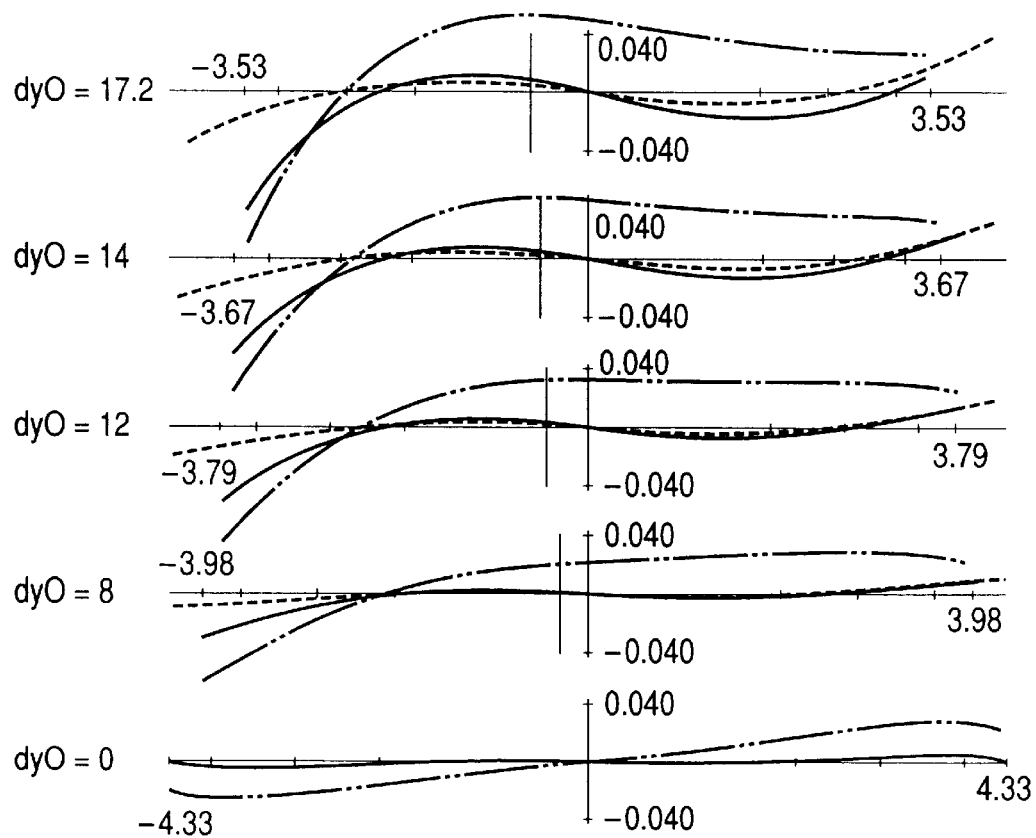

FIG. 30A
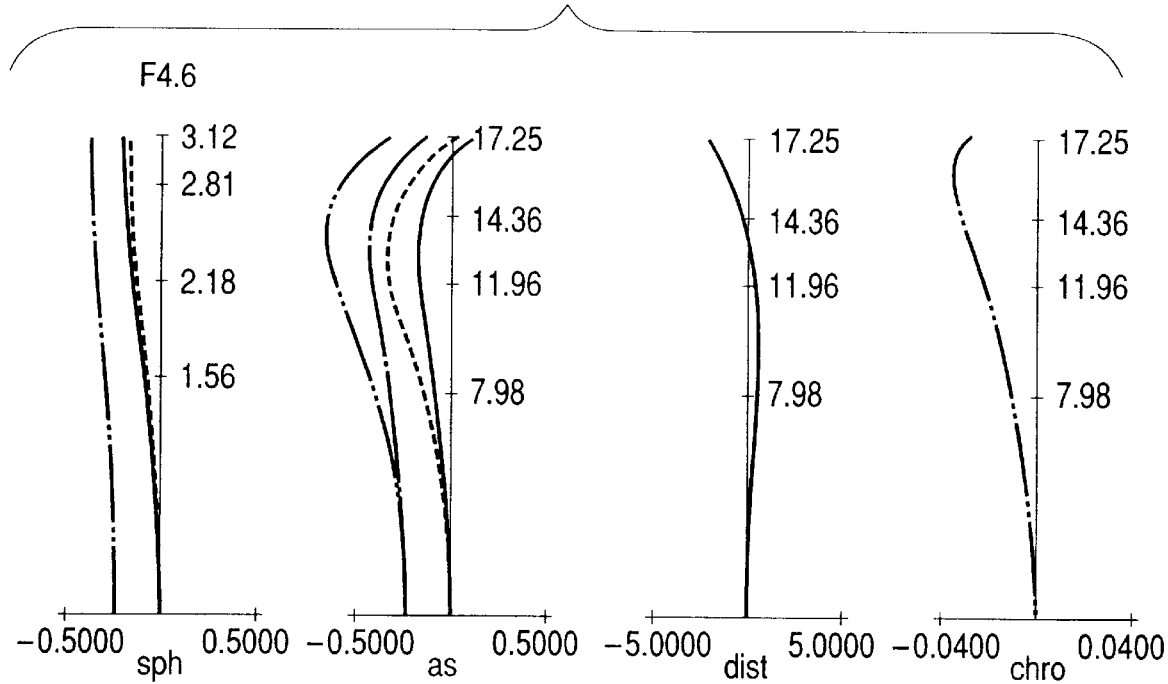
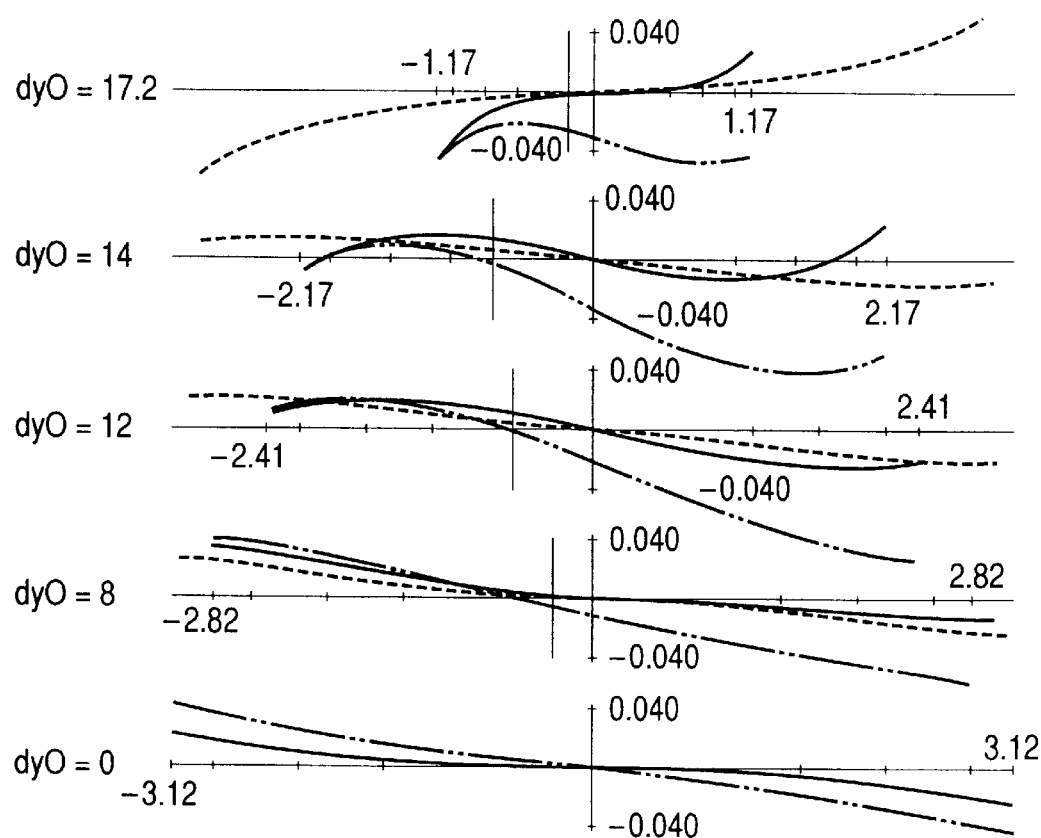

FIG. 31A
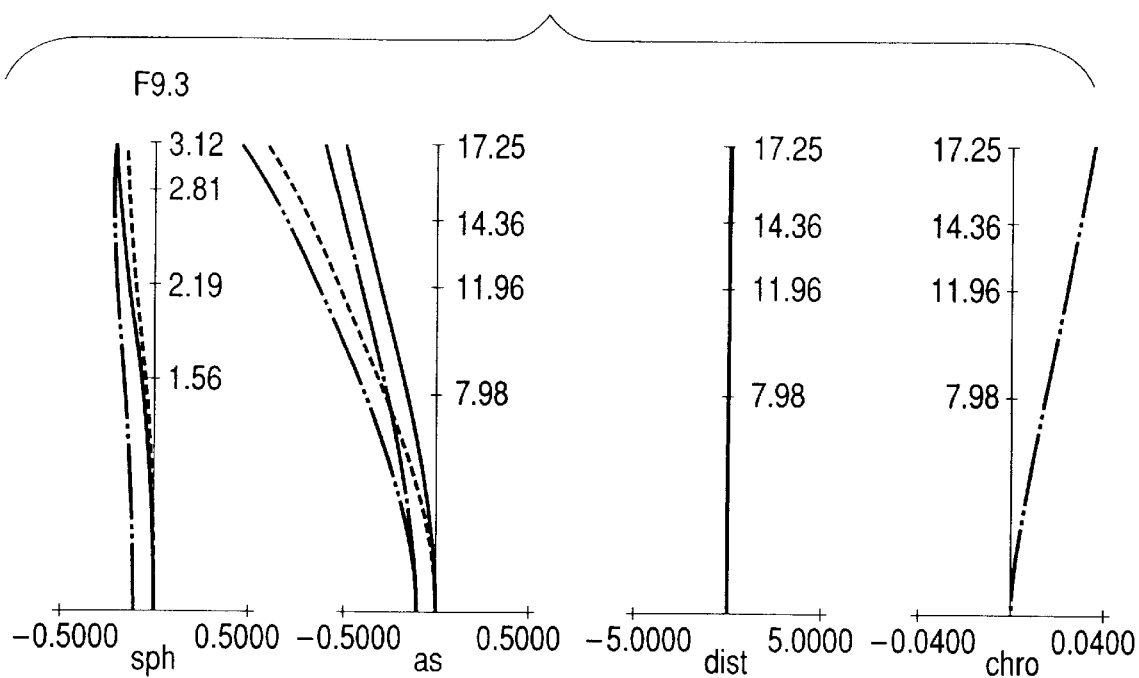
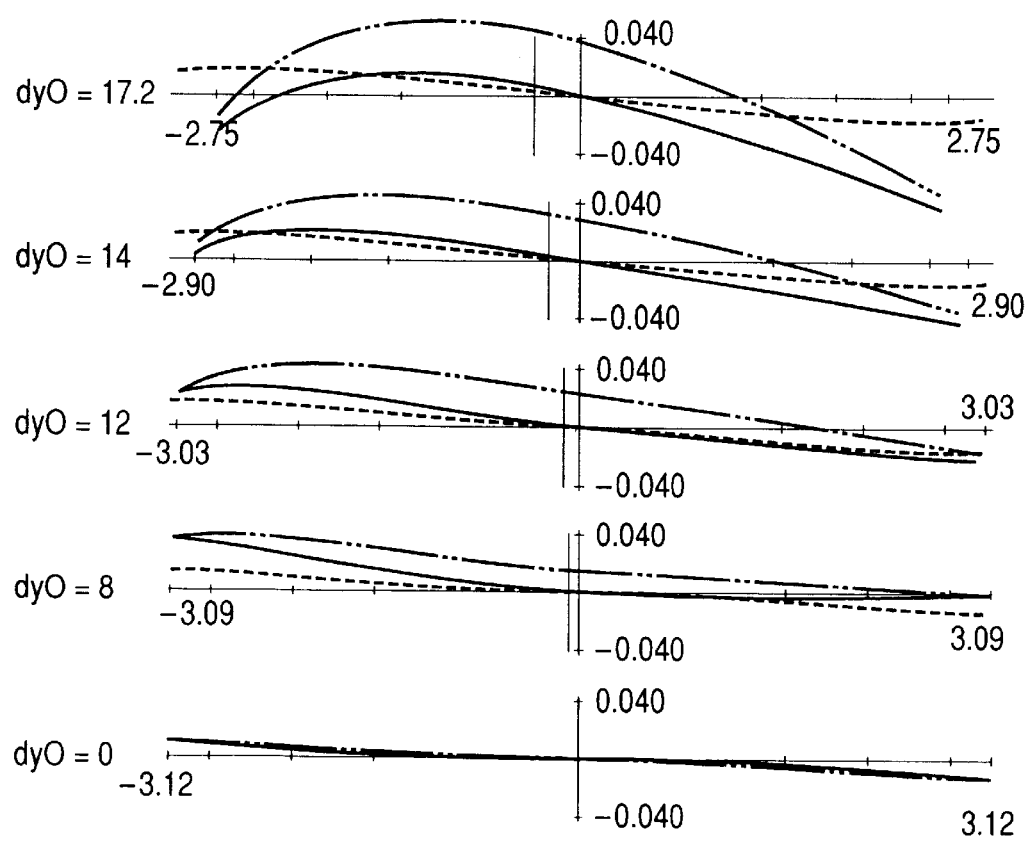

FIG. 32A
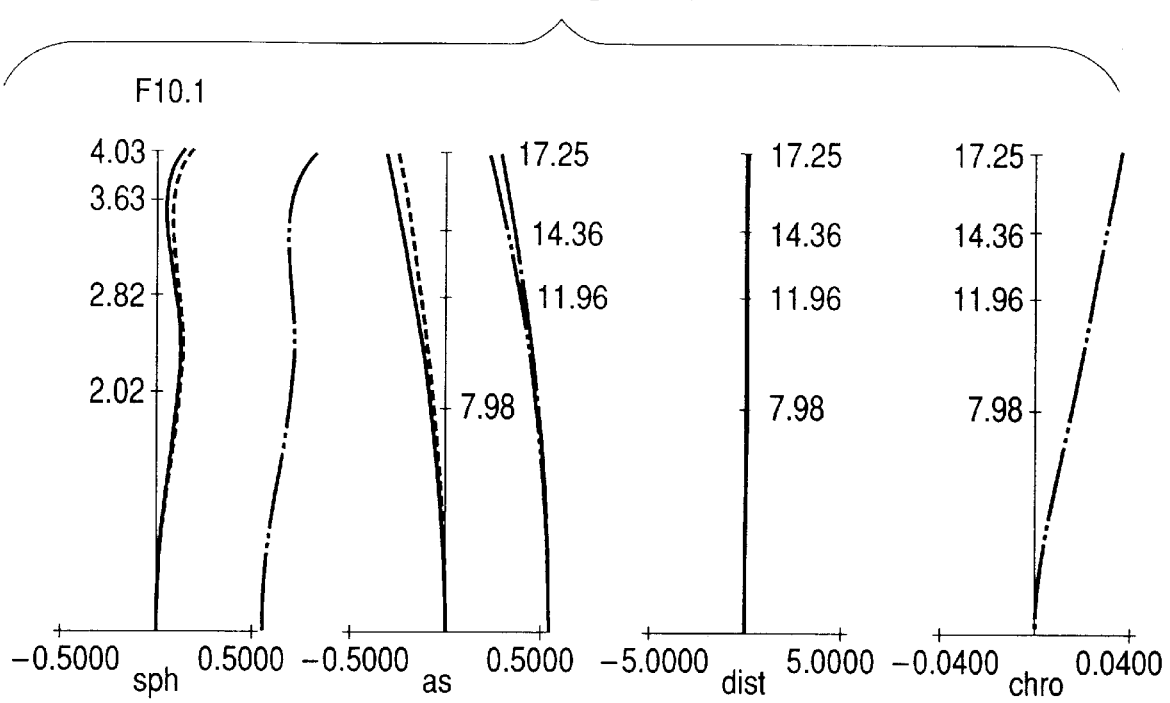
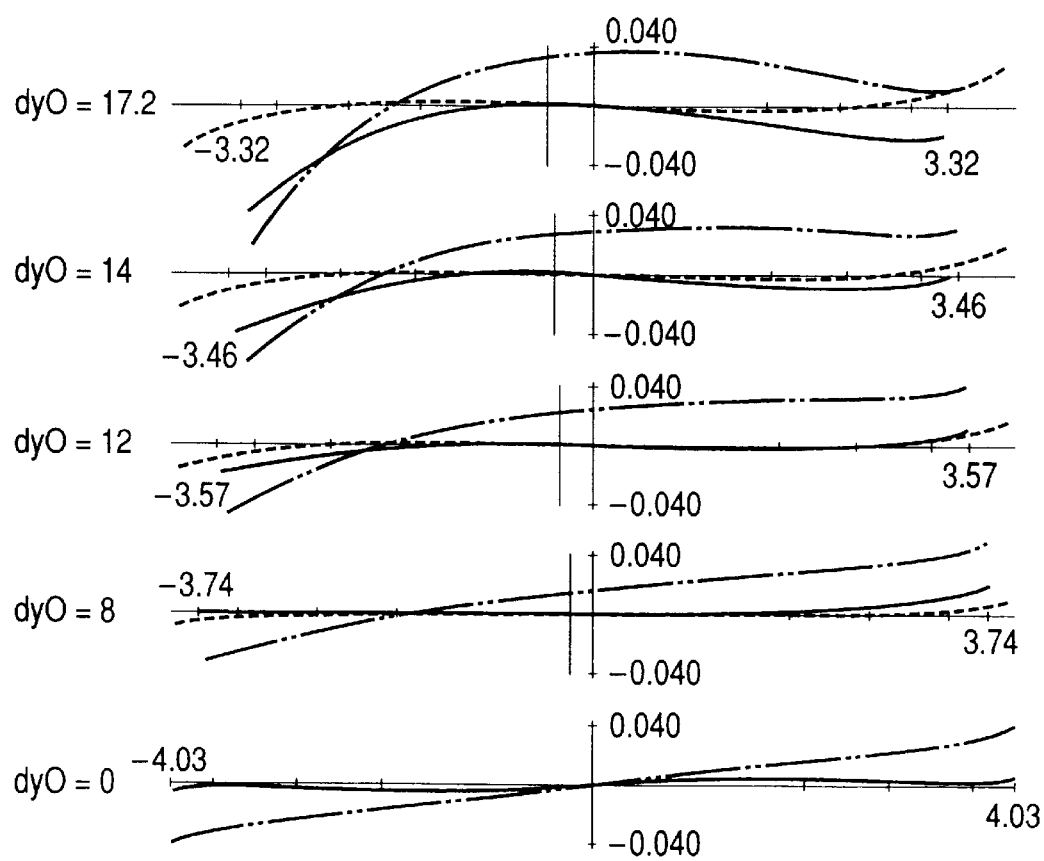

ZOOM LENS AND PHOTOGRAPHING APPARATUS HAVING IT

BACKGROUND OF THE INVENTION

1. Field of the Invention

The present invention relates, to a zoom lens with a vibration prevention (image stabilization) function suitable for silver photograph cameras, video cameras, digital cameras, electronic still cameras, and so on and, more particularly, is suitably applicable to a compact zoom lens of a high zoom ratio with relatively short back focus that realizes good correction for image vibration (image blur) during vibration (or inclination) of the zoom lens by moving a lens unit as part of the optical system or part of a lens unit so as to have a component normal to the optical axis, while achieving high optical performance.

2. Related Background Art

Various proposals have been made heretofore about optical systems in which the image blur was corrected by driving an optical element forming a photographing optical system (which will be called an optical vibration-preventing method).

In general, an important condition for such optical vibration-preventing methods is that the optical element of as small a weight as possible is driven by as small a drive amount as possible by a driving mechanism of relatively simple structure while the optical performance during prevention of vibration is maintained in a good level across as wide a range of vibration prevention angles as possible.

In the case of the zoom lenses of high zoom ratios actively developed recently, since a large amount of hand shaking is apt to occur, particularly, at the telephoto extreme, the vibration prevention function is considered to be important and a variety of proposals have been made about zoom lenses with a vibration prevention function designed to satisfy both the aforementioned condition and having a high zoom ratio.

Here the optical vibration-preventing methods include a shift vibration-preventing method of displacing (or shifting) a lens unit or part of a lens unit in the direction normal to the optical axis, a tilt vibration-preventing method of rotating a lens unit or part of a lens unit about a rotation axis normal to the optical axis, a variangle prism method of placing a member in which a relatively transparent liquid such as silicone oil or the like is interposed between transparent members, near or inside the photographing optical system and tilting the transparent member with respect to the optical axis to implement prevention of vibration by prism action, and so on, and there are various known examples of application thereof to the zoom lenses.

Particularly, the shift vibration-preventing method among such optical vibration-preventing methods is commonly adopted, because it has such advantages that the lens driving mechanism is relatively simple, that the degrees of freedom are greater in correction of chromatic aberration during prevention of vibration than in the case of the variangle vibration-preventing method, etc., and because relatively high optical performance is attained with a relatively simple structure, though the number of degrees of freedom are a little smaller in aberration correction than in the tilt vibration preventing method permitting selection of the rotation axis at a relatively free position.

The vibration-preventing zoom lenses employing the shift vibration-preventing method are suggested in Japanese Patent Applications Laid-Open No. 06-265827 (corresponding to U.S. Pat. No. 5,638,210), Laid-Open No. 07-318865, Laid-Open No. 08-82769, Laid-Open No. 01-189621 (corresponding to U.S. Pat. No. 5,270,857), Laid-Open No. 02-93620 (corresponding to U.S. Pat. No. 5,000,549), Laid-Open No. 03-179311 (corresponding to U.S. Pat. No. 5,168,403), and so on.

Japanese Patent Application Laid-Open No. 06-265827 discloses a zoom lens of such structure that the zoom lens consists of three lens units which are a first lens unit of positive refractive power, a second lens unit of positive refractive power, and a third lens unit of negative refractive power arranged in the order named from the object side, that zooming from the wide-angle extreme to the telephoto extreme is implemented so as to increase the spacing between the first lens unit and the second lens unit but decrease the spacing between the second lens unit and the third lens unit, that the second lens unit consists of a front subunit and a rear subunit, and that prevention of vibration is implemented by shifting the rear subunit in the direction normal to the optical axis.

Japanese Patent Application Laid-Open No. 07-318865 discloses a zoom lens which consists of a first lens unit of positive refractive power, a second lens unit of negative refractive power, a third lens unit of positive refractive power, a fourth lens unit of positive refractive power, and a fifth lens unit of negative refractive power arranged in the order named from the object side and which has such structure that zooming from the wide-angle extreme to the telephoto extreme is effected so as to increase the spacing between the first lens unit and the second lens unit, decrease the spacing between the second lens unit and the third lens unit, increase the spacing between the third lens unit and the fourth lens unit, and decrease the spacing between the fourth lens unit and the fifth lens unit and so as to move at least the first lens unit and the fifth lens unit to the object side and that prevention of vibration is implemented by shifting the fourth lens unit in the direction normal to the optical axis.

Japanese Patent Application Laid-Open No. 08-82769 discloses a zoom lens which consists of a first lens unit of positive refractive power, a second lens unit of positive refractive power, a stop, and a third lens unit of negative refractive power arranged in the order named from the object side and which has such structure that zooming from the wide-angle extreme to the telephoto extreme is implemented so as to increase the spacing between the first lens unit and the second lens unit but decrease the spacing between the second lens unit and the third lens unit and that prevention of vibration is implemented by shifting the second lens unit in the direction normal to the optical axis.

Japanese Patent Applications Laid-Open No. 01-189621 and Laid-Open No. 03-179311 disclose two unit zoom lenses which consist of a first unit of positive refractive power and a second unit of negative refractive power, which is designed to perform zooming by moving the two lens units while changing the spacing between the two lens units, and in which prevention of vibration is implemented by shifting the first unit in the direction normal to the optical axis.

Japanese Patent Application Laid-Open No. 02-93620 discloses the zoom lens which is a two-unit zoom lens wherein the first unit consists of two lens subunits and wherein prevention of vibration is implemented by shifting one of the two lens subunits in the direction normal to the optical axis.

In the zoom lenses disclosed in Japanese Patent Applications Laid-Open No. 06-265827 and Laid-Open No.

08-82769, since the lens unit shifted for prevention of vibration (hereinafter referred to as a vibration-preventing lens unit) is composed of the large number of lens elements, the lens weight is relatively large and the load on driving of the lens is large during prevention of vibration.

In the zoom lens disclosed in Japanese Patent Application Laid-Open No. 07-318865, the lens structure of the vibration-preventing lens unit is relatively simple, but deterioration of aberration is encountered during prevention of vibration.

The zoom lenses disclosed in Japanese Patent Applications Laid-Open No. 01-189621, Laid-Open No. 03-179311, etc. have the problem that displacement amounts of the image during prevention of vibration by shifting the first unit are large as compared with shift amounts of the vibration-preventing lens unit (i.e., sensitivity is high) and it is thus difficult to control the shift system.

In the zoom lens disclosed in Japanese Patent Application Laid-Open No. 02-93620, it is difficult to simultaneously correct aberration variations due to zooming in the normal condition and aberration variations in the shift vibration prevention in application to lenses of high zoom ratios.

The specification of Laid-Open No. 02-93620 describes that the first unit is composed of three lens subunits and the shift vibration prevention may be carried out by shifting part of the lens subunits, but it fails to suggest any specific configuration of the lens structure etc. in that case.

SUMMARY OF THE INVENTION

An object of the present invention is to provide a never-before-known zoom lens of simple lens structure well-corrected for aberration both in the normal condition and in the vibration-preventing condition, while realizing a high zoom ratio.

For accomplishing the above object, a zoom lens according to one embodiment of the present invention is a zoom lens comprising the following lens units in the order named from the object side:

a first lens unit of a positive optical power, said first lens unit having a first lens subunit, a second lens subunit, and a third lens subunit arranged in the order named from the object side, the second lens subunit being moved so as to have a component normal to the optical axis, thereby displacing an image; and a second lens unit of a negative optical power;

the zoom lens varying a spacing between the first lens unit and the second lens unit in order to implement zooming, and wherein the following conditions are satisfied:
$-8.0 < flb/ft < -0.5$
$-9.0 < fla/ft < -0.3$ where ft is a focal length of the entire system at the telephoto extreme, flb a focal length of the second lens subunit, and fla a focal length of the first lens subunit.

Another zoom lens according to another embodiment of the present invention is a zoom lens comprising the following lens units in the order named from the object side:

a first lens unit of a positive optical power, the first lens unit having a first lens subunit, a second lens subunit, and a third lens subunit of a positive optical power arranged in the order named from the object side, the second lens subunit being moved so as to have a component normal to the optical axis, thereby displacing an image; and a second lens unit of a negative optical power;

the zoom lens varying a spacing between the first lens unit and the second lens unit in order to implement zooming, and wherein the first lens subunit has more lens elements than the third lens subunit.

Another zoom lens according to another embodiment of the present invention is a zoom lens comprising the following lens units in the order named from the object side:

a first lens unit of a positive optical power, the first lens unit having a first lens subunit, a second lens subunit of a positive optical power, and a third lens subunit of a positive optical power arranged in the order named from the object side, the second lens subunit being moved so as to have a component normal to the optical axis, thereby displacing an image; and a second lens unit of a negative optical power;

the zoom lens varying a spacing between the first lens unit and said second lens unit in order to implement zooming, and wherein a lens element adjacent on the object side to the second lens subunit has a positive optical power.

Another zoom lens according to another embodiment of the present invention is a zoom lens comprising the following lens units in the order named from the object side:

a first lens unit of a positive optical power, the first lens unit having a first lens subunit, a second lens subunit of a positive optical power, and a third lens subunit of a positive optical power arranged in the order named from the object side, the second lens subunit being moved so as to have a component normal to the optical axis, thereby displacing an image; and a second lens unit of a negative optical power;

the zoom lens varying a spacing between the first lens unit and the second lens unit in order to implement zooming, and wherein the first lens subunit has a plurality of lens elements of respective positive optical powers.

Another zoom lens according to another embodiment of the present invention is a zoom lens comprising the following lens units in the order named from the object side:

a first lens unit of a positive optical power, the first lens unit having a first lens subunit, a second lens subunit of a positive optical power, and a third lens subunit of a positive optical power arranged in the order named from the object side, the second lens subunit being moved so as to have a component normal to the optical axis, thereby displacing an image; and a second lens unit of a negative optical power;

the zoom lens varying a spacing between the first lens unit and the second lens unit in order to implement zooming, and wherein the third lens subunit consists of one lens element of a positive optical power.

BRIEF DESCRIPTION OF THE DRAWINGS

FIGS. 18A and 18B are aberration diagrams at the wide-angle extreme in the normal condition (FIG. 18A) and in the vibration-preventing condition of 0.2° (FIG. 18B) of the zoom lens in Numerical Example 5;

FIGS. 20A and 20B are aberration diagrams at the telephoto extreme in the normal condition (FIG. 20A) and in the vibration-preventing condition of 0.2° (FIG. 20B) of the zoom lens in Numerical Example 5;

FIGS. 22A and 22B are aberration diagrams at the wide-angle extreme in the normal condition (FIG. 22A) and in the vibration-preventing condition of 0.2° (FIG. 22B) of the zoom lens in Numerical Example 6;

FIGS. 24A and 24B are aberration diagrams at the telephoto extreme in the normal condition (FIG. 24A) and in the vibration-preventing condition of 0.2° (FIG. 24B) of the zoom lens in Numerical Example 6;

FIGS. 26A and 26B are aberration diagrams at the wide-angle extreme in the normal condition (FIG. 26A) and in the vibration-preventing condition of 0.2° (FIG. 26B) of the zoom lens in Numerical Example 7;

FIGS. 28A and 28B are aberration diagrams at the telephoto extreme in the normal condition (FIG. 28A) and in the vibration-preventing condition of 0.2° (FIG. 28B) of the zoom lens in Numerical Example 7;

FIGS. 30A and 30B are aberration diagrams at the wide-angle extreme in the normal condition (FIG. 30A) and in the vibration-preventing condition of 0.2° (FIG. 30B) of the zoom lens in Numerical Example 8;

FIGS. 31A and 31B are aberration diagrams at the middle focal length in the normal condition (FIG. 31A) and in the vibration-preventing condition of 0.2° (FIG. 31B) of the zoom lens in Numerical Example 8;

FIGS. 32A and 32B are aberration diagrams at the telephoto extreme in the normal condition (FIG. 32A) and in the vibration-preventing condition of 0.2 (FIG. 32B) of the zoom lens in Numerical Example 8;

DETAILED DESCRIPTION OF THE PREFERRED EMBODIMENTS

Figure 33A:
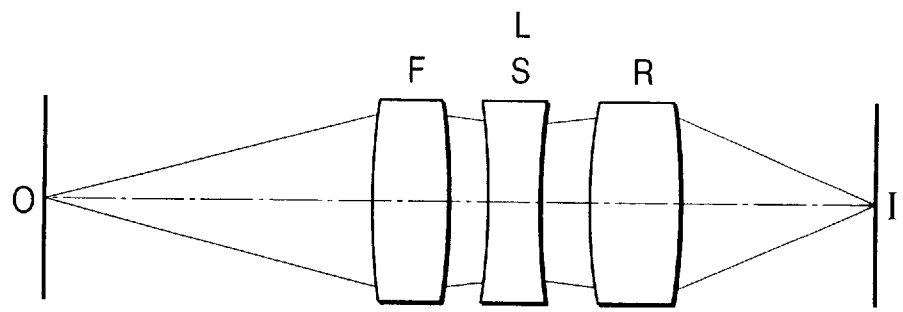
FIGS. 33A, 33B and 33C are optical principle diagrams of the hand shake correction in the zoom lenses according to the present invention.
Figure 33B:
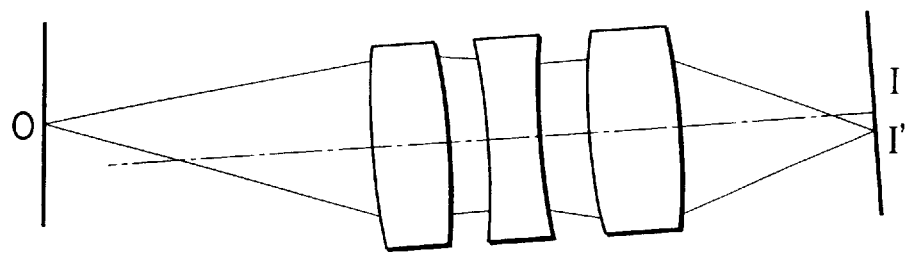
Figure 33C:
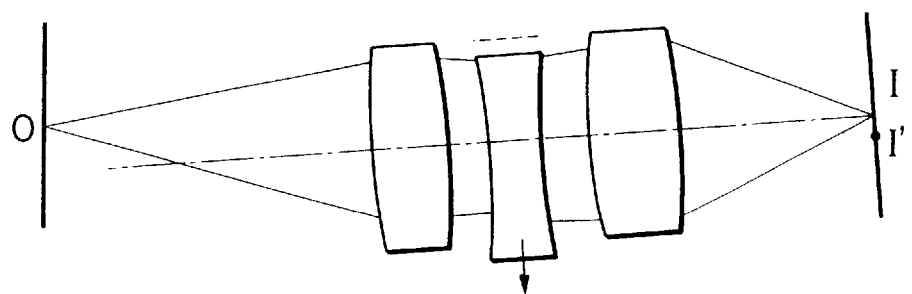

FIGS. 33A to 33C are the principle diagrams of the correction for hand shaking to illustrate how to correct image movement (image blur) of an object to be photographed, due to the hand shaking, in the shift vibration-preventing method according to the present invention.

Among FIGS. 33A to 33C, FIG. 33A shows the imaging relation in the normal condition between the object O and the image I formed by the taking lens L before occurrence of hand shaking. The image I on the image plane IP in this state is at the intended image position where the photographer intends to form the image. With occurrence of hand shaking, the image I moves to the image I', as illustrated in FIG. 33B. In FIG. 33C, correction is made by shifting the vibration preventing lens S in the direction perpendicular to the optical axis so as to bring the image I' back to the original intended image position I.

The taking lens L is illustrated in the structure consisting of a lens unit F, the vibration-preventing lens S, and a lens unit R for simplicity.

The imaging performance in the normal condition and in the vibration-preventing condition will be described below with reference to these principle diagrams. First, it can be mentioned from the principle of hand shake correction that, in FIG. 33A showing the normal condition before the occurrence of hand shaking and in FIG. 33C showing the vibration-preventing condition after correction for the hand shaking, there is little difference in paths of rays from the vibration preventing lens S through the lens unit R to the image plane IP between before and after the correction and change is seen only in paths of rays passing the vibration-preventing lens S and the lens unit F located on the object side thereof.

This means that change in the optical performance during prevention of vibration (which will be referred to hereinafter as a vibration prevention aberration component) is caused by the change in the paths of the respective rays in the vibration-preventing lens S and the lens unit F and that the lens unit R after the vibration-preventing lens S makes no contribution to the occurrence of the vibration prevention aberration component.

Therefore, describing suppression of occurrence of the vibration prevention aberration component on the level of aberration coefficients, for the aforementioned reason, it is necessary to re-define decentering aberration coefficients defined on the normal object-side base into decentering aberration coefficients on the image-side base (which will be referred to hereinafter as vibration prevention aberration coefficients) and properly set aberration coefficients as elements of the vibration prevention aberration coefficients, i.e., shares of aberration coefficients of the respective vibration-preventing lens S and the lens unit F so as to make the vibration prevention aberration coefficients null or within tolerance. Further, in the zoom lenses, it is necessary to set the aberration coefficients of the vibration-preventing lens S and the lens unit F as solutions to simultaneous equations of the zoom lens so as to satisfy desired vibration prevention aberration coefficients at each of focal lengths.

However, even if the occurrence of the vibration prevention aberration component is suppressed at each of focal lengths, the aberration coefficients of the vibration-preventing lens S and the lens unit F at the that time will not be always values for gaining good imaging performance in the normal condition.

Thus the aberration coefficients of the partial system also need to be those satisfying the aberration coefficients of the entire system in the normal condition and various simultaneous relations have to be satisfied as described above.

Next, the simultaneous relations of aberration coefficients will be described in more detail by resolving them into eigencoefficients and characteristic matrices in optical systems (Keizo Yamaji, "Studies on optical designing of zoom lenses" (Canon Research Report No. 3)).

Let $S_{ijn}$ be a vectorial representation of aberration coefficients in the n-degree domain of the ith lens unit of a partial system at the jth position out of zoom positions, $S_{Oin}$ be the eigencoefficients, and $A_{ijn}$ be the characteristic matrix. Then the following relation holds among the aberration coefficients, eigencoefficients, and characteristic matrices.

$$S_{ijn} = S_{oin} \cdot A_{ijn} (n=1,3,5, \ldots)$$

For the composite system (the entire system), the following equation holds where N is the total number of lens units.

$$S_{jn} = \sum_{i=1}^{N} S_{ijn}$$

The eigencoefficients are a set of aberration coefficients calculated under such conditions that an absolute value of refractive power is 1, the pupil is aligned with the front principal plane, the incident height of paraxial rays is 1, the inclination angle of incidence thereof is 0, the incident height of the paraxial principal rays is 0, and the inclination angle of incidence thereof is −1. The eigencoefficients are dependent on only the so-called lens shape, including the radius of curvature, the refractive index, the thickness, aerial gap, etc., whereas the characteristic matrices do not depend on the lens shape at all.

Namely, a characteristic matrix is a composite matrix of matrices indicating the focal length, object point position, stop position, ray passing condition, etc., which represents, so to speak, a use condition of a partial system having a certain shape and which depends upon only the so-called power layout.

Accordingly, where the vibration-preventing lens unit S is represented by the Kth lens unit, to implement good correction for the imaging performance in the normal condition at the same time as suppression of occurrence of the vibration prevention aberration at each of focal lengths is nothing but an operation of properly setting the eigencoefficients $S_{oin}$ (i=1, ..., K) and the characteristic matrices $A_{ijn}$ (i=1, ..., K) of the respective lens units constituting the vibration-preventing lens unit S and the lens unit F so that the aberration coefficients $S_{ijn}$ (i=1, ..., K) as operating characteristics obtained from the linear transformation thereof satisfy desired vibration prevention aberration coefficients and so that these aberration coefficients are cancelled out by the aberration coefficients, $S_{ijn}$ (i=K+1, ..., N), which are operating characteristics obtained by the linear transformation of the eigencoefficients $S_{oin}$ (i=K+1, ..., N) and the characteristic matrices $A_{ijn}$ (i=K+1, ..., N) of the respective lens units constituting the subsequent lens unit R, thereby obtaining the desired total aberration coefficients $S_{jn}$ at each of the focal lengths.

The present invention has been accomplished as a result of the research to resolve the optical system into the intrinsic coefficients and characteristic matrices and analyze them as described above and successfully provided the zoom lenses with the compact vibration preventing function in the simple lens structure with excellent aberration correction both in the normal condition and in the vibration-preventing condition while realizing the high zoom ratio of ×3.

Specific lens configurations of the present invention will be described below with reference to the drawings.

FIG. 1, FIG. 5, FIG. 9, and FIG. 13 are the lens sectional views of the zoom lenses in Numerical Examples 1 to 4, described hereinafter, which are suitably used as taking lenses of the photographing apparatus. In each of the figures, (A) shows the zoom position at the wide-angle extreme, (B) the zoom position at the middle focal length, and (C) the zoom position at the telephoto extreme. In the present embodiment each of such zoom lenses is used as a taking lens in the photographing apparatus.

Figure 1:
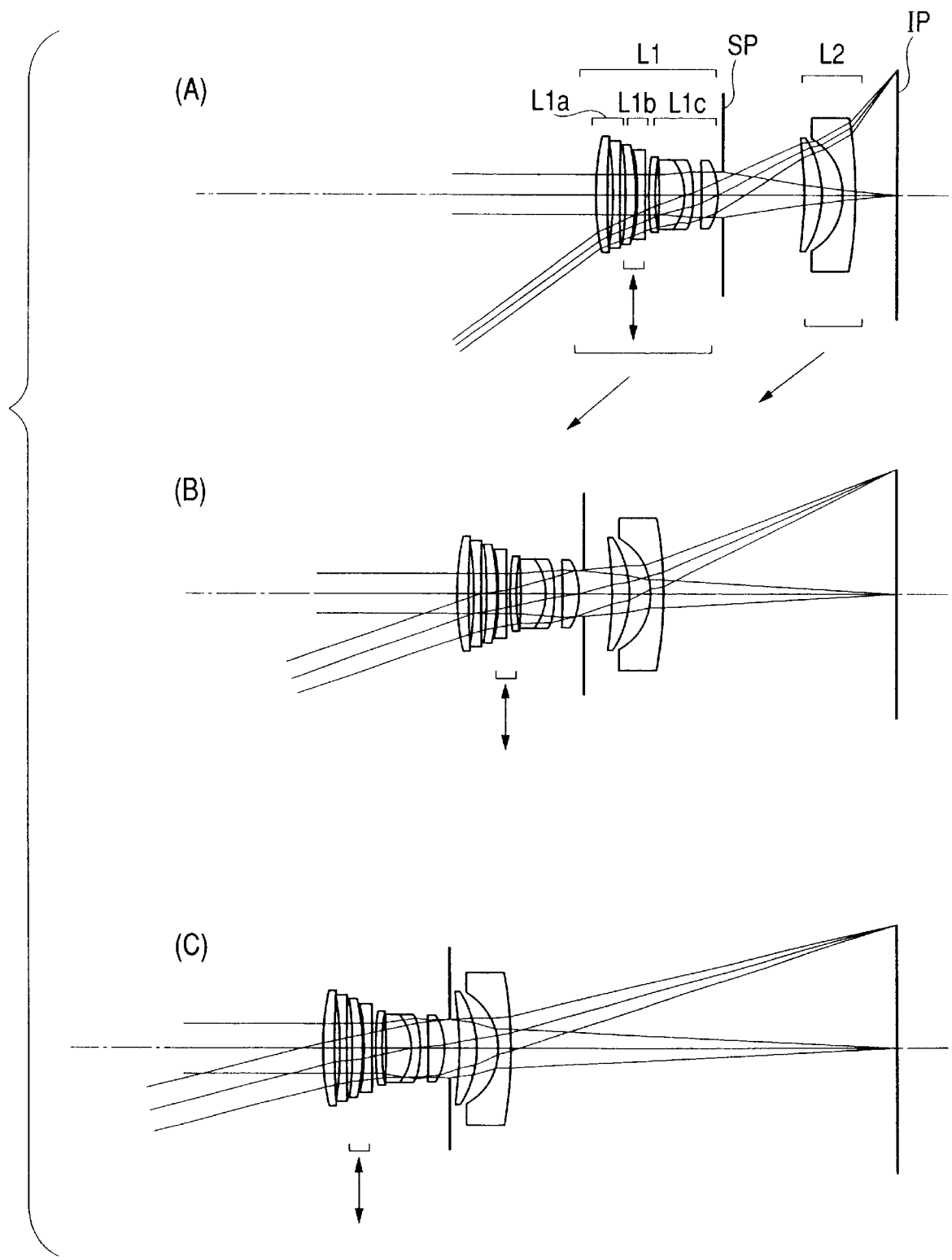
FIG. 1 is lens sectional view of the zoom lens in Numerical Example 1.
Figure 2:
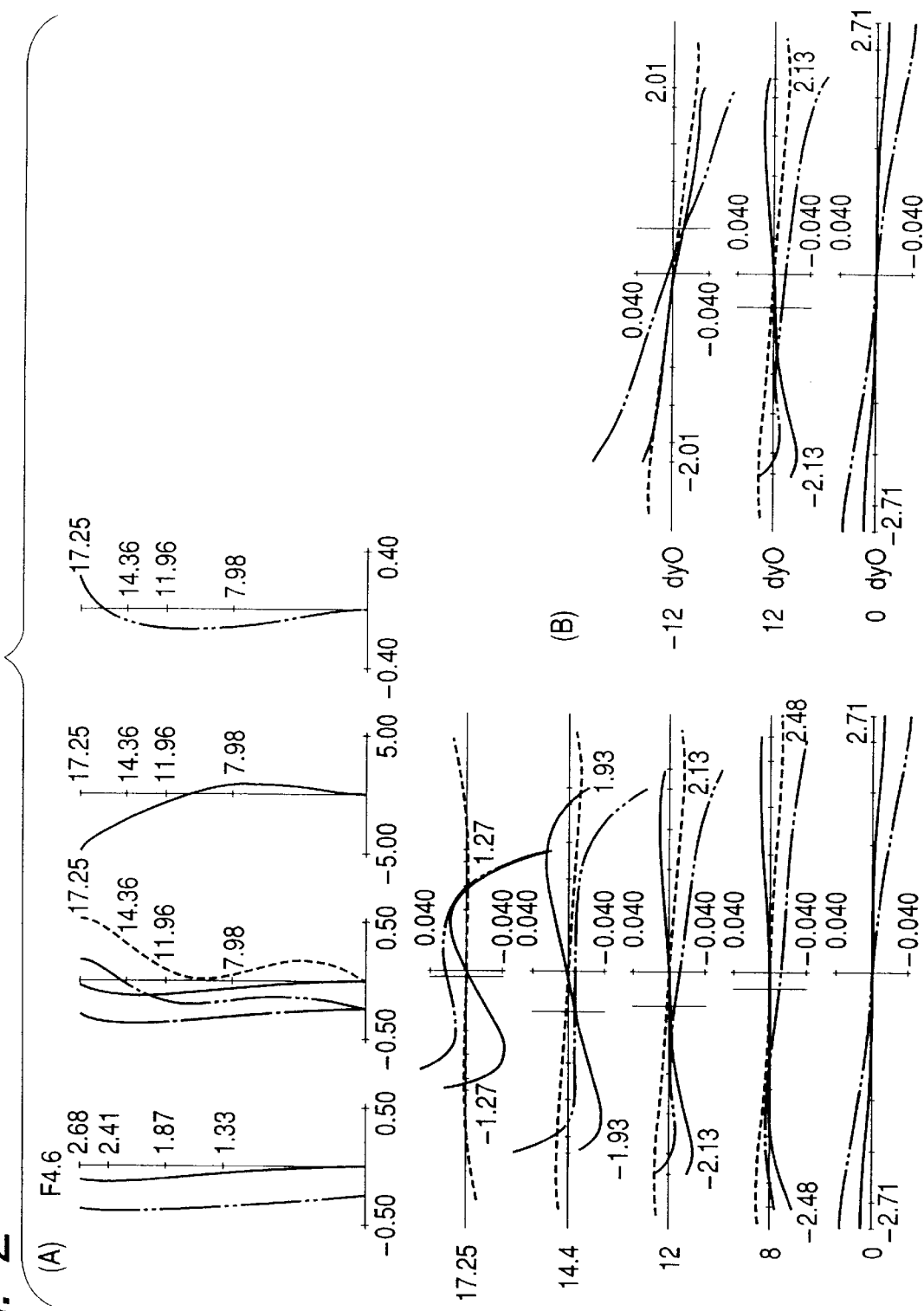
FIG. 2 shows lateral aberration diagrams at the wide angle extreme in the normal condition (A) and in the vibration-preventing condition of 0.2° (B) at the image heights of 0 mm and ±12 mm of the zoom lens in Numerical Example 1.
Figure 3:
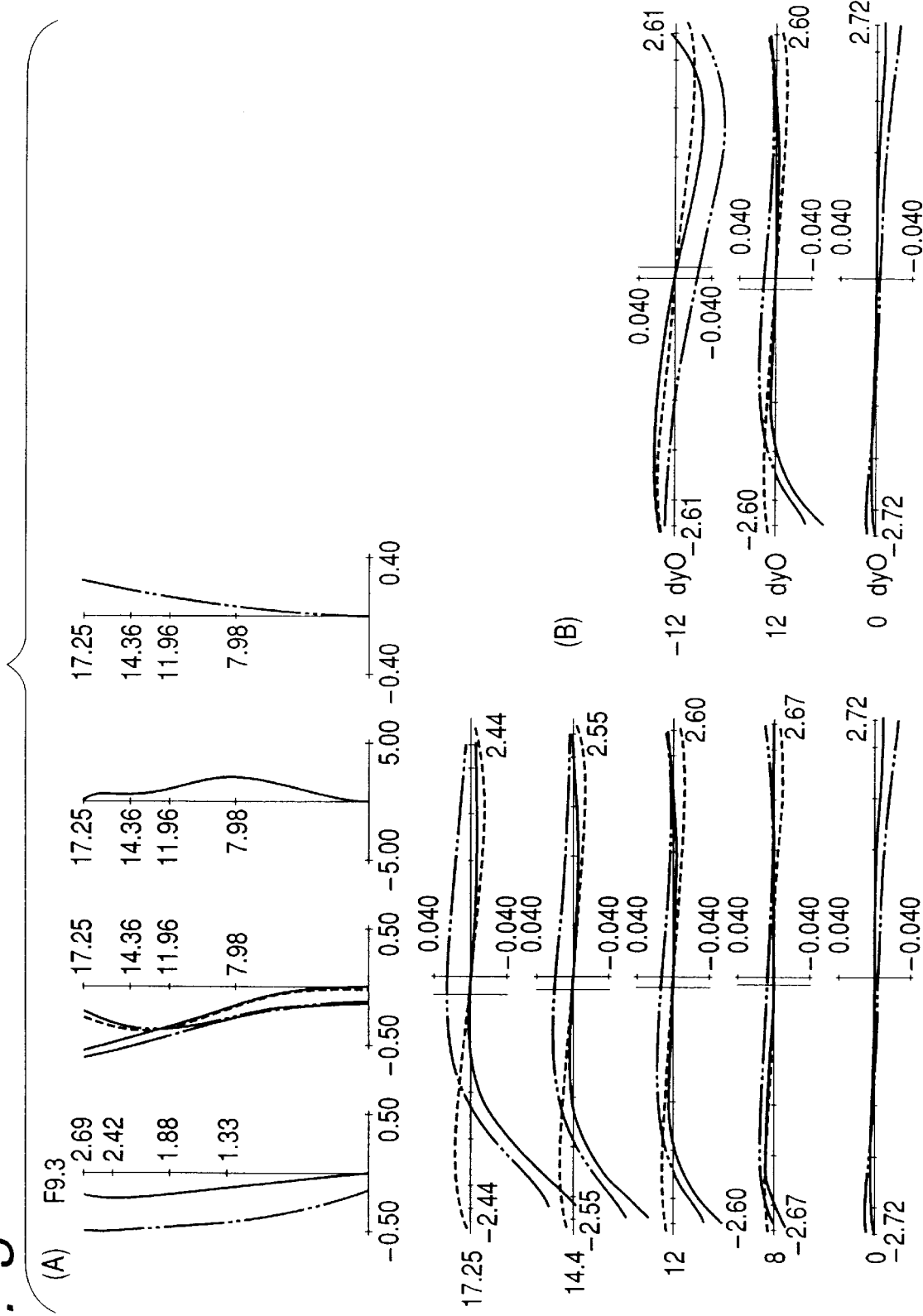
FIG. 3 shows lateral aberration diagrams at the middle focal length in the normal condition (A) and in the vibration-preventing condition of 0.2° (B) at the image heights of 0 mm and ±12 mm of the zoom lens in Numerical Example 1.
Figure 4:
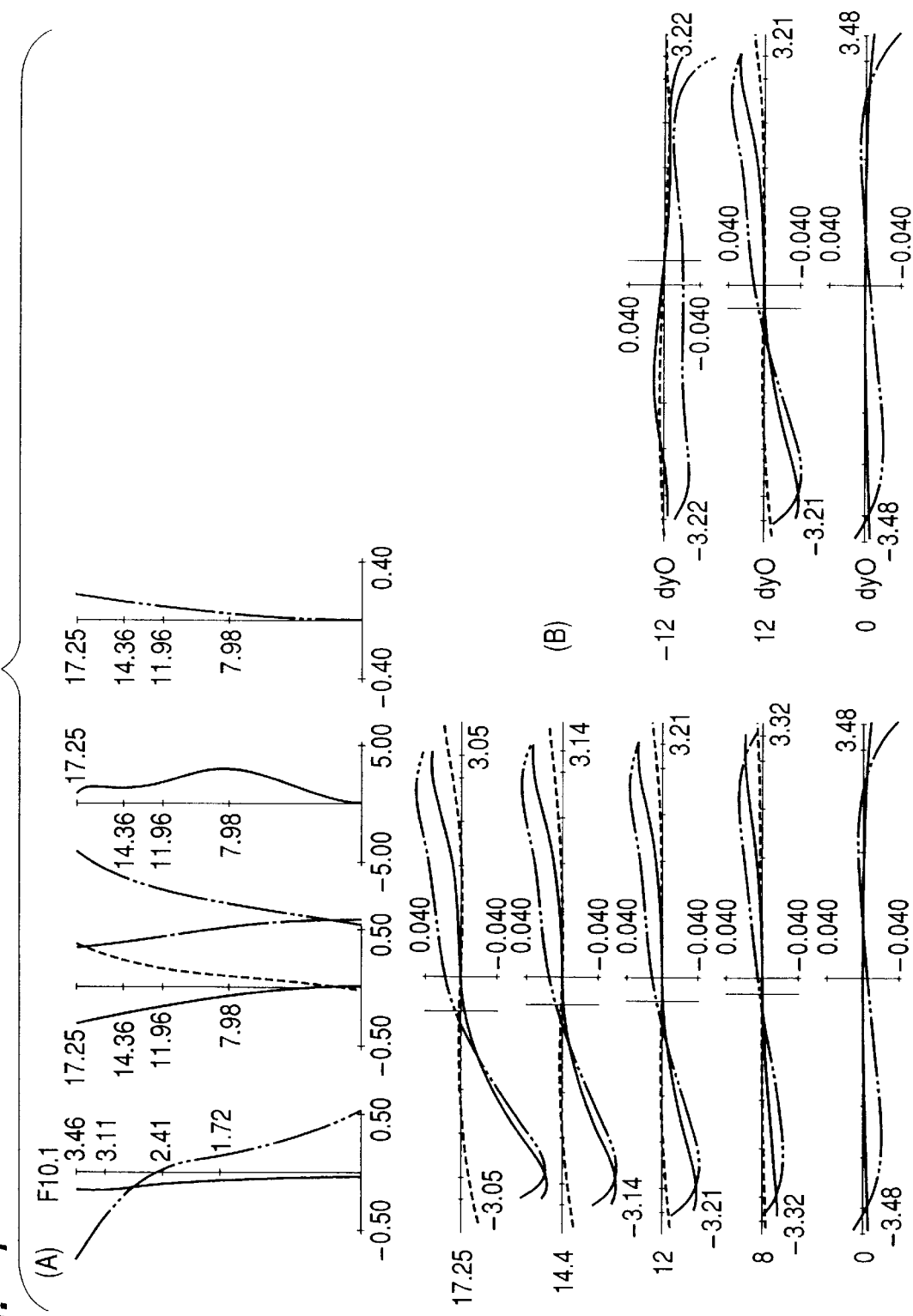
FIG. 4 shows lateral aberration diagrams at the telephoto extreme in the normal condition (A) and in the vibration-preventing condition of 0.2° (B) at the image heights of 0 mm and ±12 mm of the zoom lens in Numerical Example 1.
Figure 5:
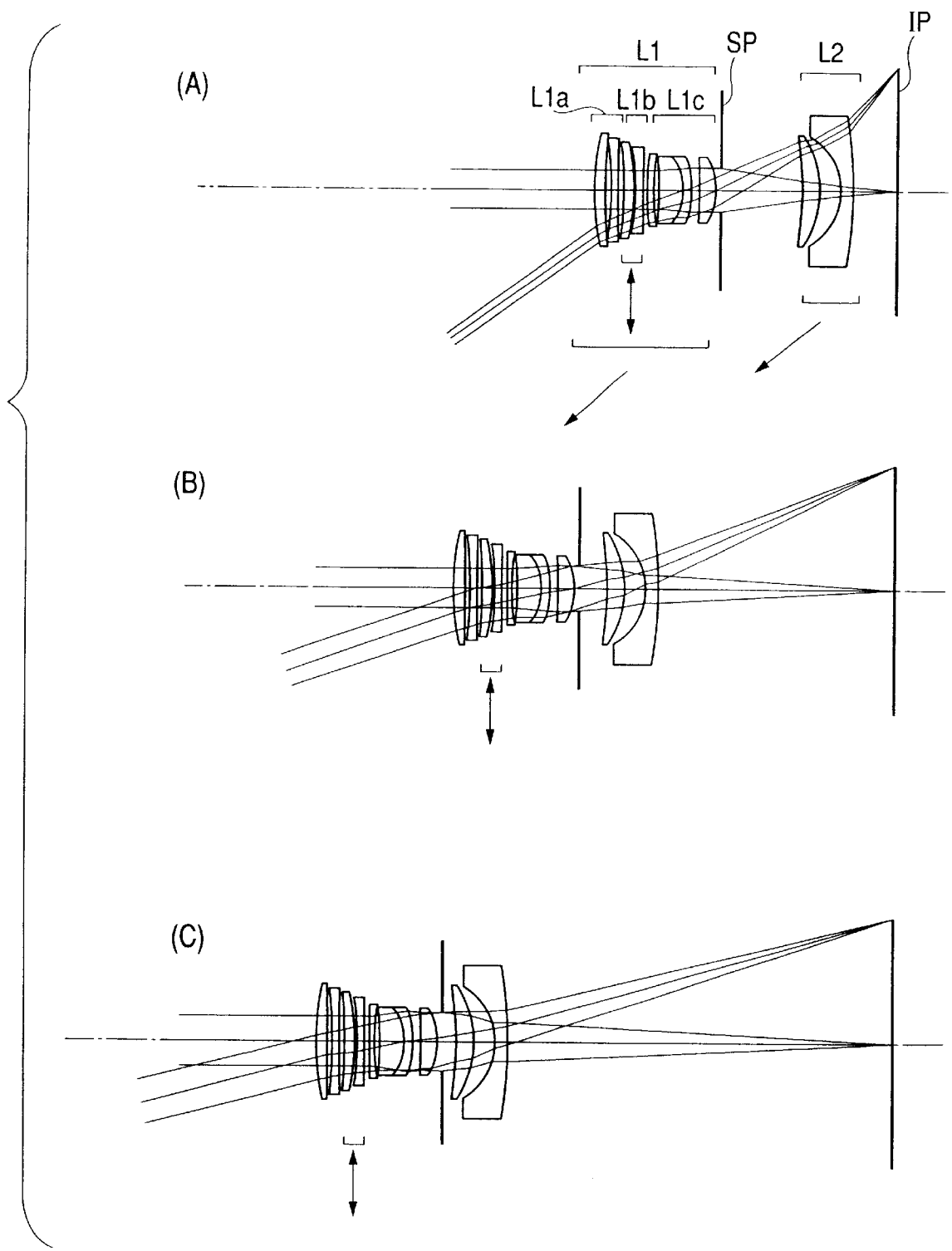
FIG. 5 is lens sectional view of the zoom lens in Numerical Example 2.
Figure 6:
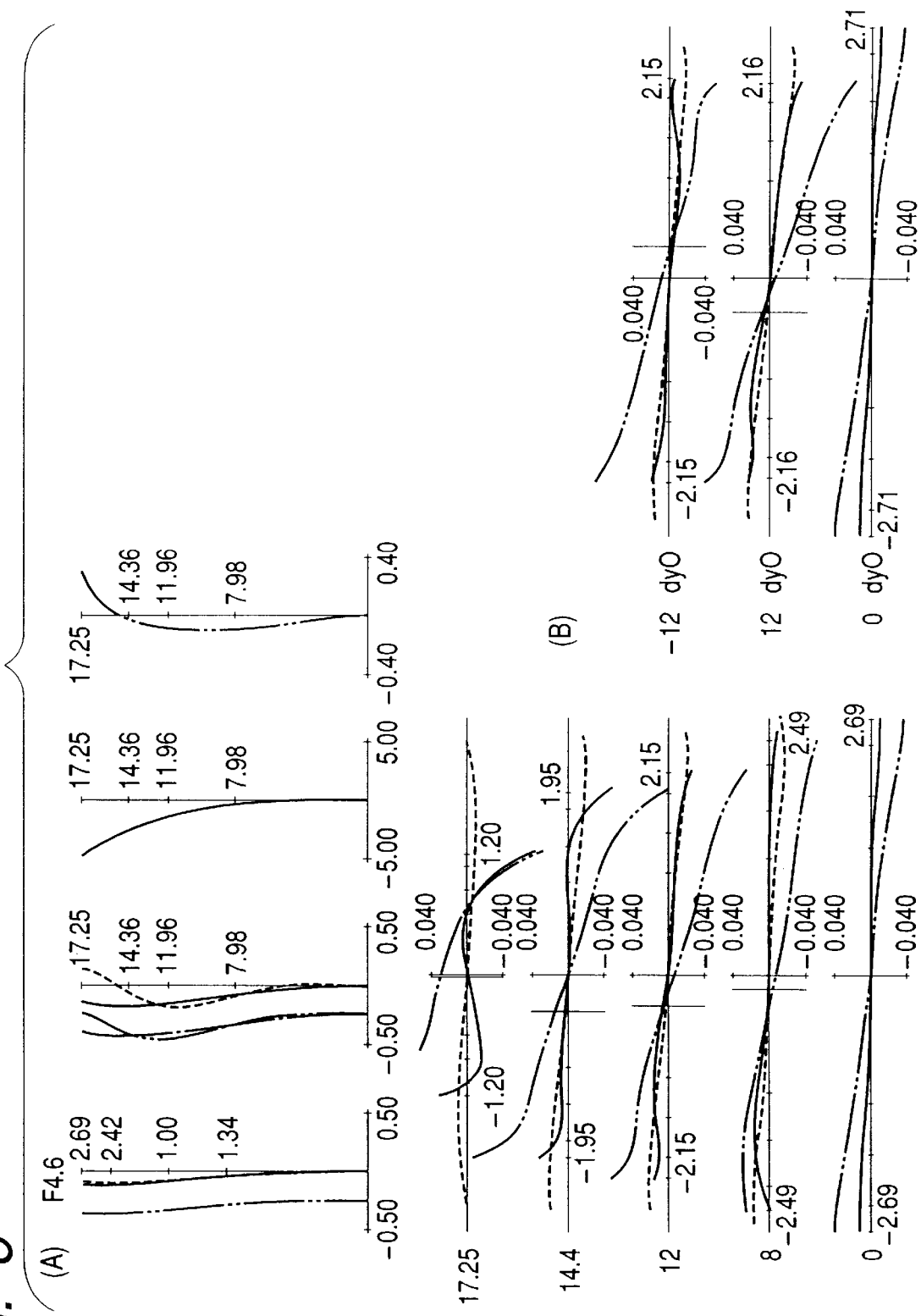
FIG. 6 shows lateral aberration diagrams at the wide angle extreme in the normal condition (A) and in the vibration-preventing condition of 0.2° (B) at the image heights of O mm and ±12 mm of the zoom lens in Numerical Example 2.
Figure 7:
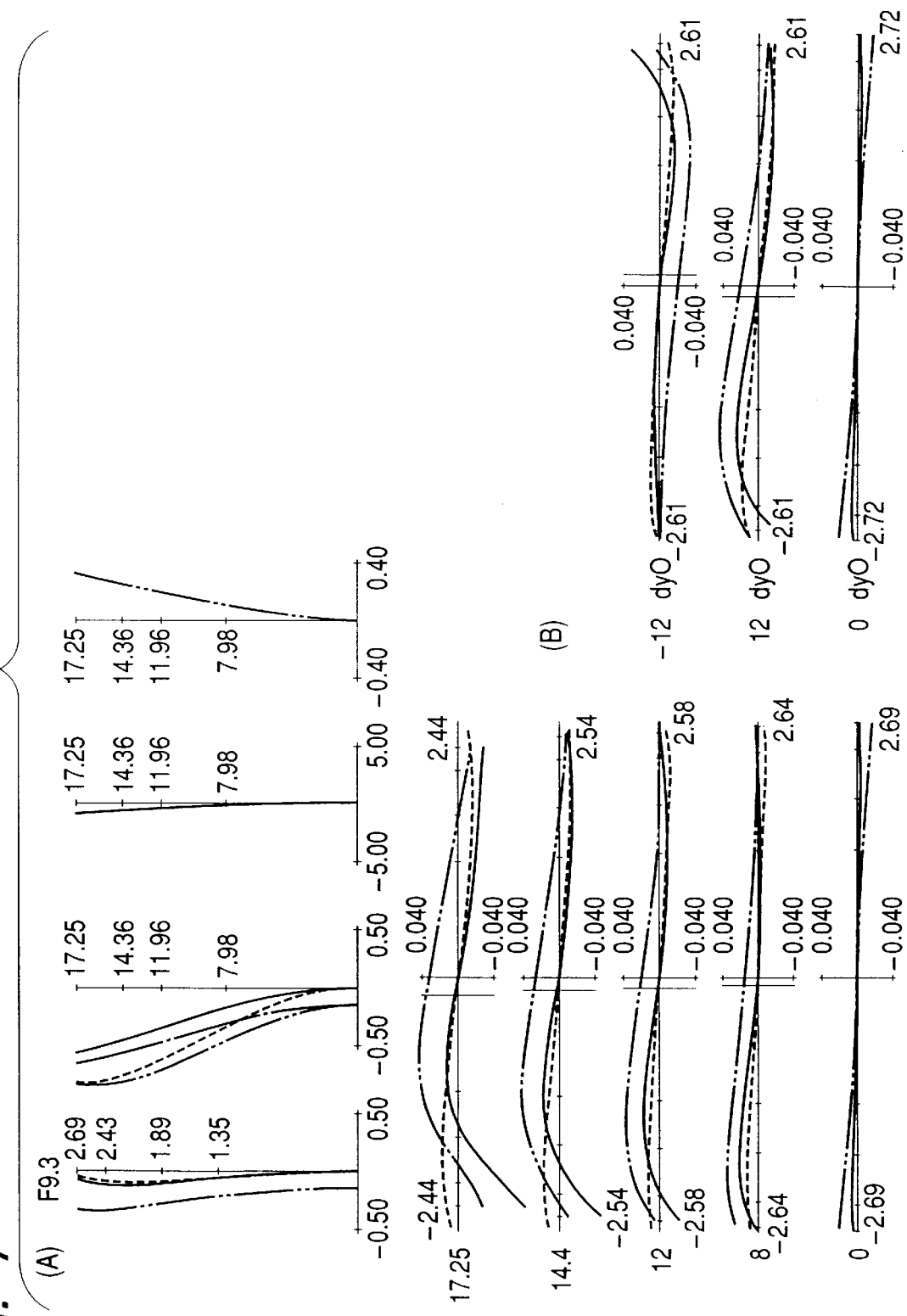
FIG. 7 shows lateral aberration diagrams at the middle focal length in the normal condition (A) and in the vibration-preventing condition of 0.2° (B) at the 5 image heights of 0 mm and ±12 mm of the zoom lens in Numerical Example 2.
Figure 8:
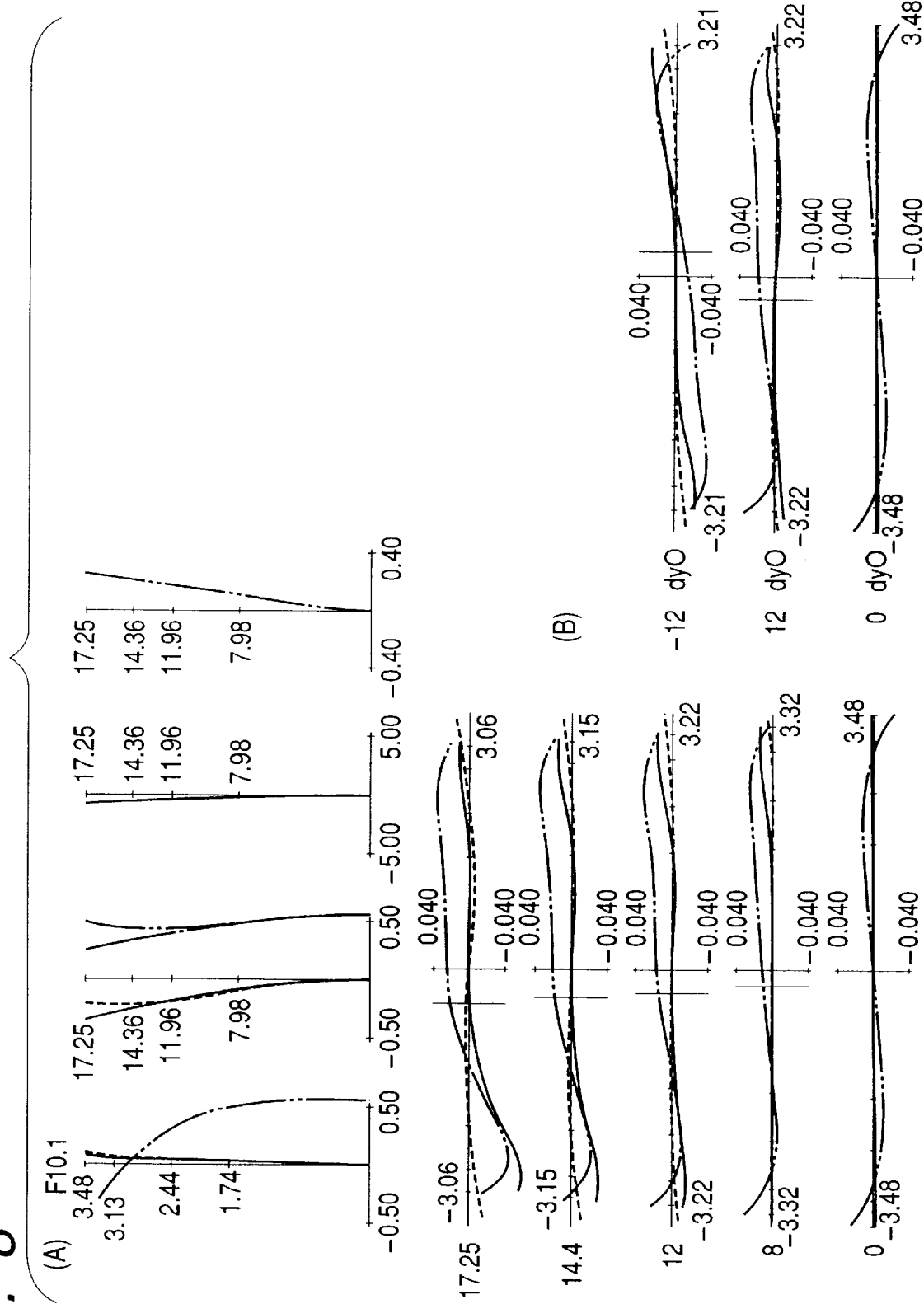
FIG. 8 shows lateral aberration-diagrams at the telephoto extreme in the normal condition (A) and in the vibration-preventing condition of 0.2° (B) at the image heights of 0 mm and ±12 mm of the zoom lens in Numerical Example 2.
Figure 9:
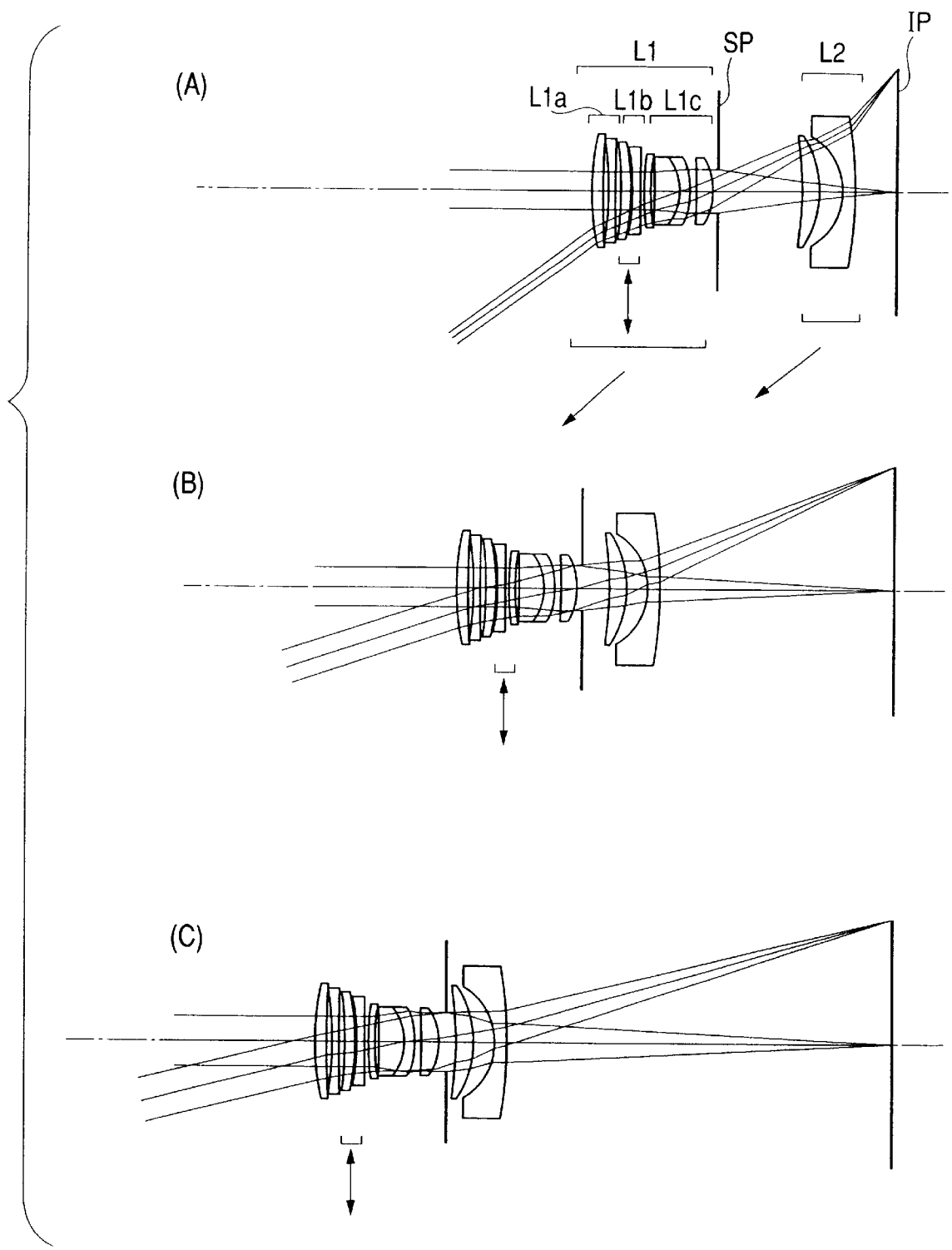
FIG. 9 is lens sectional view of the zoom lens in Numerical Example 3.
Figure 10:
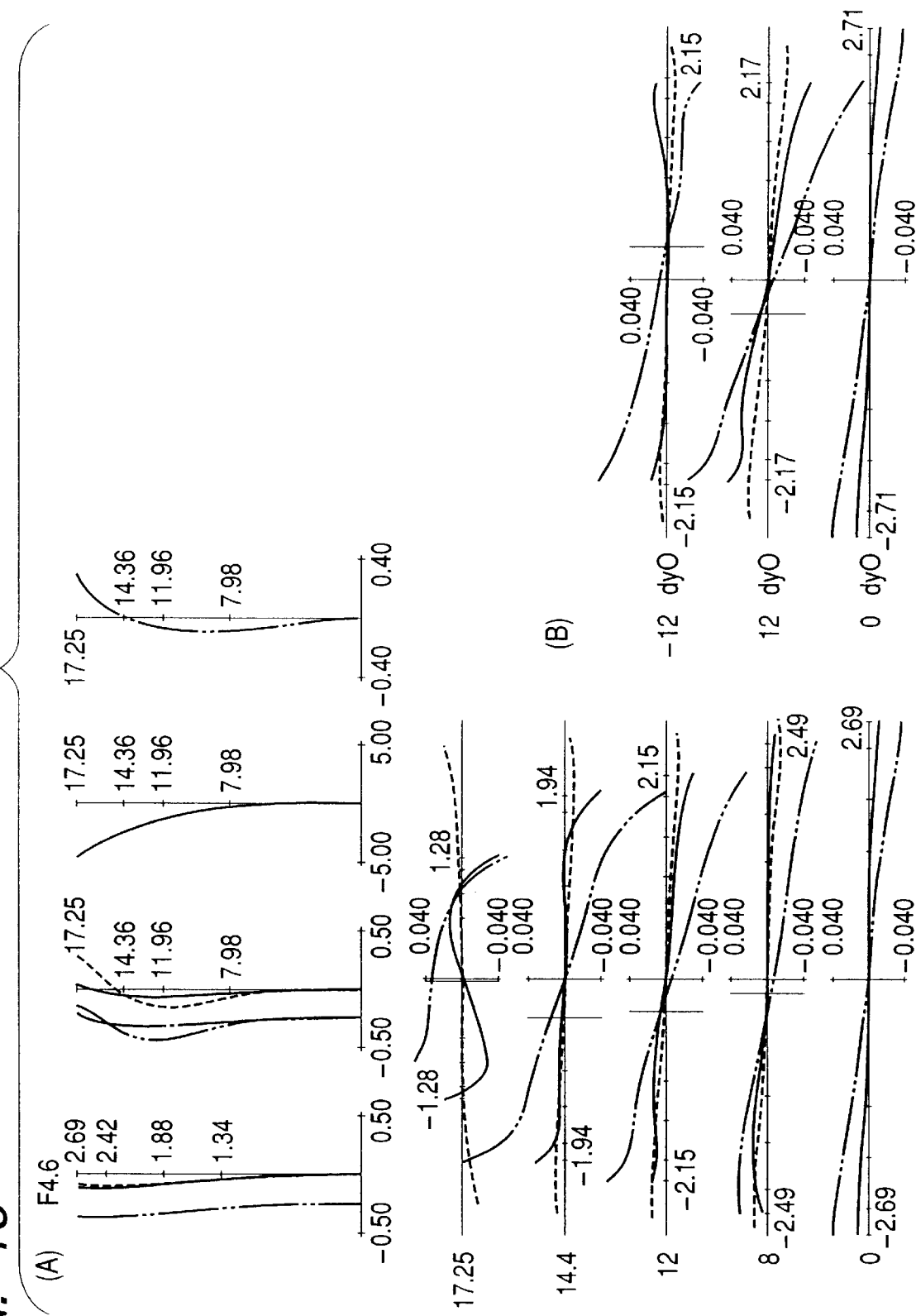
FIG. 10 shows lateral aberration diagrams at the wide-angle extreme in the normal condition (A) and in the vibration-preventing condition of 0.2° (B) at the image heights of 0 mm and ±12 mm of the zoom lens in Numerical Example 3.
Figure 11:
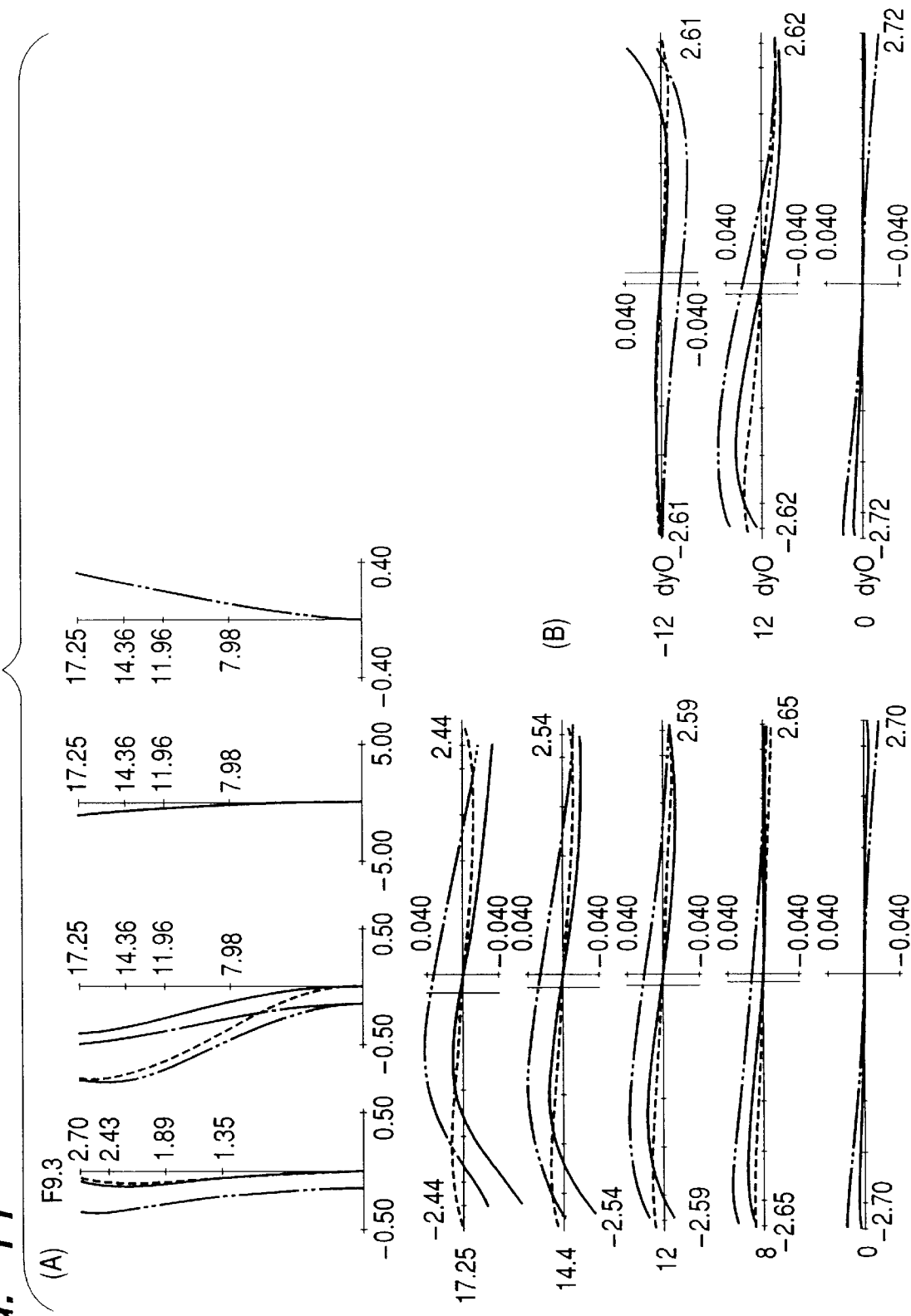
FIG. 11 shows lateral aberration diagrams at the middle focal length in the normal condition (A) and in the vibration-preventing condition of 0.2° (B) at the image heights of O mm and ±12 mm of the zoom lens in Numerical Example 3.
Figure 12:
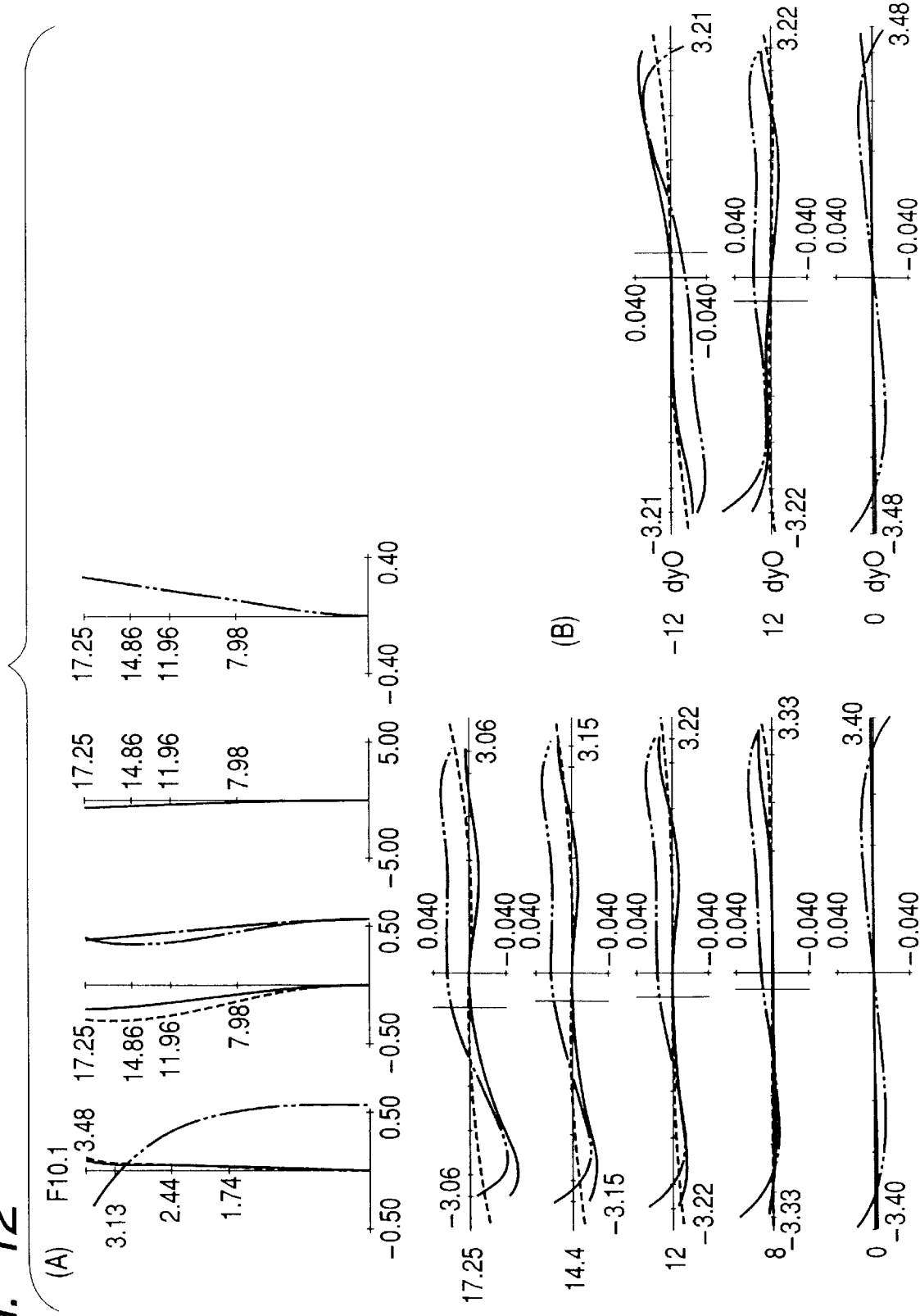
FIG. 12 shows lateral aberration diagrams at the telephoto extreme in the normal condition (A) and in the vibration-preventing condition of 0.2° (B) at the image heights of 0 mm and ±12 mm of the zoom lens in Numerical Example 3.
Figure 13:
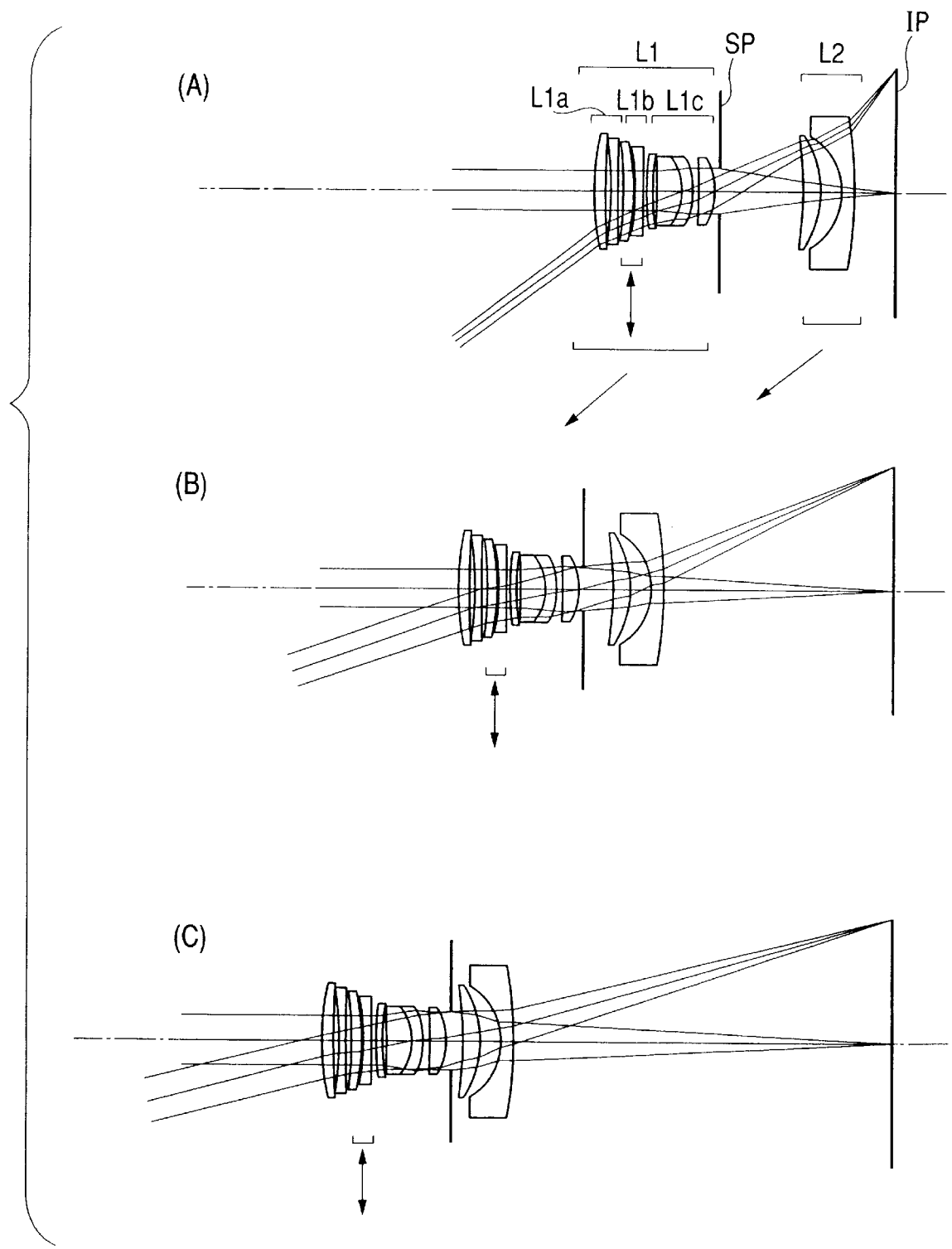
FIG. 13 is lens sectional view of the zoom lens in Numerical Example 4.
Figure 14:
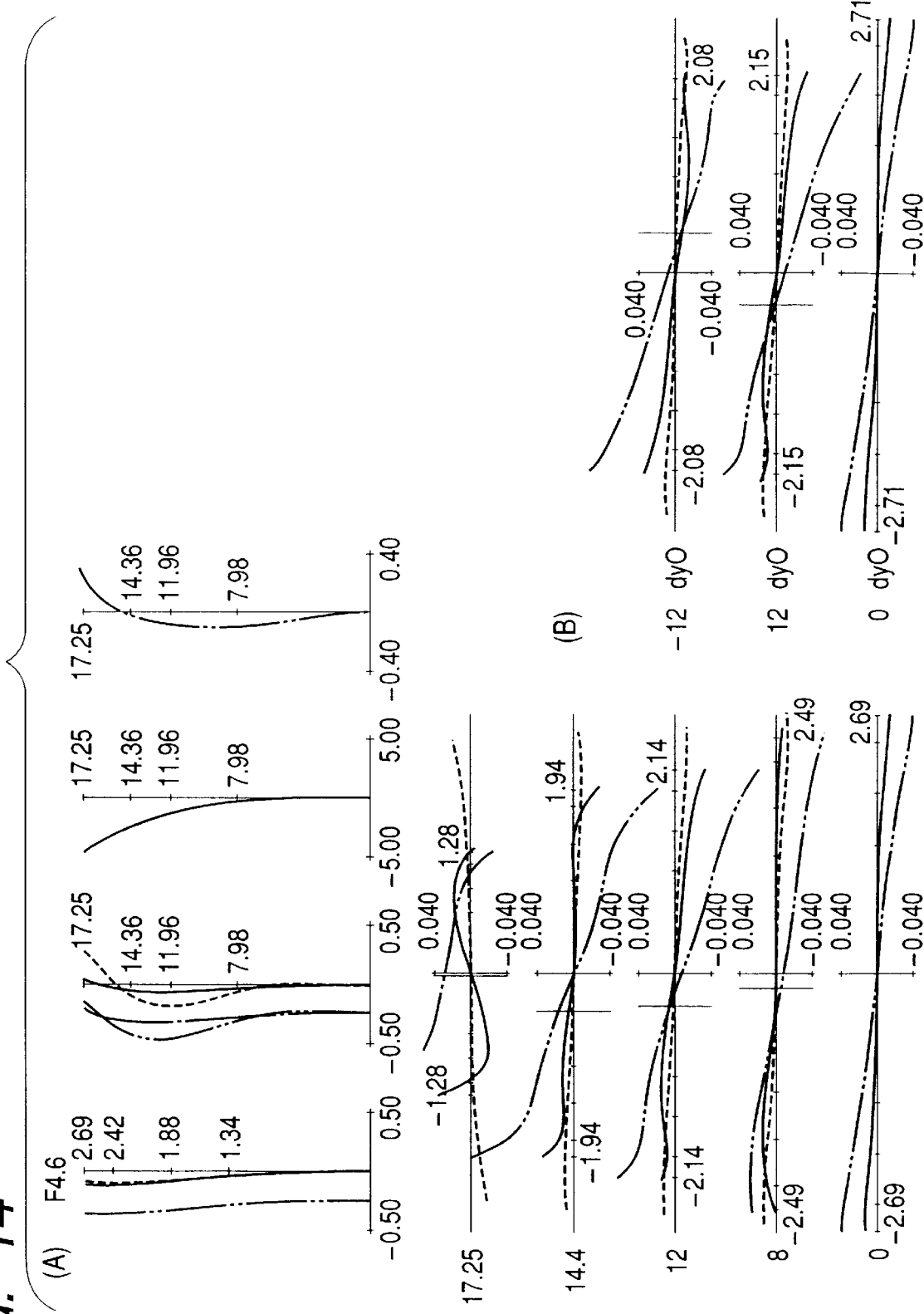
FIG. 14 shows lateral aberration diagrams at the wide-angle extreme in the normal condition (A) and in the vibration-preventing condition of 0.2° (B) at the image heights of 0 mm and ±12 mm of the zoom lens in Numerical Example 4.
Figure 15:
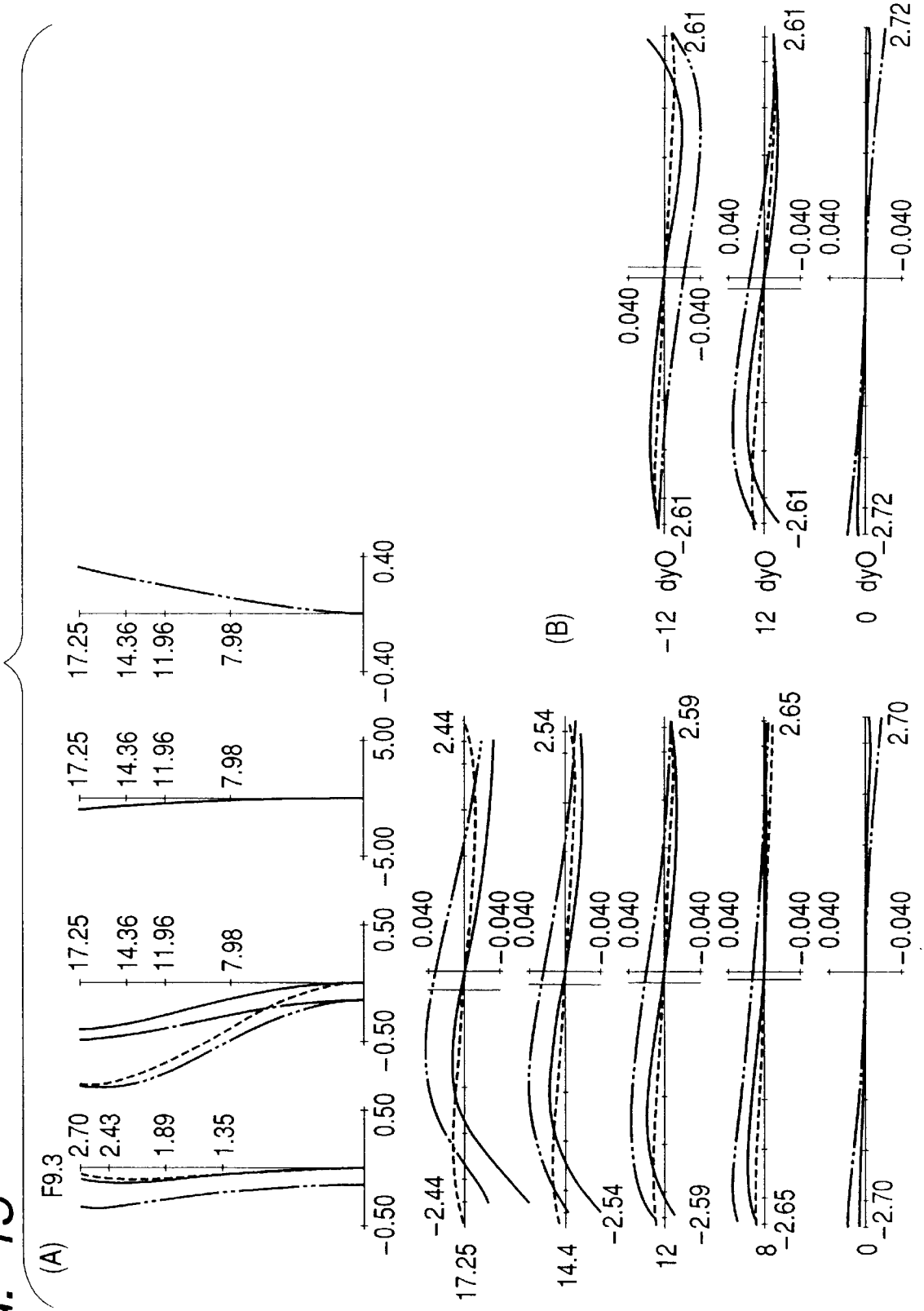
FIG. 15 shows lateral aberration diagrams at the middle focal length in the normal condition (A) and in the vibration-preventing condition of 0.2° (B) at the image heights of 0 mm and ±12 mm of the zoom lens in Numerical Example 4.
Figure 16:
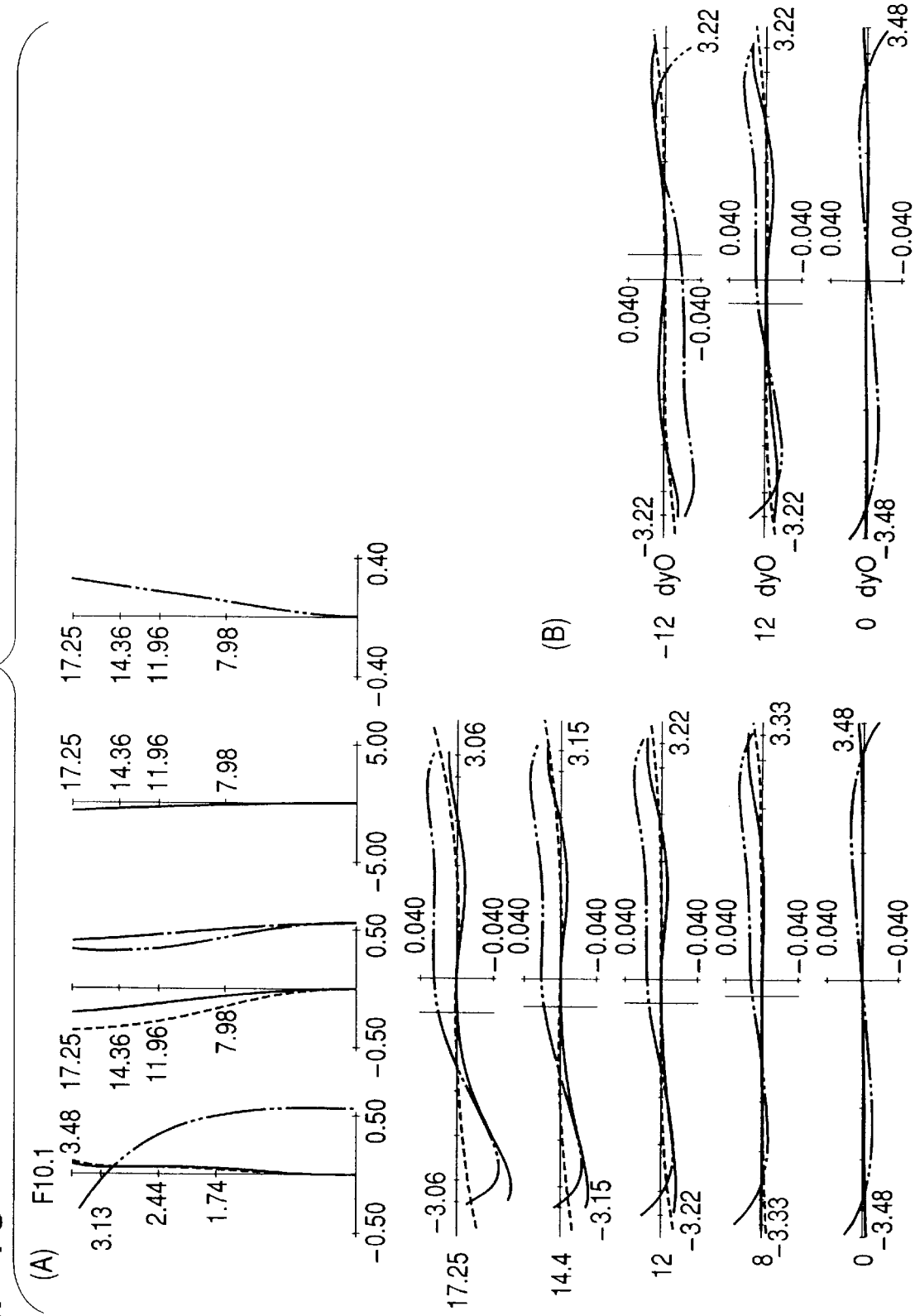
FIG. 16 shows lateral aberration diagrams at the telephoto extreme in the normal condition (A) and in the vibration-preventing condition of 0.2° (B) at the image heights of 0 mm and ±12 mm of the zoom lens in Numerical Example 4.
Figure 17:
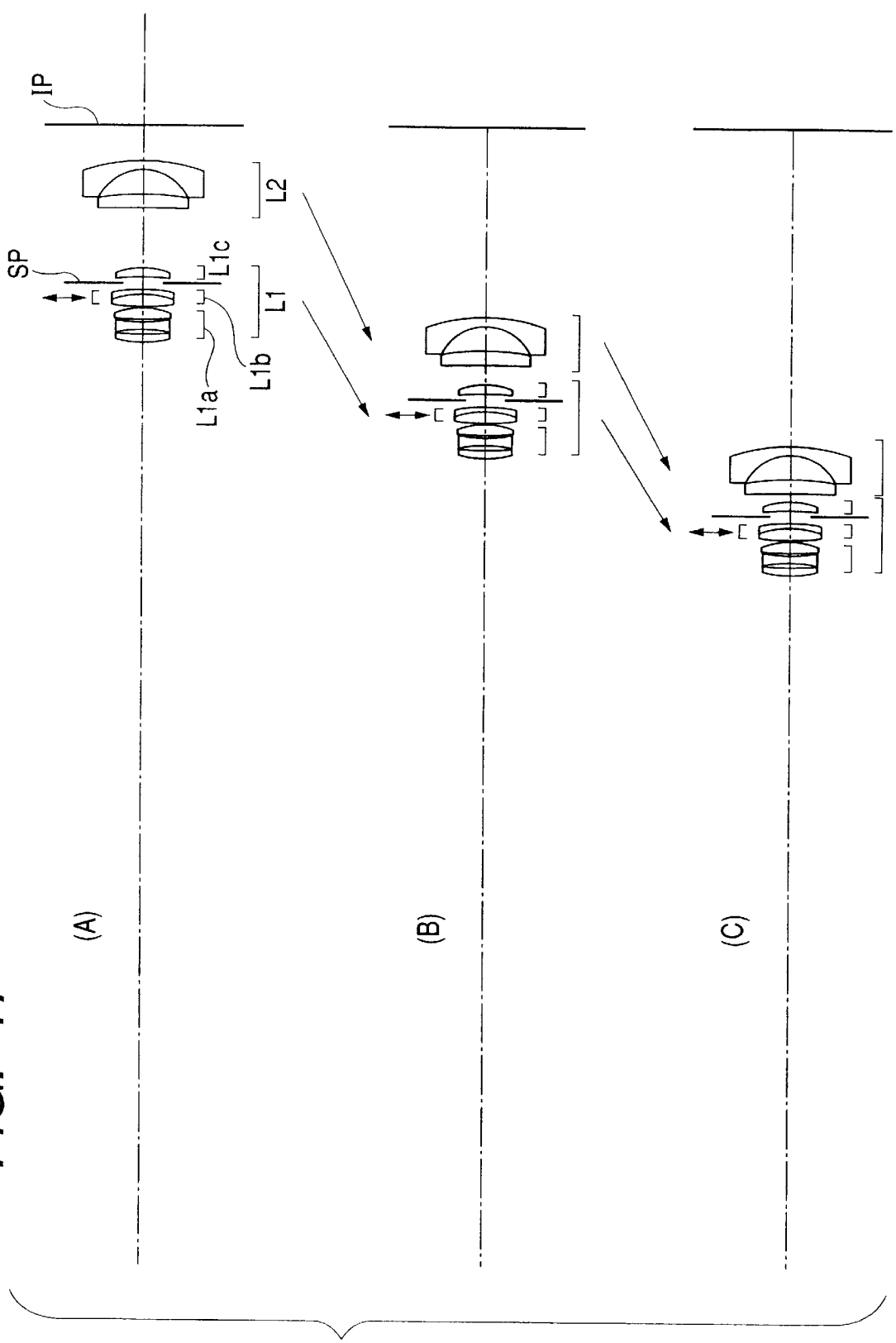
FIG. 17 is lens sectional view of the zoom lens in Numerical Example 5.
Figure 18B:
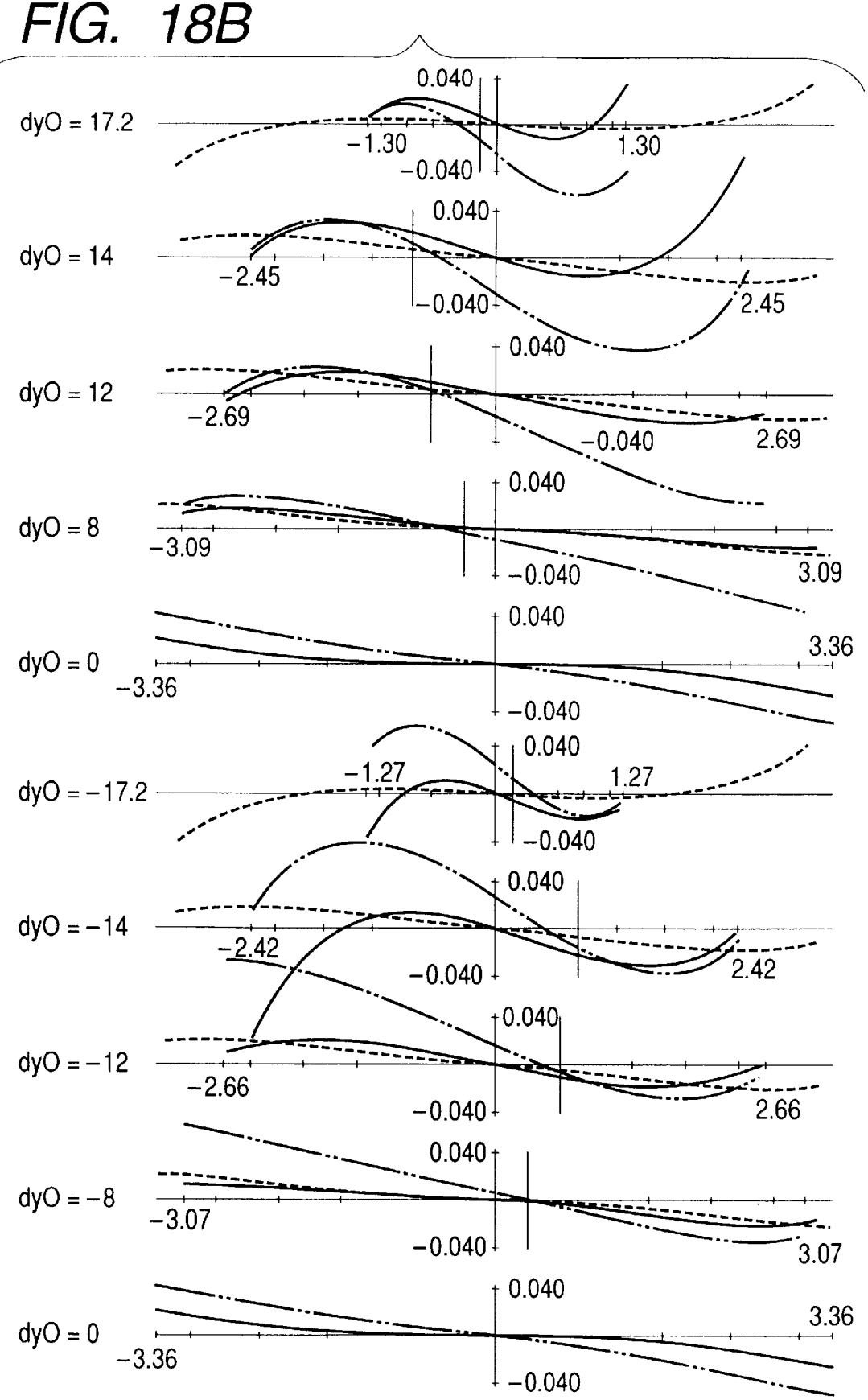
Figure 19A:
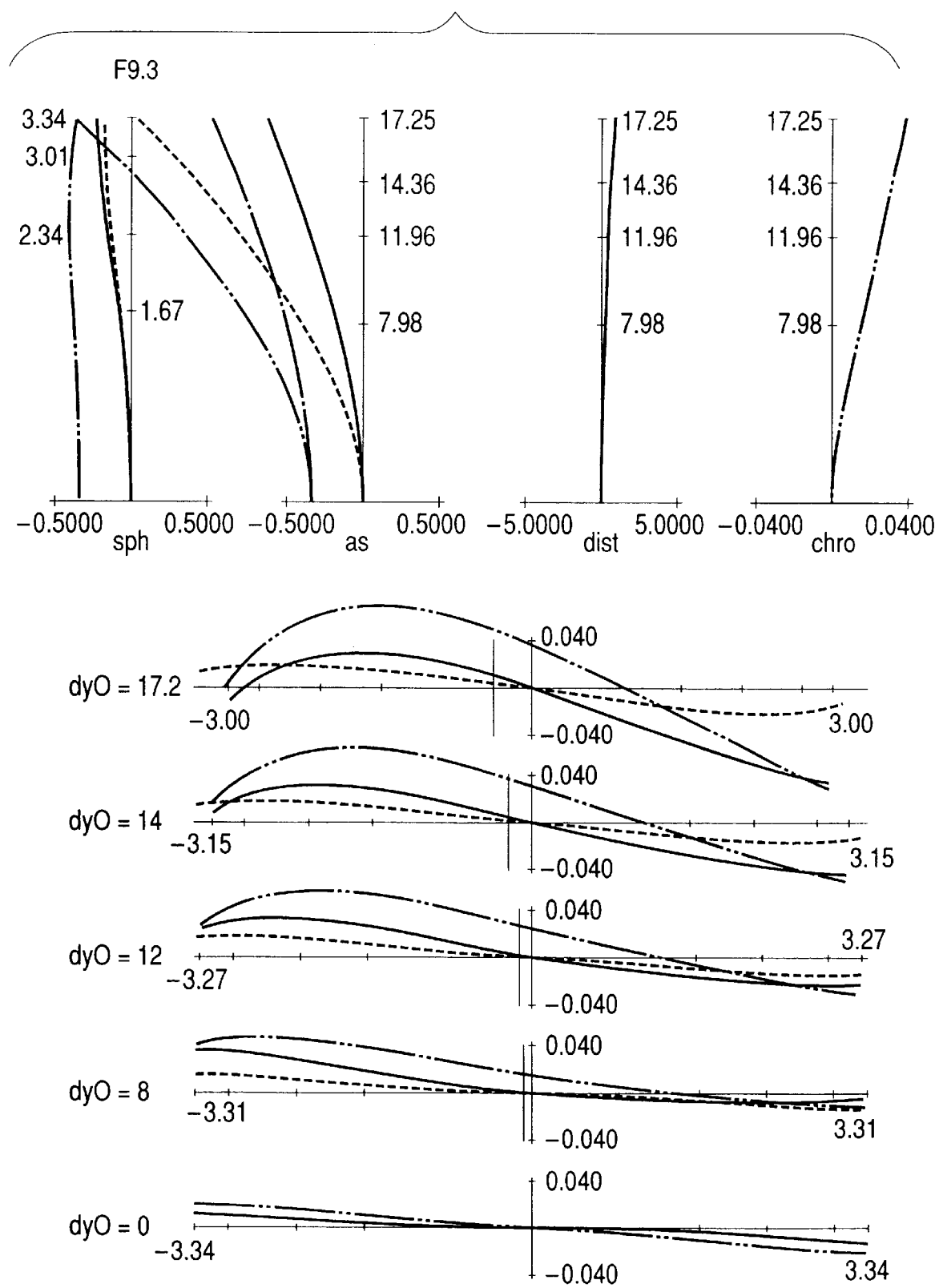
FIGS. 19A and 19B are aberration diagrams at the middle focal length in the normal condition (FIG. 19A) and in the vibration-preventing condition of 0.2° (FIG. 19B) of the zoom lens in Numerical Example 5.
Figure 19B:
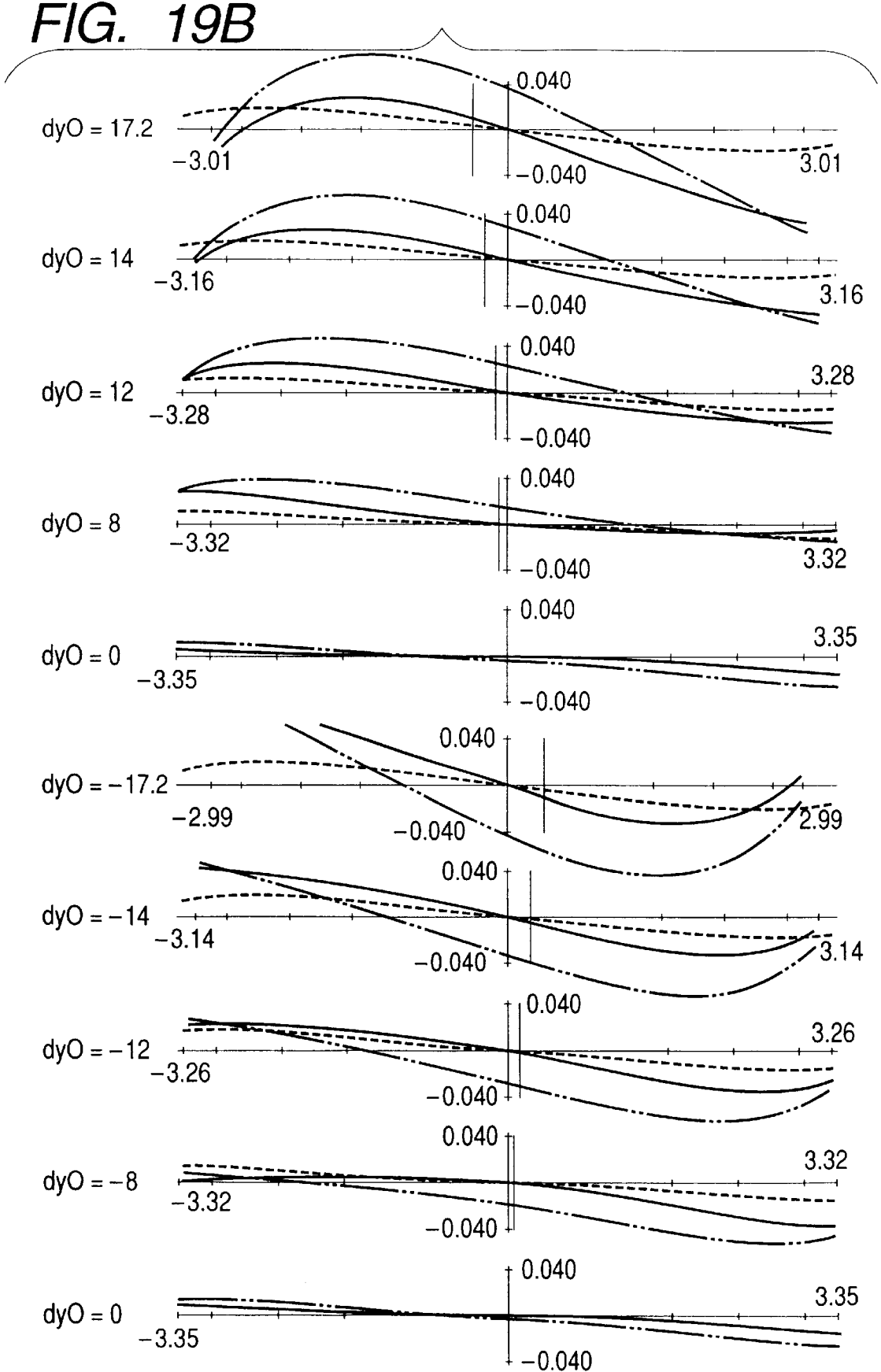
Figure 20B:
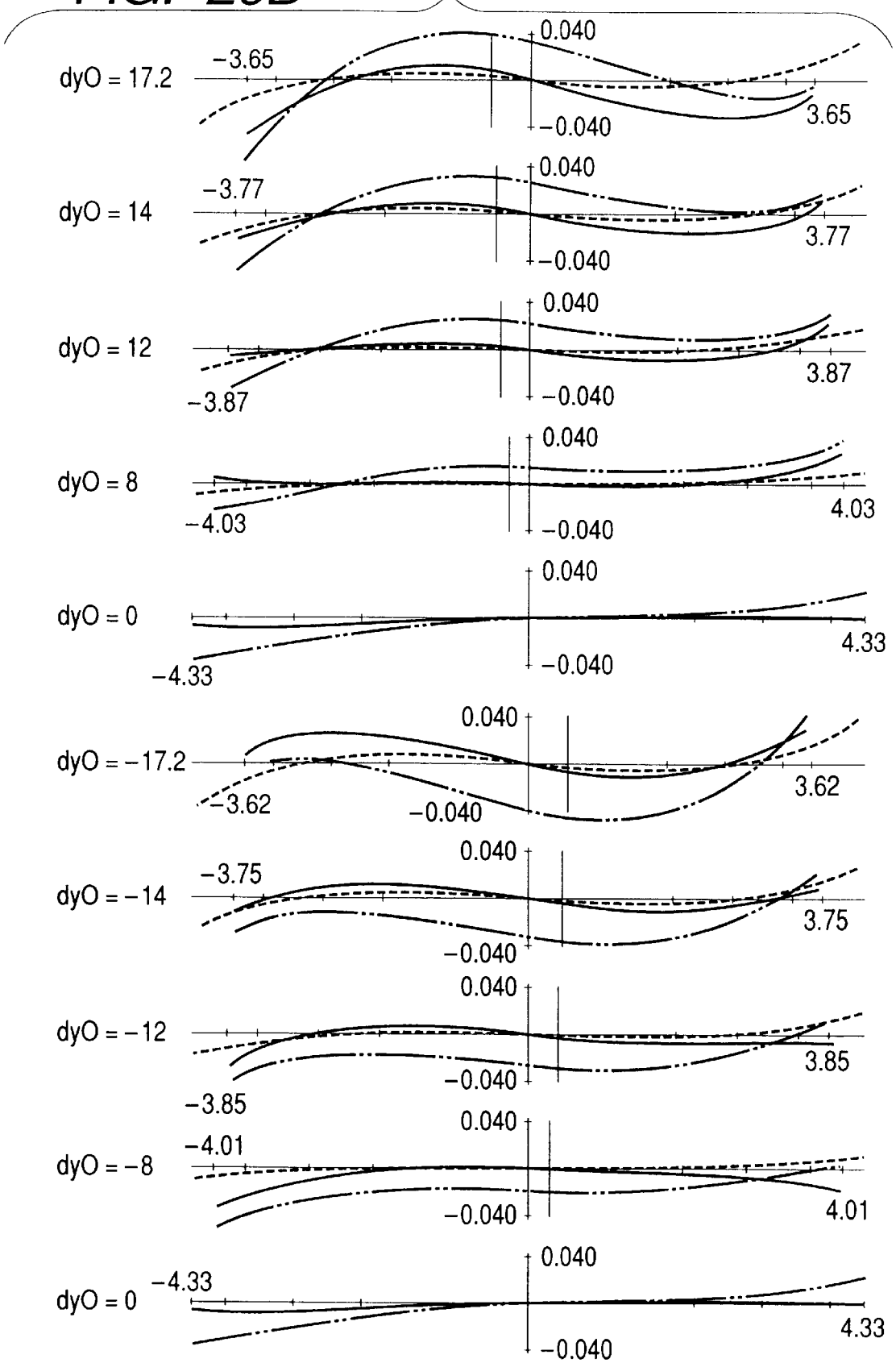
Figure 21:
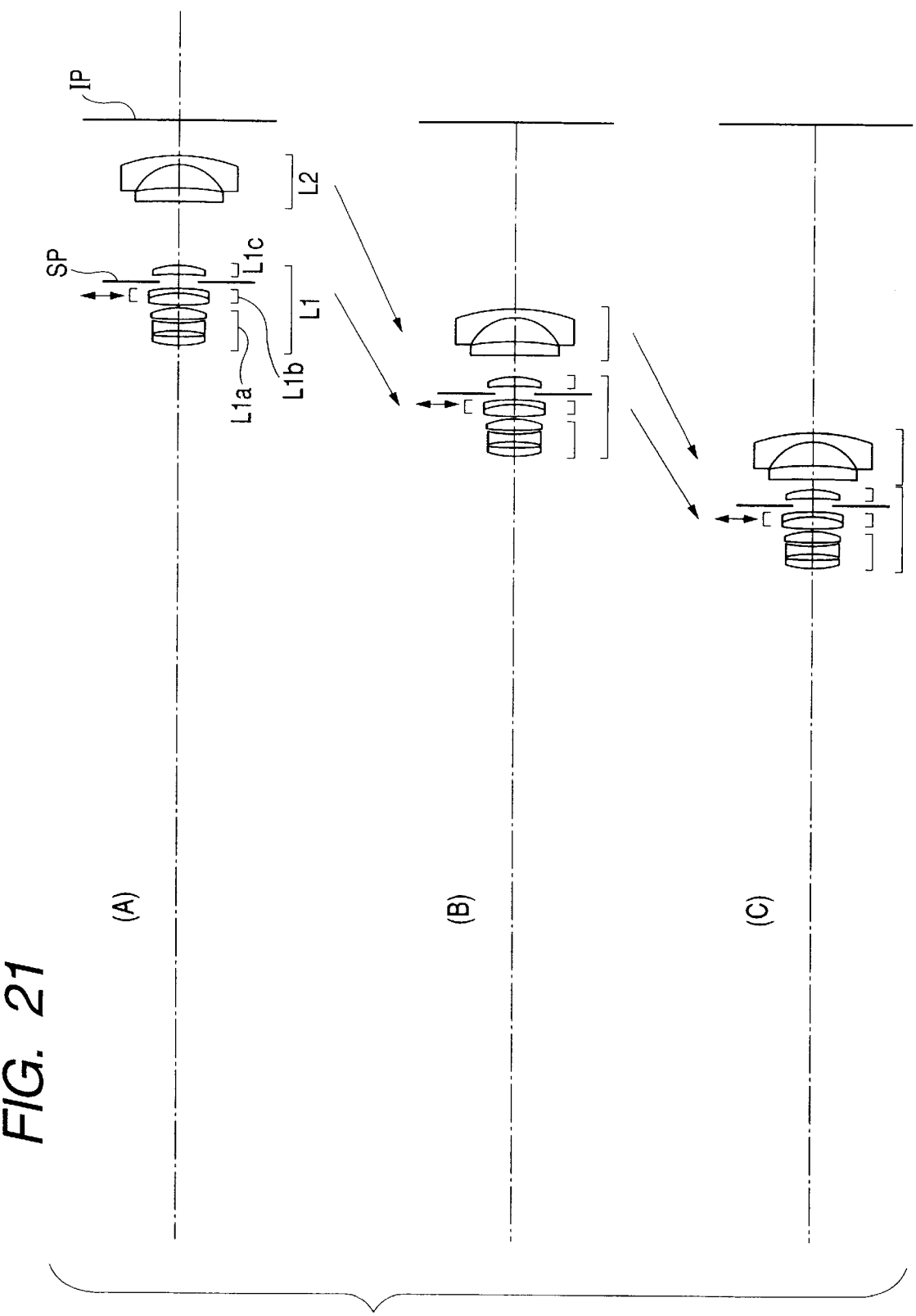
FIG. 21 is lens sectional view of the zoom lens in Numerical Example 6.
Figure 22B:
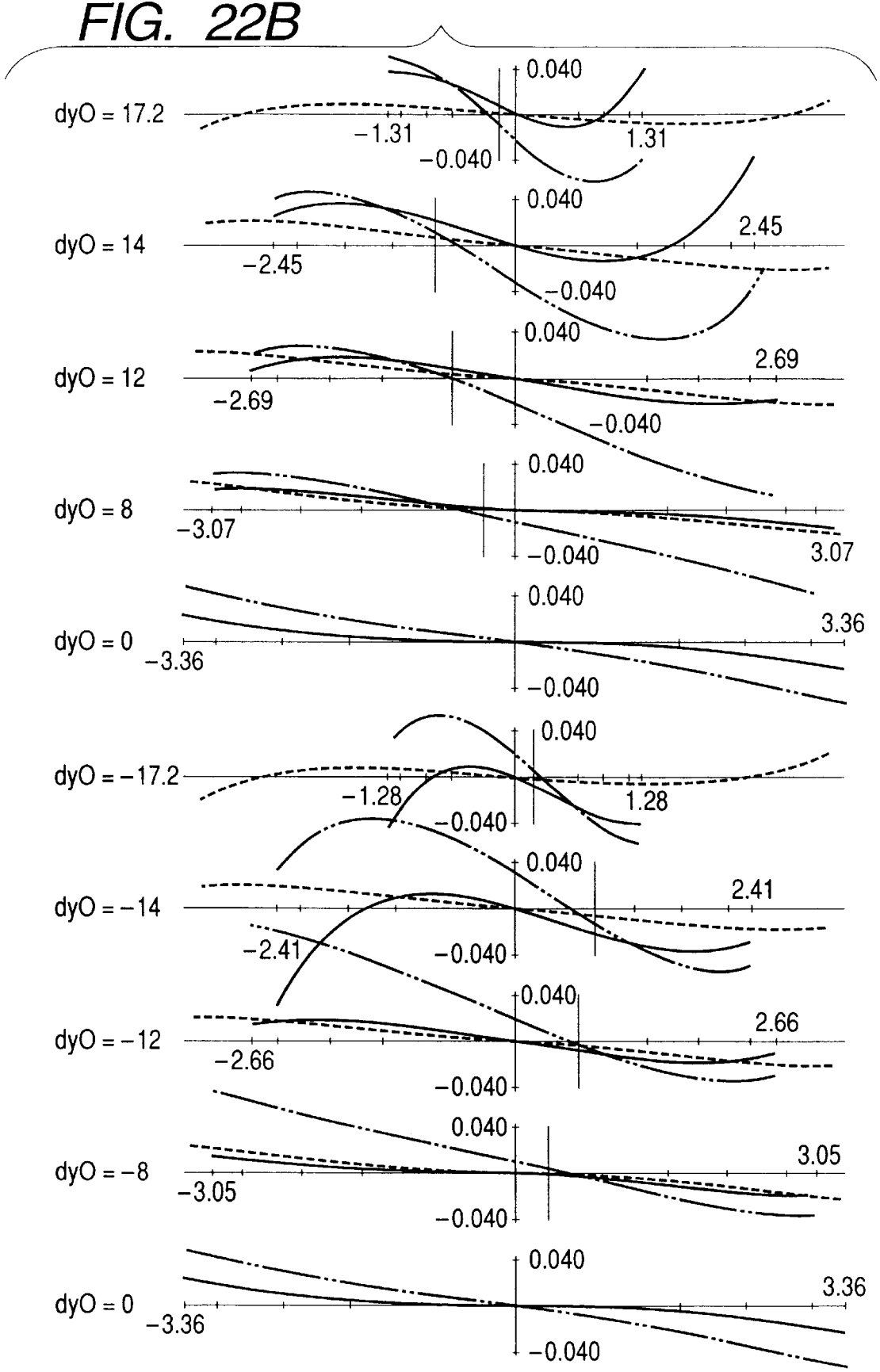
Figure 23A:
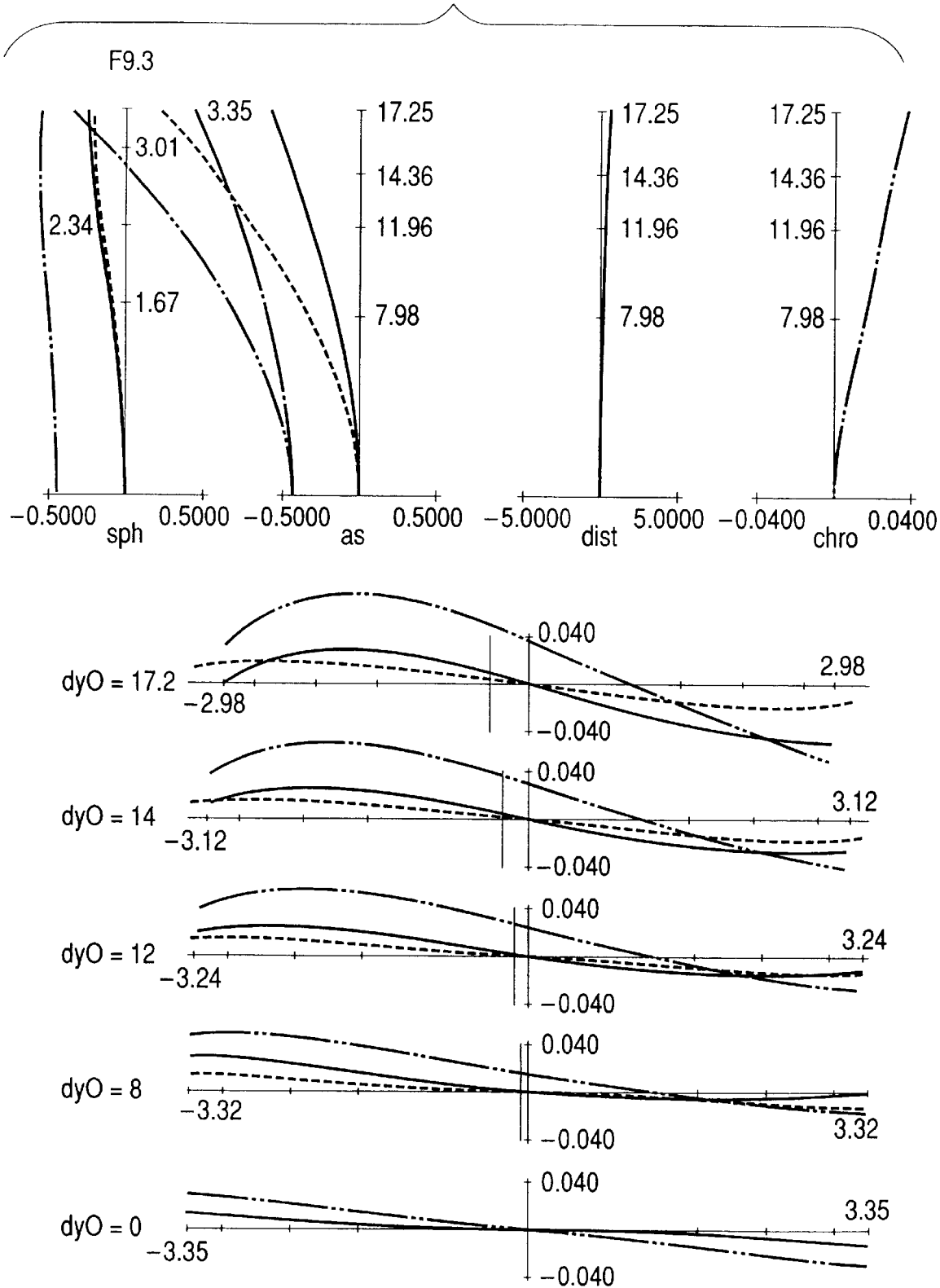
FIGS. 23A and 23B are aberration diagrams at the middle focal length in the normal condition (FIG. 23A) and in the vibration-preventing condition of 0.2° (FIG. 23B) of the zoom lens in Numerical Example 6.
Figure 23B:
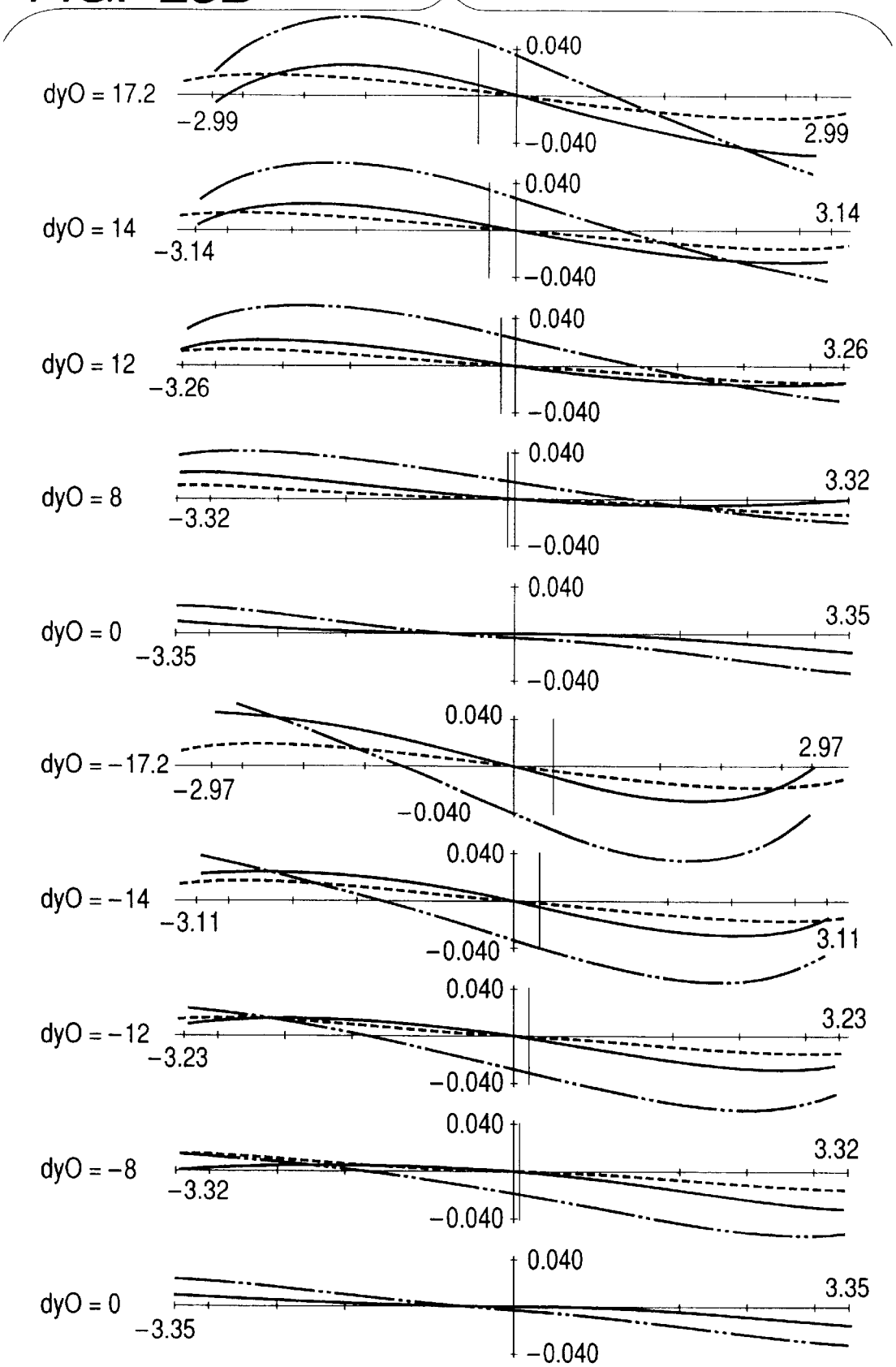
Figure 24B:
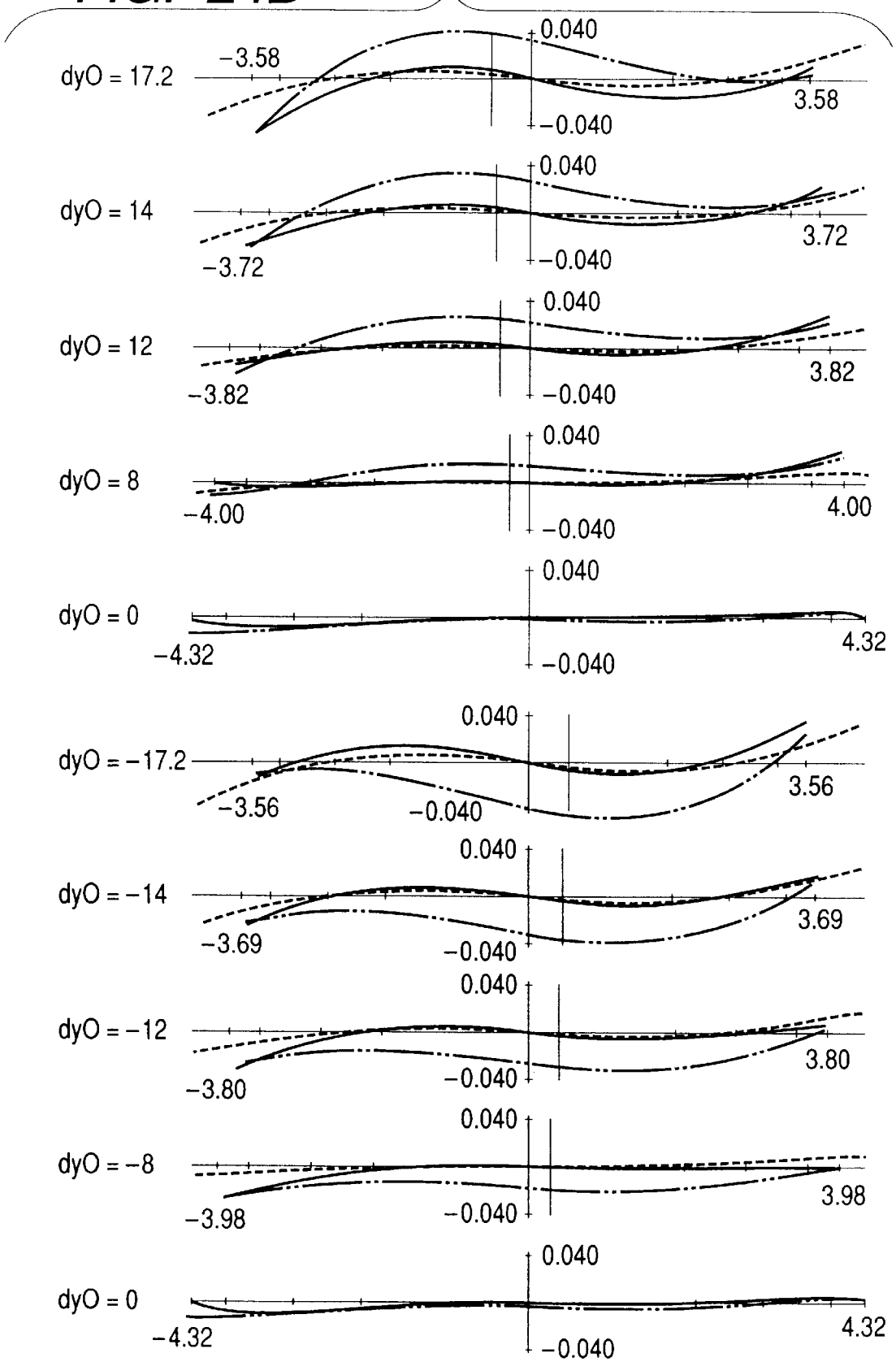
Figure 25:
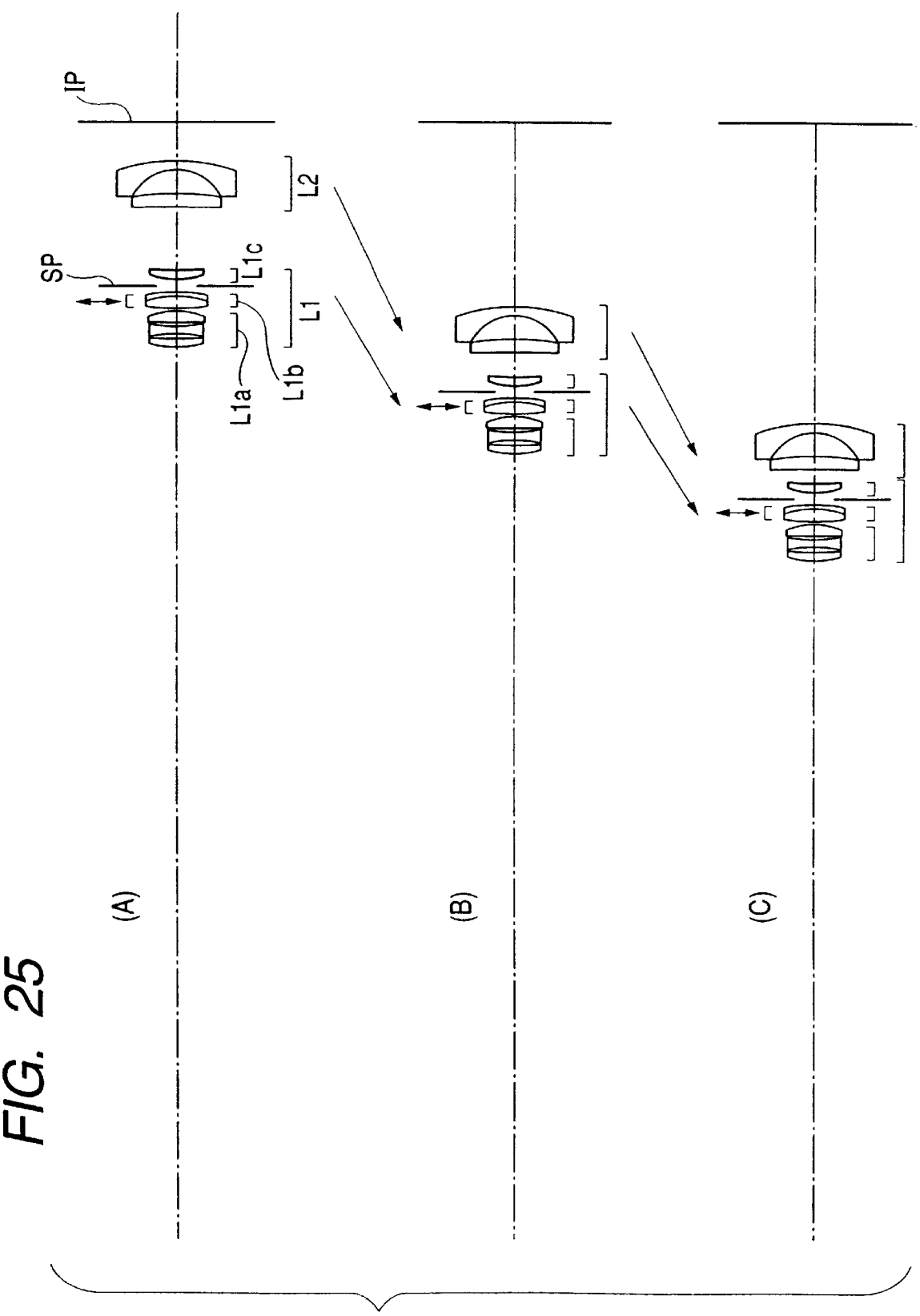
FIG. 25 is lens sectional view of the zoom lens in Numerical Example 7.
Figure 26B:
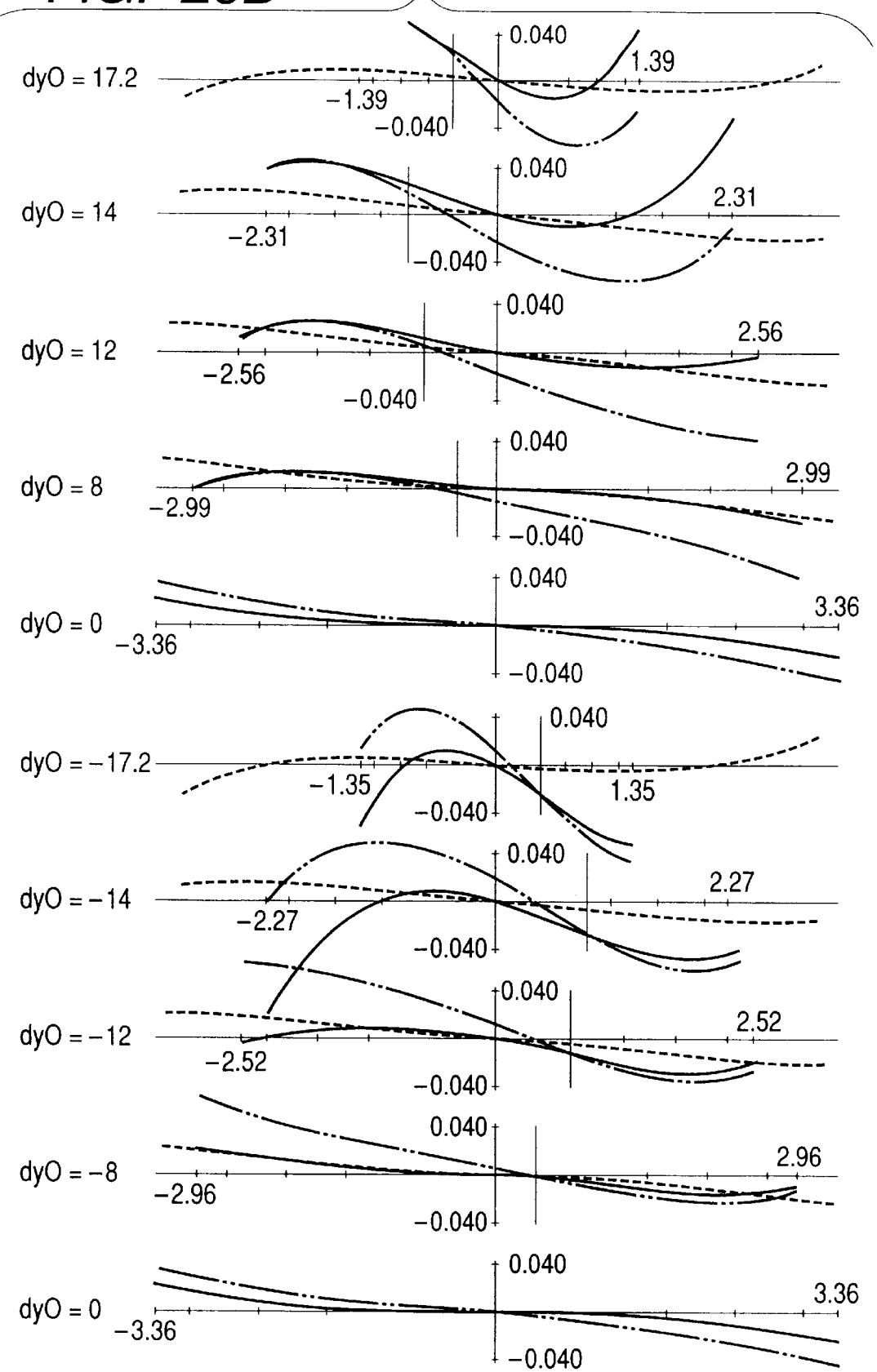
Figure 27A:
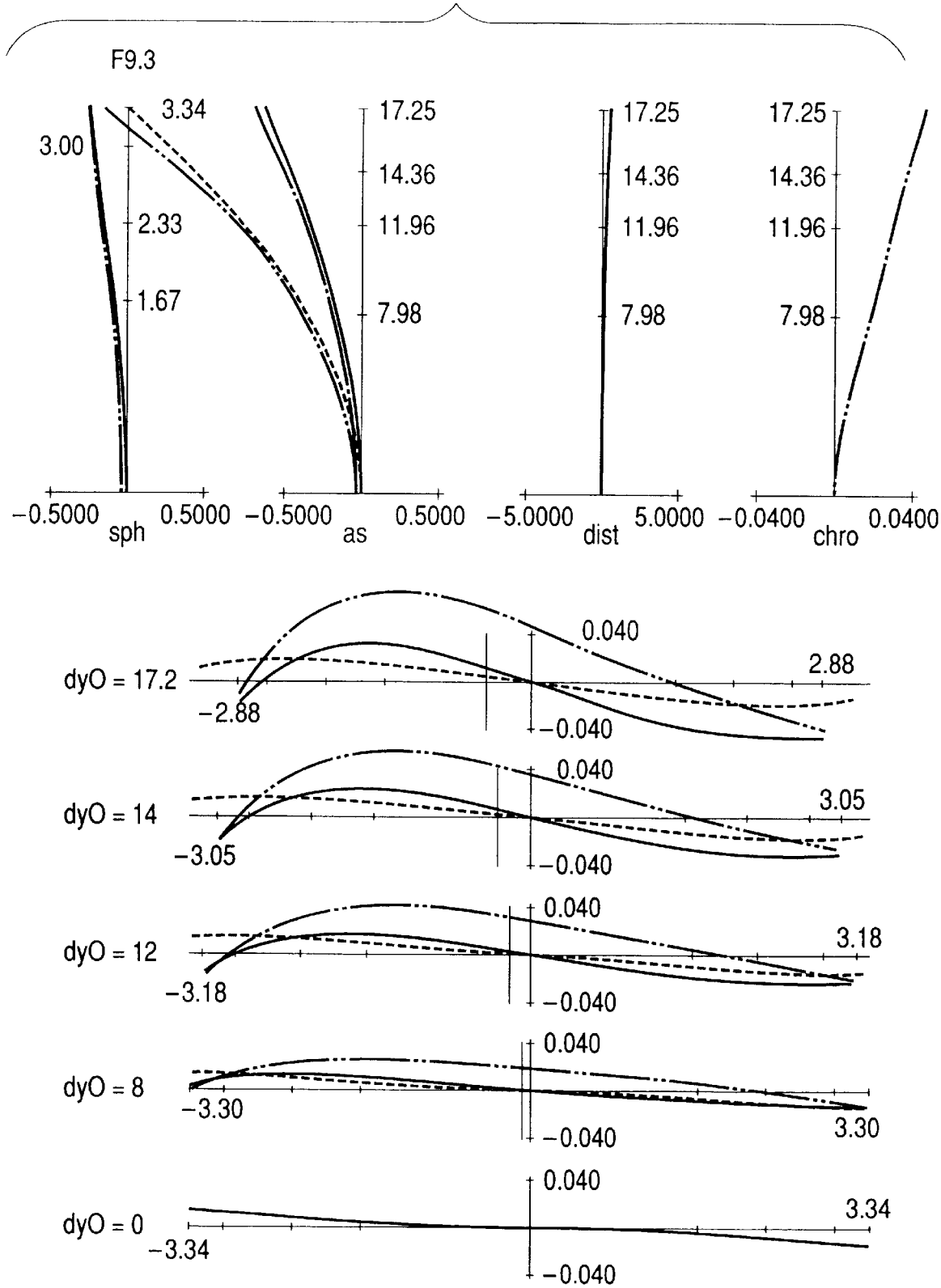
FIGS. 27A and 27B are aberration diagrams at the middle focal length in the normal condition (FIG. 27A) and in the vibration-preventing condition of 0.2° (FIG. 27B) of the zoom lens in Numerical Example 7.
Figure 27B:
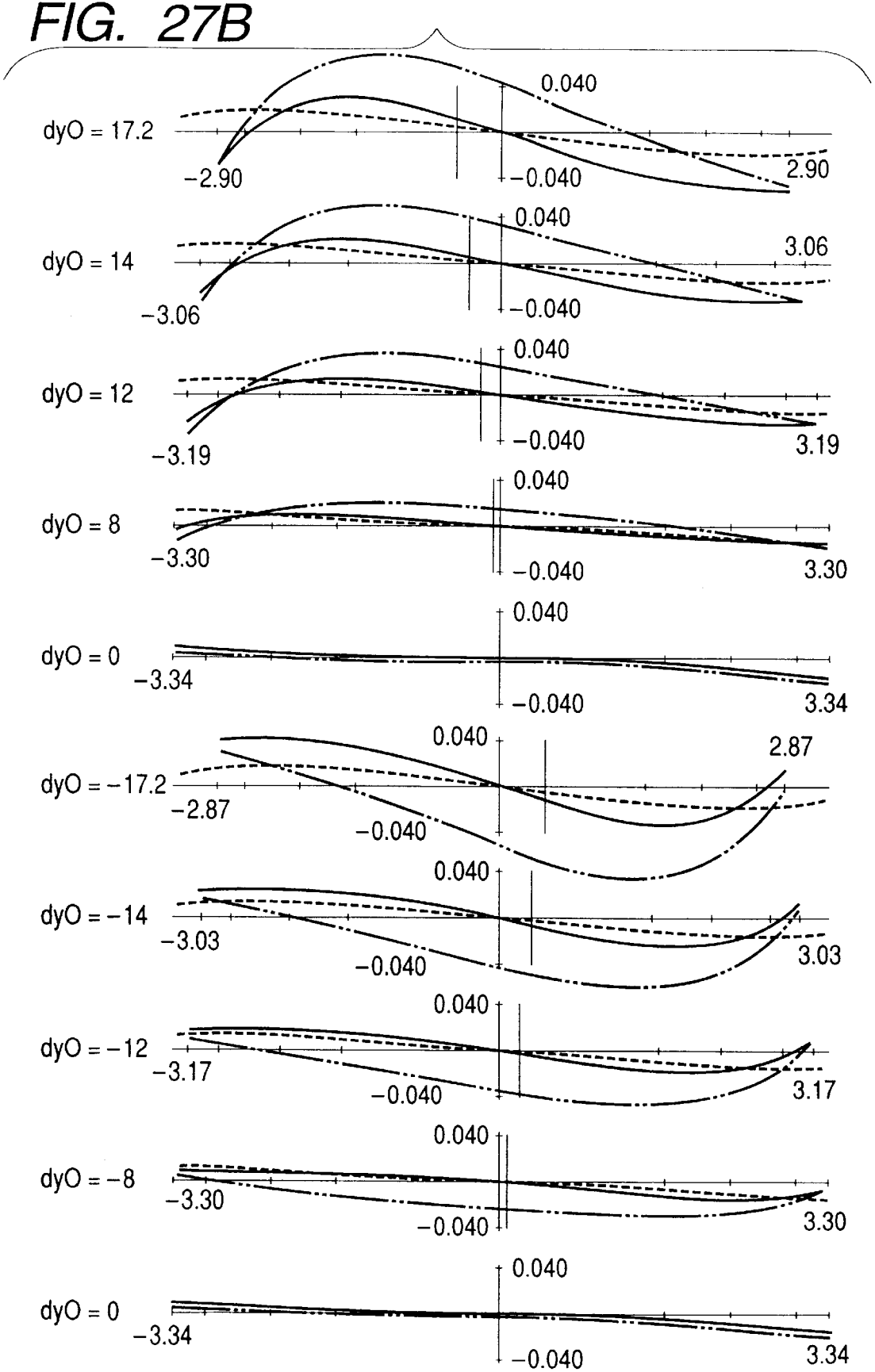
Figure 28B:
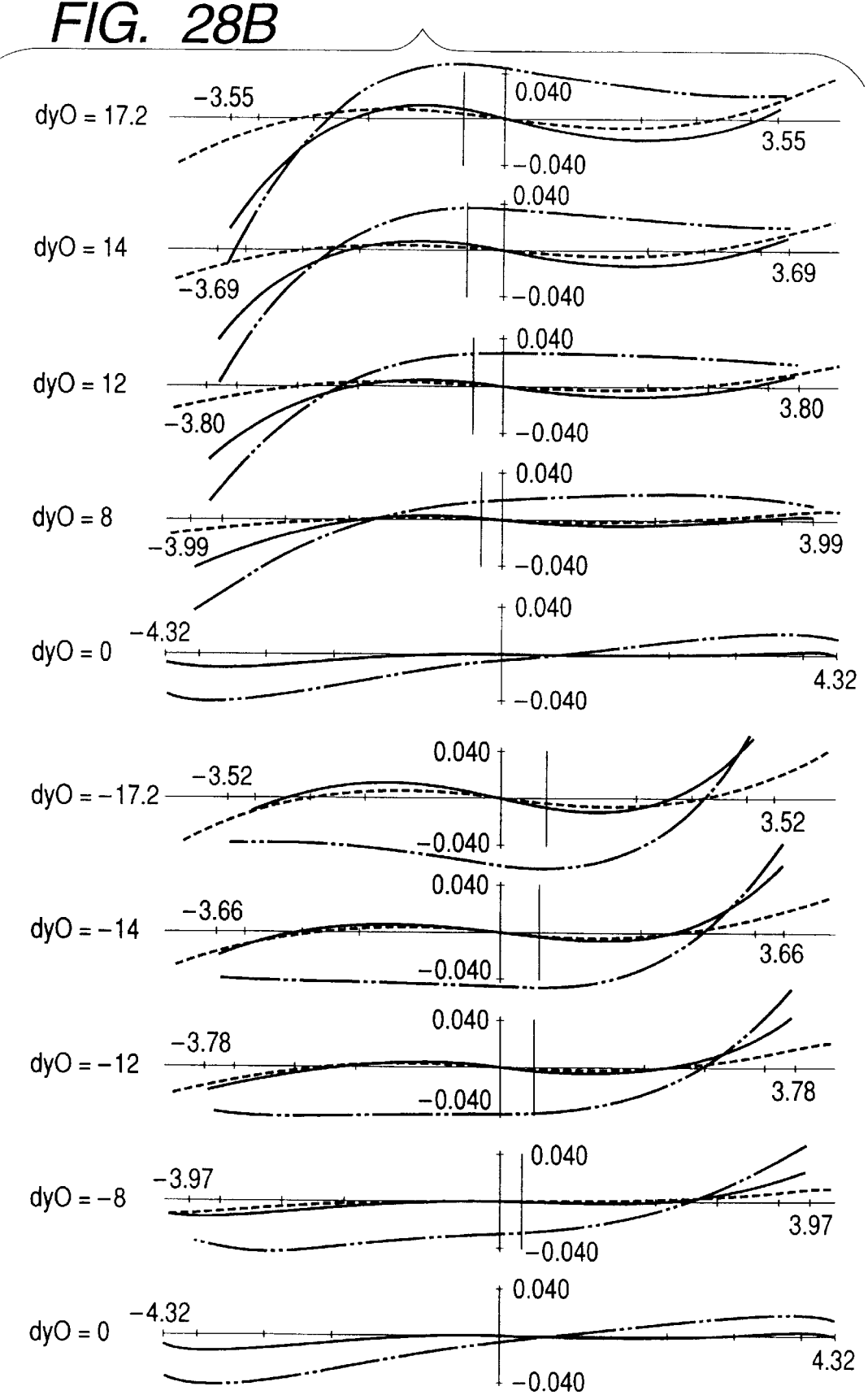
Figure 29:
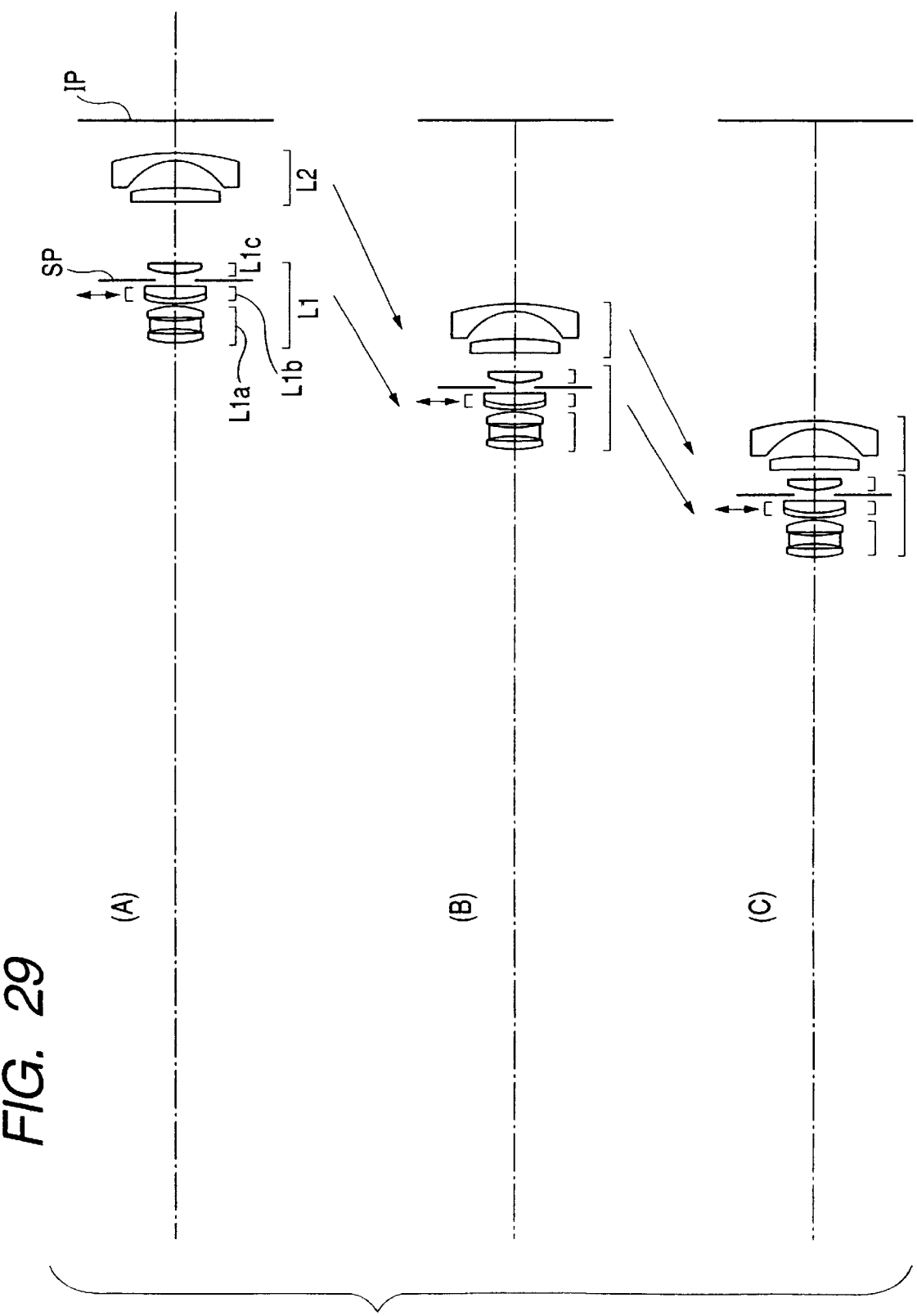
FIG. 29 is lens sectional view of the zoom lens in Numerical Example 8.
Figure 30B:
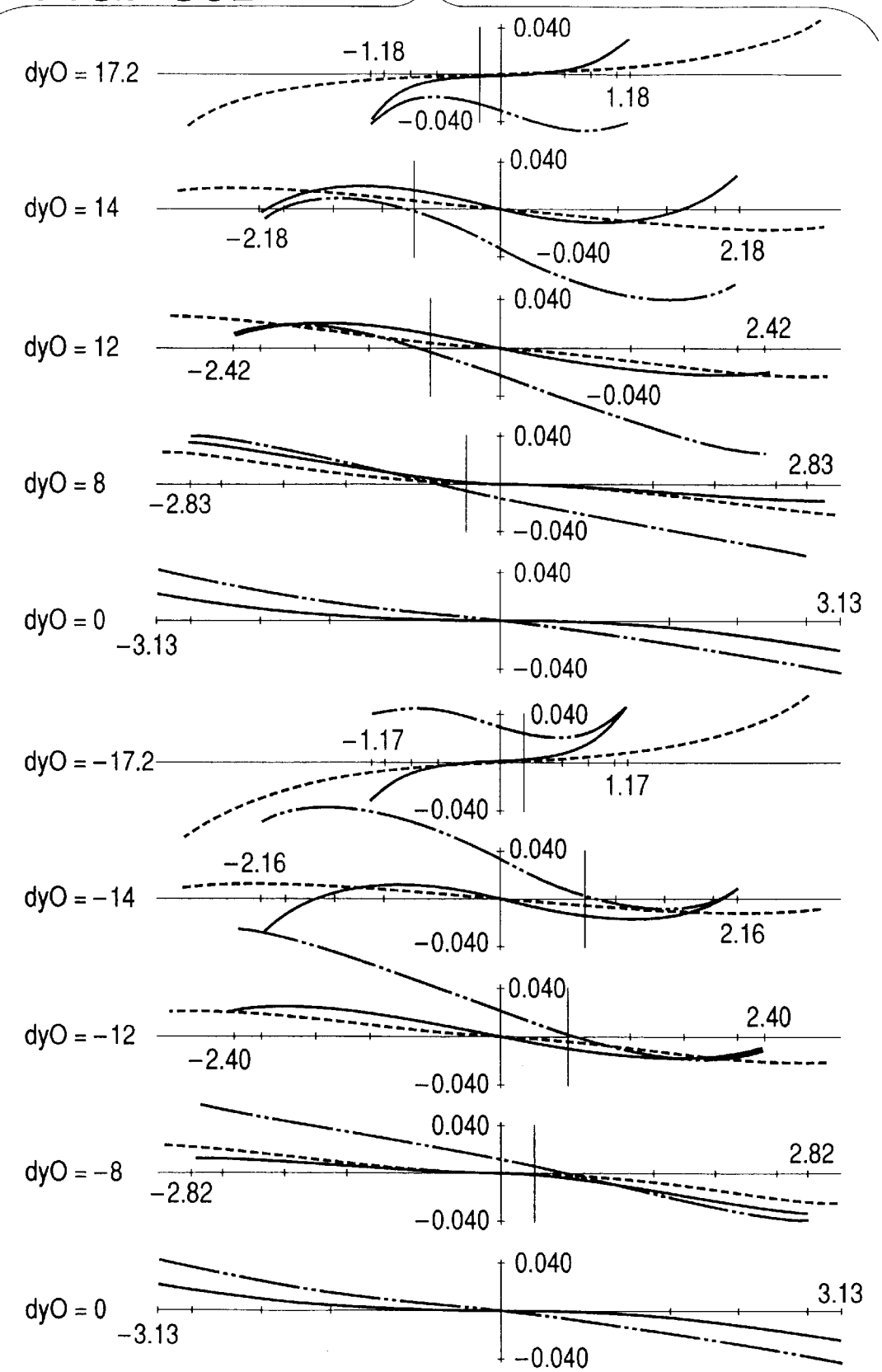
Figure 31B:
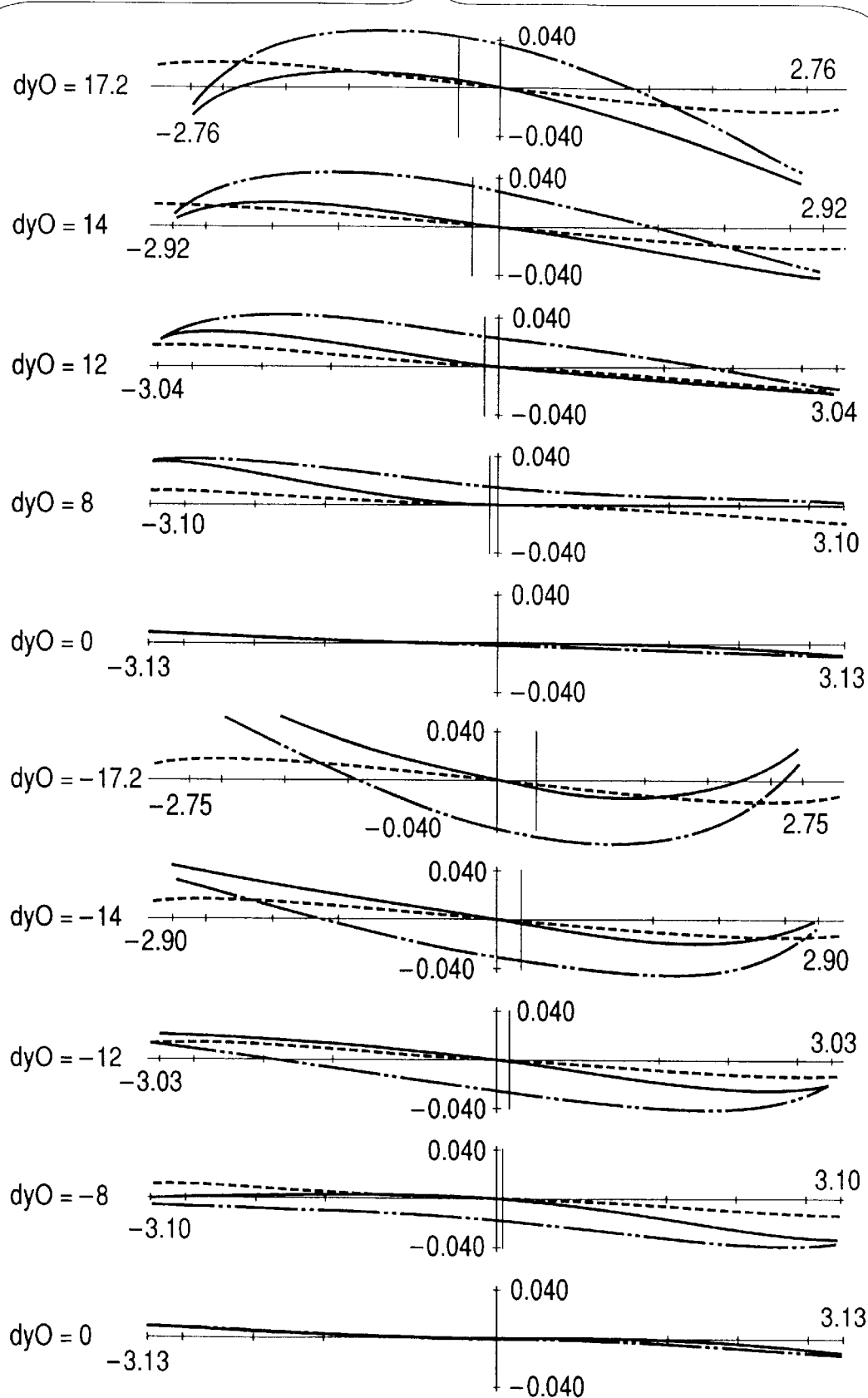
Figure 32B:
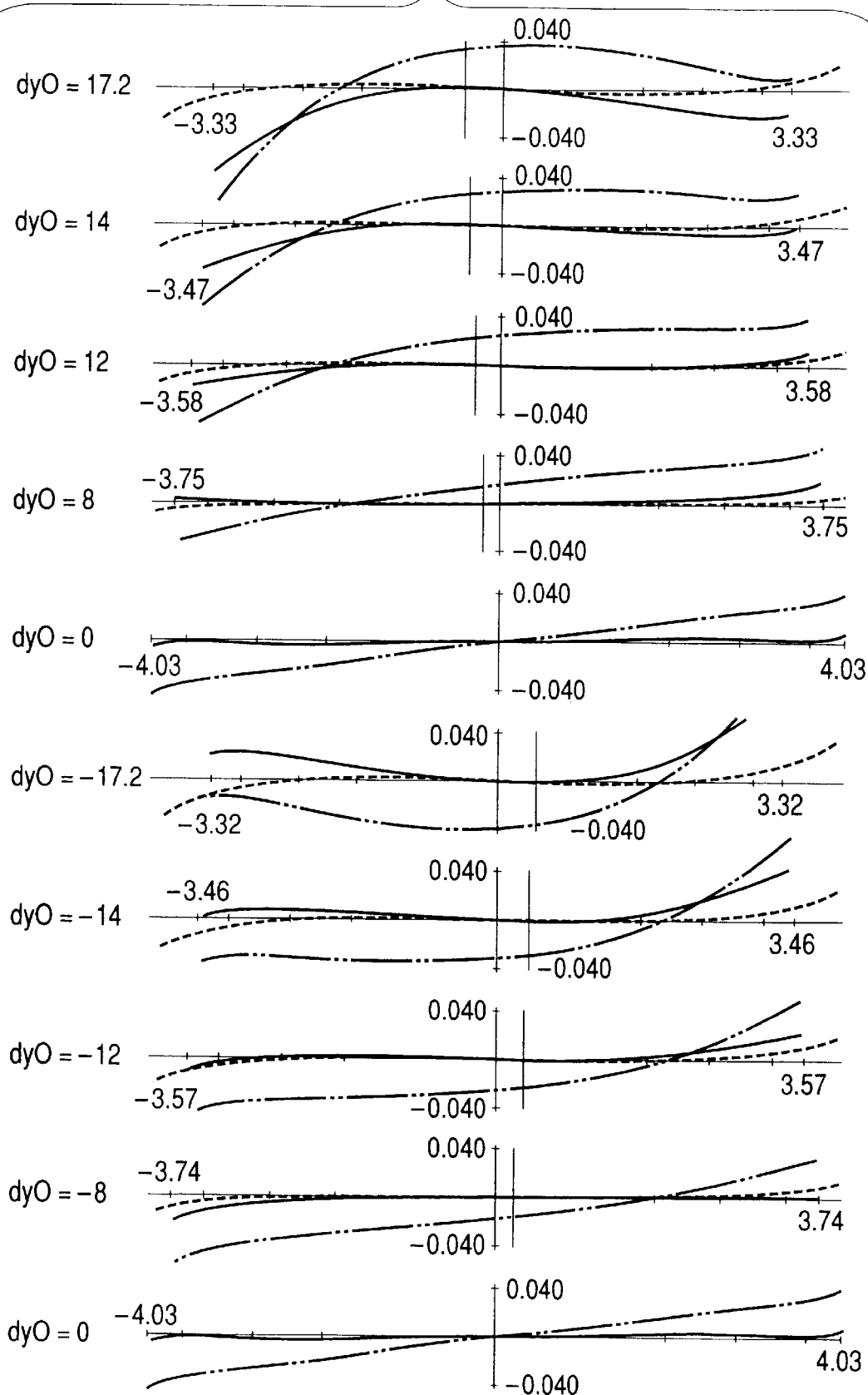

FIGS. 2, 3, and 4 are the aberration diagrams at the wide-angle extreme, at the middle focal length, and at the telephoto extreme of the zoom lens in Numerical Example 1, FIGS. 6, 7, and 8 are the aberration diagrams at the wide-angle extreme, at the middle focal length, and at the telephoto extreme of the zoom lens in Numerical Example 2, FIGS. 10, 11, and 12 are the aberration diagrams at the wide-angle extreme, at the middle focal length, and at the telephoto extreme of the zoom lens in Numerical Example 3, and FIGS. 14, 15, and 16 are the aberration diagrams at the wide-angle extreme, at the middle focal length, and at the telephoto extreme of the zoom lens in Numerical Example 4.

In the figures L1 indicates a first unit of a positive refractive power (a first lens unit), L2 a second unit of a negative refractive power (a second lens unit), and zooming from the wide-angle extreme to the telephoto extreme is effected by moving the two lens units toward the object as indicated by arrows while decreasing the spacing between the two lens units.

SP designates an aperture stop to determine brightness, which is placed on the image plane side of the first unit in the present invention and which is designed to move together with the first unit during the zooming operation. IP represents the image plane.

The first lens unit has three lens units which are a 1a lens unit (first lens subunit) L1a of a negative, weak, refractive power, a 1b lens unit (second lens subunit) L1b of a negative refractive power, and a 1c lens unit (third lens subunit) L1c of a positive refractive power arranged in the order named from the object side, and is constructed adopting the partial vibration prevention method by part of the first lens unit to correct the image blur during vibration of the zoom lens by moving the 1b lens unit L1b in the direction normal to the optical axis to displace the image.

Satisfying Conditions (1), (2) below, the zoom lens is provided with the compact vibration-preventing function in the simple lens structure with excellent aberration correction both in the normal condition and in the vibration-preventing condition while realizing the high zoom ratio of ×3.

$$-8.0 < f1b/ft < -0.5 \quad (1)$$

$$-9.0 < f1a/ft < -0.3 \quad (2)$$

In these conditions, ft: focal length of the entire system at the telephoto extreme, f1b: focal length of the 1b lens unit, and f1a: focal length of the 1a lens unit.

Condition (1) concerns the focal lengths of the entire system at the telephoto extreme and the 1b lens unit and Condition (2) the focal length of the 1a lens unit. These conditions are those for maintaining good imaging performance in the normal condition while mainly suppressing the occurrence of the vibration prevention aberration component, by specifying the power layout (the characteristic matrices) of the 1a lens unit and the 1b lens unit, particularly, at the telephoto extreme where the vibration prevention aberration component tends to appear large.

Above the upper limit or below the lower limit of Condition (1) and Condition (2), it becomes difficult to effect good aberration correction by use of the simultaneous relations of occurrence of the vibration prevention aberration component including vibration prevention coma, vibration prevention astigmatism, etc. at each of focal lengths including the telephoto extreme with the aberration including spherical aberration, coma, etc. in the normal condition even if the power layout (characteristic matrix) of the subsequent lens unit is modified.

Particularly, if the refractive power of the first lens unit becomes stronger over the upper limit of Condition (2), it will result in increasing the powers of the 1b lens unit and the second lens unit. Although the driving amount of the 1b unit will be decreased thereby during prevention of vibration, values of the eigencoefficients as solutions to simultaneous equations at that time will not be satisfied in the simple lens structure for each of the 1a lens unit, the 1b lens unit, and the second lens unit, which will increase the size of the lens system unpreferably.

More preferably, the numerical ranges of Condition (1) and Condition (2) are set as follows, whereby better performance can be achieved in the vibration-preventing condition and in the normal condition.

$$-3.5 < f1b/ft < -1.0 \quad (1a)$$

$$-4.0 < f1a/ft < -1.0 \quad (2a)$$

In the zoom lenses of the present embodiment, it is desirable in terms of aberration correction that focusing be implemented by feeding only the first unit out toward the object or by feeding both the first unit and the second unit out with increasing the spacing between them.

In the present embodiment either of such zoom lenses is used in the photographing apparatus and the image blur is corrected for by moving the 1b lens unit in the direction normal to the optical axis during vibration of the photographing apparatus.

Satisfying the above conditions, the zoom lenses with the vibration-preventing function according to one aspect of the present invention are realized so as to accomplish the initial purpose, but the zoom lenses are designed preferably to satisfy at least one of the following conditions in order to attain better optical performance.

(a-1) The 1b lens unit has at least one positive lens and at least one negative lens.

(a-2) The 1a lens unit has at least one positive lens and at least one negative lens.

(a-3) The 1b lens unit consists of two lenses, a positive lens and a negative lens.

(a-4) The 1a lens unit consists of two lenses, a positive lens and a negative lens.

(a-5) The 1b lens unit has a negative lens and a positive lens, and the following conditions are satisfied where nN and vN are a refractive index and an Abbe's number, respectively, of a material of the negative lens and nP and vP a refractive index and an Abbe's number, respectively, of a material of the positive lens.

$$vP < vN \quad (3)$$

$$nN < nP \quad (4)$$

This structure can mainly suppress the occurrence of chromatic aberration during the prevention of vibration and, at the same time as it, also satisfies the eigencoefficient in the first-degree domain, which is required as a share in the normal condition for the whole first lens unit, thus realizing good imaging performance.

(a-6) The following conditions are satisfied where fw is the focal length of the entire system at the wide-angle extreme and T1b a shift amount (maximum displacement amount) from the normal condition when the 1b lens unit is shifted by an amount equivalent to a maximum correction angle of the vibration-preventing function.

$$0.005 < T1b/fw < 0.05 \quad (5)$$

$$0.001 < T1b/ft < 0.01 \quad (6)$$

Conditions (5), (6) are conditions for properly setting the shift amounts at the maximum vibration prevention angles at the wide-angle extreme and at the telephoto extreme and assuring the good vibration-preventing performance. Above the upper limit or below the lower limit, it is difficult to gain good vibration prevention aberration.

More preferably, Conditions (5), (6) are set to satisfy the conditions below.

$$0.007 < T1b/fw < 0.03 \quad (5a)$$

$$0.003 < T1b/ft < 0.01 \quad (6a)$$

(a-7) The 1a lens unit has a negative refractive power and the 1b lens unit has a negative refractive power.

(a-8) The 1a lens unit consists of a positive lens with a convex surface on the object side and a negative lens, both lens surfaces of which are concave surfaces, the 1b lens unit consisting of a positive meniscus lens with a convex surface on the image plane side and a negative lens with a concave surface on the object side, and the 1c lens unit consisting of a negative meniscus lens with a convex surface on the object side, a doublet of a positive lens and a negative lens, and a positive meniscus lens with a convex surface on the image plane side.

(a-9) The second unit consists of a positive meniscus lens with a convex surface on the image plane side and a negative meniscus lens with a convex surface on the image plane side.

Numerical examples of the present invention will be presented below. In each of the examples, Ri represents the radius of curvature of the ith surface when counted from the object side, Di represents the axial surface spacing in the normal condition of the ith surface when counted from the object side, and Ni and vi represent the refractive index and the Abbe's number, respectively, for the d-line of the ith member when counted from the object side. f represents the focal length, FNo represents the F-number, and 2ω denotes the angle of view.

The surface shape of the aspherical surfaces in each example is expressed by the following equation.

$$X = [(1/r)h^2]/[1+\{1-(1+k)(h/r)^2\}^{1/2}] + Bh^4 + Ch^6 + Dh^8 + Eh^{10}$$

In the above equation, X represents a displacement amount from the surface vertex in the optical-axis direction, h denotes the height from the optical axis in the direction normal to the optical axis, r denotes the radius of paraxial curvature, k denotes the eccentricity, and B, C, D, and E denote the aspherical coefficient of the respective degrees. Further, "e−X" means "$10^{-x}$."

Table 1 presents the relation between each of the aforementioned conditions and numerical values in the numerical examples.

Numerical Example 1

| f = 24.70 to 70.30 | Fno = 4.60 to 10.10 | 2ω = 70.0 to 27.6 | |
|---|---|---|---|
| R1 = 41.569 | D1 = 1.52 | N1 = 1.487490 | v1 = 70.2 |
| R2 = 246.595 | D2 = 0.68 | | |
| R3 = −44.018 | D3 = 1.00 | N2 = 1.806098 | v2 = 41.0 |
| R4 = 452.832 | D4 = 0.80 | | |
| R5 = −75.623 | D5 = 1.52 | N3 = 1.834000 | v3 = 37.2 |
| R6 = −26.921 | D6 = 0.20 | | |
| R7 = −29.974 | D7 = 1.00 | N4 = 1.696797 | v4 = 55.5 |
| R8 = 331.371 | D8 = 0.55 | | |
| R9 = 100.078 | D9 = 1.00 | N5 = 1.727270 | v5 = 40.6 |
| *R10 = 92.291 | D10 = 0.54 | | |
| R11 = −51.776 | D11 = 3.40 | N6 = 1.487490 | v6 = 70.2 |
| R12 = −7.244 | D12 = 1.30 | N7 = 1.799516 | v7 = 42.2 |
| R13 = −12.091 | D13 = 1.10 | | |
| R14 = −51.345 | D14 = 2.30 | N8 = 1.487490 | v8 = 70.2 |
| R15 = −9.306 | D15 = 0.50 | | |
| R16 = stop | D16 = 0.10 | | |
| R17 = ∞ | D17 = variable | | |
| R18 = −40.610 | D18 = 2.30 | N9 = 1.727820 | v9 = 40.6 |
| *R19 = −17.818 | D19 = 3.02 | | |
| R20 = −9.012 | D20 = 1.70 | N10 = 1.804000 | v10 = 46.6 |
| R21 = −76.462 | | | |

| variable distance/focal length | 24.70 | 50.15 | 70.30 |
|---|---|---|---|
| D17 | 11.40 | 3.70 | 1.56 | aspherical coefficients

| R10: | k = 0.00000e+00 | B = 2.68073e−04 | C = 2.97074e−06 |
|---|---|---|---|
| | D = 7.36453e−08 | E = 1.53459e−09 | |
| R19: | k = 3.58997e+00 | B = −9.88505e−06 | C = 6.56131e−07 |
| | D = −2.62197e−08 | E = 4.06418e−10 | | shift amount during image stabilization R5 to R8

| 0.2° | 0.67 mm |
|---|---|

Numerical Example 2

| f = 24.70 to 70.30 | Fno = 4.60 to 10.10 | 2ω = 70.0 to 27.6 | |
|---|---|---|---|
| R1 = 60.873 | D1 = 1.43 | N1 = 1.712995 | v1 = 53.8 |
| R2 = 386.538 | D2 = 0.53 | | |
| R3 = −59.048 | D3 = 1.00 | N2 = 1.806098 | v2 = 41.0 |
| R4 = 311.693 | D4 = 0.80 | | |
| R5 = −58.688 | D5 = 1.40 | N3 = 1.834000 | v3 = 37.2 |
| R6 = −31.218 | D6 = 0.20 | | |
| R7 = −28.619 | D7 = 1.00 | N4 = 1.696797 | v4 = 55.5 |
| R8 = −955.450 | D8 = 0.55 | | |
| R9 = 70.657 | D9 = 1.00 | N5 = 1.727270 | v5 = 40.6 |
| *R10 = 51.724 | D10 = 0.61 | | |
| R11 = −81.435 | D11 = 3.40 | N6 = 1.516330 | v6 = 64.2 |
| R12 = −6.896 | D12 = 1.42 | N7 = 1.799516 | v7 = 42.2 |
| R13 = −12.249 | D13 = 1.08 | | |
| R14 = −52.209 | D14 = 2.30 | N8 = 1.487490 | v8 = 70.2 |
| R15 = −9.337 | D15 = 0.50 | | |
| R16 = stop | D16 = 0.10 | | |
| R17 = ∞ | D17 = variable | | |
| R18 = −40.200 | D18 = 2.30 | N9 = 1.727820 | v9 = 40.6 |
| *R19 = −17.938 | D19 = 3.10 | | |
| R20 = −9.016 | D20 = 1.70 | N10 = 1.804000 | v10 = 46.6 |
| R21 = −76.462 | | | |

| variable distance/focal length | 24.70 | 50.11 | 70.30 |
|---|---|---|---|
| D17 | 11.40 | 3.81 | 1.69 |

-continued aspherical coefficients

R10: k = 0.00000e+00    B = 2.64900e−04    C = 2.89768e−06
     D = 6.54929e−08    E = 1.66938e−09
R19: k = 3.58997e+00    B = −1.00585e−05    C = 6.26019e−07
     D = −2.52009e−08   E = 3.81870e−10 shift amount during image stabilization R5 to R8

0.2°                    0.32 mm

Numerical Example 3 f = 24.70 to 70.30    Fno = 4.60 to 10.10    2ω = 70.0 to 27.6

| | | | |
|---|---|---|---|
| R1 = 64.099 | D1 = 1.44 | N1 = 1.712995 | ν1 = 53.8 |
| R2 = 254.729 | D2 = 0.52 | | |
| R3 = −70.406 | D3 = 1.00 | N2 = 1.620041 | ν2 = 36.3 |
| R4 = 112.401 | D4 = 1.00 | | |
| R5 = −64.274 | D5 = 1.45 | N3 = 1.834000 | ν3 = 37.2 |
| R6 = −30.941 | D6 = 0.20 | | |
| R7 = −24.524 | D7 = 1.00 | N4 = 1.563839 | ν4 = 60.7 |
| R8 = −2336.477 | D8 = 0.55 | | |
| R9 = 59.925 | D9 = 1.00 | N5 = 1.727270 | ν5 = 40.6 |
| *R10 = 48.076 | D10 = 0.65 | | |
| R11 = −65.165 | D11 = 3.40 | N6 = 1.516330 | ν6 = 64.2 |
| R12 = −6.852 | D12 = 1.54 | N7 = 1.799516 | ν7 = 42.2 |
| R13 = −12.587 | D13 = 0.89 | | |
| R14 = −55.092 | D14 = 2.30 | N8 = 1.487490 | ν8 = 70.2 |
| R15 = −9.335 | D15 = 0.50 | | |
| R16 = stop | D16 = 0.10 | | |
| R17 = ∞ | D17 = variable | | |
| R18 = −39.969 | D18 = 2.30 | N9 = 1.727820 | ν9 = 40.6 |
| *R19 = −18.079 | D19 = 3.12 | | |
| R20 = −9.090 | D20 = 1.70 | N10 = 1.804000 | ν10 = 46.6 |
| R21 = −76.462 | | | |

| variable distance/focal length | 24.70 | 50.14 | 70.30 |
|---|---|---|---|
| D17 | 11.40 | 3.74 | 1.61 | aspherical coefficients

R10: k = 0.00000e+00    B = 2.57546e−04    C = 2.82428e−06
     D = 6.28954e−08    E = 1.99016e−09
R19: k = 3.58997e+00    B = −1.15099e−05    C = 8.06532e−07
     D = −2.98750e−08   E = 4.08289e−10 shift amount during image stabilization R5 to R8

0.20                    0.40 mm

Numerical Example 4 f = 24.70 to 70.30    Fno = 4.60 to 10.10    2ω = 70.0 to 27.6

| | | | |
|---|---|---|---|
| R1 = 68.674 | D1 = 1.54 | N1 = 1.712995 | ν1 = 53.8 |
| R2 = 9626.637 | D2 = 0.61 | | |
| R3 = −48.948 | D3 = 1.00 | N2 = 1.620041 | ν2 = 36.3 |
| R4 = 143.540 | D4 = 1.00 | | |
| R5 = −62.552 | D5 = 1.48 | N3 = 1.834000 | ν3 = 37.2 |
| R6 = −28.809 | D6 = 0.20 | | |
| R7 = −27.238 | D7 = 1.00 | N4 = 1.563839 | ν4 = 60.7 |
| R8 = 475.128 | D8 = 0.55 | | |
| R9 = 70.013 | D9 = 1.00 | N5 = 1.727270 | ν5 = 40.6 |
| *R10 = 53.097 | D10 = 0.64 | | |
| R11 = −58.004 | D11 = 3.40 | N6 = 1.516330 | ν6 = 64.2 |
| R12 = −6.932 | D12 = 1.58 | N7 = 1.799516 | ν7 = 42.2 |
| R13 = −12.693 | D13 = 0.94 | | |
| R14 = −54.560 | D14 = 2.30 | N8 = 1.487490 | ν8 = 70.2 |
| R15 = −9.370 | D15 = 0.50 | | |
| R16 = stop | D16 = 0.10 | | |
| R17 = ∞ | D17 = variable | | |
| R18 = −40.603 | D18 = 2.30 | N9 = 1.727820 | ν9 = 40.6 |
| *R19 = −18.218 | D19 = 3.12 | | |
| R20 = −9.084 | D20 = 1.70 | N10 = 1.804000 | ν10 = 46.6 |
| R21 = −76.462 | | | |

| variable distance/focal length | 24.70 | 50.16 | 70.30 |
|---|---|---|---|
| D17 | 11.40 | 3.73 | 1.60 | aspherical coefficients

R10: k = 0.00000e+00    B = 2.57337e−04    C = 2.81184e−06
     D = 6.30588e−08    E = 2.10084e−09
R19: k = 3.58997e+00    B = −1.41948e−05    C = 8.21064e−07
     D = −3.15838e−08   E = 4.06650e−10 shift amount during image stabilization R5 to R8

0.2°                    0.57 mm

TABLE 1

| | Condition 1 | Condition 2 | Condition 3 | | Condition 4 | | Condition 5 | Condition 6 |
|---|---|---|---|---|---|---|---|---|
| Example | flb/ft | fla/ft | νn | νp | Nn | Np | Tlb/fw | Tlb/ft |
| 1 | −2.71 | −1.43 | 55.5 | 37.2 | 1.697 | 1.834 | 0.0271 | 0.0095 |
| 2 | −1.292 | −2.327 | 55.5 | 37.2 | 1.697 | 1.834 | 0.013 | 0.0046 |
| 3 | −1.643 | −2.462 | 60.7 | 37.2 | 1.564 | 1.834 | 0.0162 | 0.0057 |
| 4 | −2.321 | −2.216 | 60.7 | 37.2 | 1.564 | 1.834 | 0.0231 | 0.0081 |

As described above, the present embodiment can provide zoom lenses with a compact vibration-preventing function in a simple lens structure with excellent aberration correction both in the normal condition and in the vibration-preventing condition while realizing the high zoom ratio of ×3.

Another embodiment of the zoom lens with the vibration-preventing function according to the present invention will be described hereinafter.

FIG. 17, FIG. 21, FIG. 25, and FIG. 29 are the lens sectional views of Numerical Examples 5 to 8 of the present invention. In each of the lens sectional views, (A) shows the zoom position at the wide-angle extreme, (B) shows the zoom position at the middle focal length, and (C) shows the zoom position at the telephoto extreme. Further, FIGS. 18A and 18B, 19A and 19B, and 20A and 20B are aberration diagrams at the wide angle extreme, at the middle focal length, and at the telephoto extreme of the zoom lens in Numerical Example 5, FIGS. 22A and 22B, 23A and 23B, and 24A and 24B are the aberration diagrams at the wide-angle extreme, at the middle focal length, and at the telephoto extreme of the zoom lens in Numerical Example 6, FIGS. 26A and 26B, 27A and 27B, and 28A and 28B are the aberration diagrams at the wide-angle extreme, at the middle focal length, and at the telephoto extreme of the zoom lens in Numerical Example 7, and FIGS. 30A and 30B, 31A and 31B, and 32A and 32B are the aberration diagrams at the wide-angle extreme, at the middle focal length, and at the telephoto extreme of the zoom lens in Numerical Example 8.

In the figures, L1 designates a first unit of a positive refractive power, L2 a second unit of a negative refractive power, and zooming from the wide-angle extreme to the telephoto extreme is implemented by moving the two lens units toward the object as indicated by arrows while decreasing the spacing between the two lens units. SP denotes an aperture stop to determine brightness, which is placed in the first unit in the present embodiment and which is designed to move together with the first unit. IP indicates the image plane.

The first lens unit has a 1a lens unit (first lens subunit) L1a of a negative, weak, refractive power, a 1b lens unit (second lens subunit) L1b of a positive refractive power, and a 1c lens unit (third lens subunit) L1c of a positive refractive power, which are arranged in the order named from the object side, and the image blur (image vibration) occurring with vibration (or inclination) of the zoom lens is corrected by moving the 1b lens unit L1b in the direction normal to the optical axis to displace the image.

Focusing is implemented by moving the first unit, the second unit, or the entire system.

The zoom lenses of the present embodiment have accomplished the initial purpose in the above basic structure by satisfying at least one of the following items.

(b-1) The 1a lens unit includes more lenses than the 1c lens unit.
(b-2) A lens adjacent on the object side to the 1b lens unit is a positive lens.
(b-3) The 1a lens unit has a plurality of positive lenses.
(b-4) The 1c lens unit consists of one positive lens.

In Numerical Examples 5 to 8, the 1a lens unit L1a has a positive meniscus lens with a convex surface on the object side, a negative lens, both lens surfaces of which are concave surfaces, and a positive lens, both lens surfaces of which are convex surfaces.

The 1b lens unit L1b consists of a doublet of a positive lens, both lens surfaces of which are convex surfaces and a negative meniscus lens with a convex surface on the image plane side, or a doublet of a negative meniscus lens with a convex surface on the object side and a positive meniscus lens with a convex surface on the object side. In this case, the negative lens is preferably made of a material with higher refractive index and higher dispersion than those of the positive lens. The 1c lens unit consists of a single positive lens having a lens surface of stronger curvature on the image plane side than those of the lens surface on the object side.

The second unit L2 consists of a positive meniscus lens with a convex surface on the image plane side and a negative meniscus lens with a convex surface on the image plane side. The positive lens in the second unit is made of a plastic material having an aspherical surface.

The zoom lenses as the object of the present invention can be accomplished in the above structure, but the zoom lenses are preferably designed so as to satisfy at least one of the following conditions in order to attain higher optical performance throughout the entire zoom range.

(c-1) to satisfy the following condition:

$$0.5 < f1b/ft < 1.5 \tag{7}$$

where ft is the focal length of the entire system at the telephoto extreme and f1b the focal length of the 1b lens unit.

Condition (7) concerns the focal lengths of the entire system at the telephoto extreme and the 1b lens unit and is a condition for specifying the power layout (characteristic matrix) of the 1b lens unit, particularly, at the telephoto extreme where the vibration prevention aberration component tends to appear large and for maintaining good imaging performance in the normal condition while mainly suppressing occurrence of the vibration prevention aberration component.

Above the upper limit or below the lower limit of Condition (7), it becomes difficult to effect good aberration correction by use of the simultaneous relations of the aberration including spherical aberration, coma, etc. in the normal condition with the occurrence of the vibration prevention aberration component including vibration prevention coma, vibration prevention astigmatism, etc. at each of focal lengths including the telephoto extreme even if the power layout (characteristic matrix) of the subsequent lens unit is modified.

Particularly, if the refractive power of the 1b lens unit becomes stronger below the lower limit of Condition (7), it will result in increasing the powers of the first lens unit and the second lens unit. This can decrease the driving amount of the 1b lens unit during prevention of vibration, but values of the eigencoefficients as solutions to the simultaneous equations at that time are not satisfied in the simple lens structure for each of the 1a lens unit, the 1b lens unit, and the second lens unit, which will increase the size of the lens system unpreferably.

If the refractive power of the 1b lens unit becomes weaker above the upper limit of Condition (7), the driving amount of the 1b lens unit during prevention of vibration will increase, which will result in increasing the lens barrel in the radial direction unpreferably.

More preferably, the numerical range of Condition (7) is set as follows, whereby better optical performance can be demonstrated in the vibration-preventing condition and in the normal condition.

$$0.8 < f1b/ft < 1.2 \tag{7a}$$

(c-2) to satisfy the following condition:

$$2 < TD1a/TD1c < 5 \tag{8}$$

where TD1a is a distance from the front to the rear end of the 1a lens unit (the distance from the surface closest to the object to the surface closest to the image) and TD1c the distance from the front to the rear end of the 1c lens unit.

Condition (8) is a condition for realizing good aberration correction both in the normal condition and in the vibration-preventing condition for the structure of the 1a lens unit and the 1c lens unit placed before and after the 1b lens unit and for achieving it by the minimum number of components, and specifies the ratio of the axial thicknesses of the 1a lens unit and the 1c lens unit.

If the axial thickness of the 1a lens unit becomes too large above the upper limit of Condition (8), the total size of the first unit will become large and the diameter of the front lens will also increase unpreferably.

If the axial thickness of the 1a lens unit becomes too small below the lower limit of Condition (8), it will be difficult to construct the 1a lens unit in the structure necessary for the partial system and thus good aberration correction will not be effected in either of the normal condition and the vibration-preventing condition.

More preferably, the numerical range of Condition (8) is set as follows, whereby better optical performance can be achieved in the vibration-preventing condition and in the normal condition.

$$2.5 < TD1a/TD1c < 4 \tag{8a}$$

(c-3) The 1b lens unit has a positive lens and a negative lens.

(c-4) The 1a lens unit has a plurality of positive lenses and a negative lens.

(c-5) A stop is disposed between the 1b lens unit and the 1c lens unit.

Numerical data of Numerical Examples 5 to 8 will be presented below. Table 2 presents the relation between each of the above conditions and numerical values of the numerical examples.

Numerical Example 5

| f = 30.86 to 87.50 | Fno = 4.60 to 10.10 | 2ω = 58.5 to 22.4 | |
|---|---|---|---|
| R1 = 15.049 | D1 = 1.53 | N1 = 1.712995 | ν1 = 53.8 |
| R2 = 51.417 | D2 = 0.75 | | |
| R3 = −17.189 | D3 = 1.50 | N2 = 1.806098 | ν2 = 41.0 |
| R4 = 18.285 | D4 = 0.41 | | |
| R5 = 60.465 | D5 = 1.99 | N3 = 1.701536 | ν3 = 41.2 |
| R6 = −16.269 | D6 = 0.20 | | |
| R7 = 59.375 | D7 = 2.14 | N4 = 1.487490 | ν4 = 70.2 |
| R8 = −17.450 | D8 = 0.90 | N5 = 1.882997 | ν5 = 40.8 |
| R9 = −33.825 | D9 = 1.08 | | |
| R10 = stop | D10 = 1.00 | | |
| R11 = −53.650 | D11 = 1.68 | N6 = 1.516330 | ν6 = 64.2 |
| R12 = −12.990 | D12 = variable | | |
| R13 = −98.172 | D13 = 2.71 | N7 = 1.583060 | ν7 = 30.2 |
| R14 = −43.218 | D14 = 4.32 | | |
| R15 = −8.880 | D15 = 1.20 | N8 = 1.712995 | ν8 = 53.8 |
| R16 = −36.615 | | | |

| variable distance/focal length | 30.86 | 62.18 | 87.50 |
|---|---|---|---|
| D12 | 10.20 | 2.90 | 0.82 |

| aspherical coefficients | | | |
|---|---|---|---| thirteenth surface: k = 0.00000e+00
B = 9.86757e−05   C = 7.76743e−07   D = 5.96621e−09   E = −4.81533e−12

Numerical Example 6

| f = 30.90 to 87.50 | Fno = 4.60 to 10.10 | 2ω = 58.5 to 22.4 | |
|---|---|---|---|
| R1 = 14.190 | D1 = 1.82 | N1 = 1.622992 | ν1 = 58.1 |
| R2 = 42.058 | D2 = 0.72 | | |
| R3 = −19.094 | D3 = 1.50 | N2 = 1.806098 | ν2 = 41.0 |
| R4 = 17.846 | D4 = 0.40 | | |
| R5 = 55.703 | D5 = 2.63 | N3 = 1.723420 | ν3 = 38.0 |
| R6 = −19.459 | D6 = 0.20 | | |
| R7 = 62.723 | D7 = 2.15 | N4 = 1.487490 | ν4 = 70.2 |
| R8 = −17.568 | D8 = 0.90 | N5 = 1.882997 | ν5 = 40.8 |
| R9 = −33.482 | D9 = 1.10 | | |
| R10 = stop | D10 = 1.00 | | |
| R11 = −1134.012 | D11 = 2.20 | N6 = 1.487490 | ν6 = 70.2 |
| R12 = −14.203 | D12 = variable | | |
| *R13 = −83.449 | D13 = 2.75 | N7 = 1.583060 | ν7 = 30.2 |
| R14 = −40.201 | D14 = 4.54 | | |
| R15 = −9.213 | D15 = 1.20 | N8 = 1.712995 | ν8 = 53.8 |
| R16 = −42.546 | | | |

| variable distance/focal length | 30.90 | 62.25 | 87.50 |
|---|---|---|---|
| D12 | 10.73 | 3.39 | 1.30 |

| aspherical coefficients | | | |
|---|---|---|---| thirteenth surface: k = 0.00000e+00
B = 9.04150e−05   C = 2.71523e−07   D = 1.43514e−08   E = −9.05109e−11

Numerical Example 7

| f = 30.85 to 87.51 | Fno = 4.60 to 10.10 | 2ω = 58.6 to 22.4 | |
|---|---|---|---|
| R1 = 12.624 | D1 = 1.59 | N1 = 1.517417 | ν1 = 52.4 |
| R2 = 76.282 | D2 = 0.65 | | |
| R3 = −18.918 | D3 = 1.50 | N2 = 1.772499 | ν2 = 49.6 |
| R4 = 17.721 | D4 = 0.56 | | |
| R5 = 510.668 | D5 = 2.63 | N3 = 1.568832 | ν3 = 56.3 |
| R6 = −17.073 | D6 = 0.20 | | |
| R7 = 82.404 | D7 = 2.10 | N4 = 1.516330 | ν4 = 64.2 |
| R8 = −15.085 | D8 = 0.90 | N5 = 1.834000 | ν5 = 37.2 |
| R9 = −31.508 | D9 = 1.02 | | |
| R10 = stop | D10 = 1.00 | | |
| R11 = 59.883 | D11 = 2.20 | N6 = 1.487490 | ν6 = 70.2 |
| R12 = −15.155 | D12 = variable | | |
| *R13 = −152.914 | D13 = 2.36 | N7 = 1.583060 | ν7 = 30.2 |
| R14 = −45.472 | D14 = 4.68 | | |
| R15 = −9.138 | D15 = 1.20 | N8 = 1.712995 | ν8 = 53.8 |
| R16 = −58.471 | | | |

| variable distance/focal length | 30.85 | 62.03 | 87.51 |
|---|---|---|---|
| D12 | 10.73 | 4.00 | 2.07 |

| aspherical coefficients | | | |
|---|---|---|---| thirteenth surface: k = 0.00000e+00
B = 9.10933e−05   C = 3.20380e−07   D = 7.55474e−09   E = −9.34064e−12

Numerical Example 8

| f = 28.70 to 81.50 | Fno = 4.60 to 10.10 | 2ω = 62.2 to 24.0 | |
|---|---|---|---|
| R1 = 15.307 | D1 = 1.57 | N1 = 1.658441 | ν1 = 50.9 |
| R2 = 50.054 | D2 = 0.75 | | |
| R3 = −16.405 | D3 = 1.50 | N2 = 1.772499 | ν2 = 49.6 |
| R4 = 16.091 | D4 = 0.44 | | |

-continued

| | | | |
|---|---|---|---|
| R5 = 58.082 | D5 = 2.63 | N3 = 1.518229 | ν3 = 59.0 |
| R6 = −14.069 | D6 = 0.20 | | |
| R7 = 25.215 | D7 = 1.00 | N4 = 1.834000 | ν4 = 37.2 |
| R8 = 14.519 | D8 = 2.02 | N5 = 1.563839 | ν5 = 60.7 |
| R9 = 279.914 | D9 = 1.08 | | |
| R10 = stop | D10 = 1.00 | | |
| R11 = 133.088 | D11 = 2.20 | N6 = 1.487490 | ν6 = 70.2 |
| R12 = −12.536 | D12 = variable | | |
| *R13 = −92.884 | D13 = 2.34 | N7 = 1.583060 | ν7 = 30.2 |
| R14 = −50.550 | D14 = 5.14 | | |
| R15 = −9.876 | D15 = 1.20 | N8 = 1.696797 | ν8 = 55.5 |
| R16 = −52.645 | | | |

| variable distance/focal length | 28.70 | 58.09 | 81.50 |
|---|---|---|---|
| D12 | 10.73 | 3.12 | 0.99 | aspherical coefficients thirteenth surface: k = 0.00000e+00
B = 6.86249e−05  C = 7.80002e−07  D = −3.17809e−09  E = 2.64442e−11

TABLE 2

| Numerical Example | Condition 7 flb/ft | Condition 8 Tdla/TDlc | flb | ft | TDla | TDlc |
|---|---|---|---|---|---|---|
| 5 | 0.97 | 3.68 | 84.84 | 87.5 | 6.18 | 1.68 |
| 6 | 0.97 | 3.22 | 84.95 | 87.5 | 7.08 | 2.20 |
| 7 | 0.97 | 3.15 | 84.61 | 87.5 | 6.94 | 2.20 |
| 8 | 0.95 | 3.13 | 77.73 | 81.5 | 6.89 | 2.20 |

As described above, the present embodiment can realize a zoom lenses with a vibration-preventing function of the zoom ratio of about three and with a compact structure for the entire optical system while controlling the decentering amount at a low level and effecting good correction for decentering aberration in the normal condition and in the decentered state of the lens unit (in the vibration-preventing condition), by properly constructing the lens structure of the lens unit for prevention of vibration on the occasion of correcting the image blur during vibration (inclination) of the zoom lens by moving the lens unit of relatively small weight forming part of the zoom lens in the direction normal to the optical axis.

In addition, the zoom lenses are provided with a compact vibration-preventing function using a small total number of components in the simple lens structure while realizing a zoom ratio of about three and excellent aberration correction both in the normal condition and in the vibration-preventing condition.

An embodiment of the photographing apparatus provided with the zoom lens in either of Numerical Examples 1 to 8 will be described below referring to FIGS. 34A and 34B.

Figure 34A:
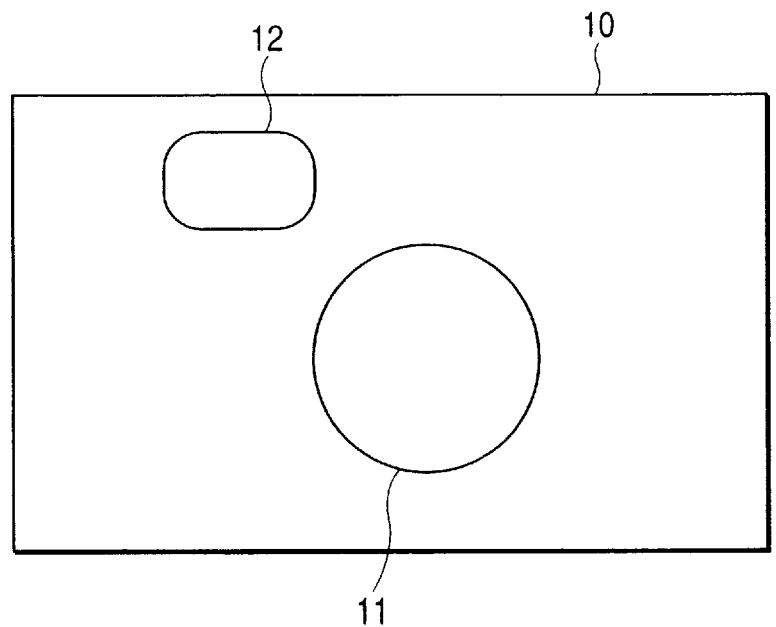
FIGS. 34A and 34B are schematic diagrams of the main part of a photographing apparatus having the zoom lens in either of Numerical Examples 1 to 8.
Figure 34B:
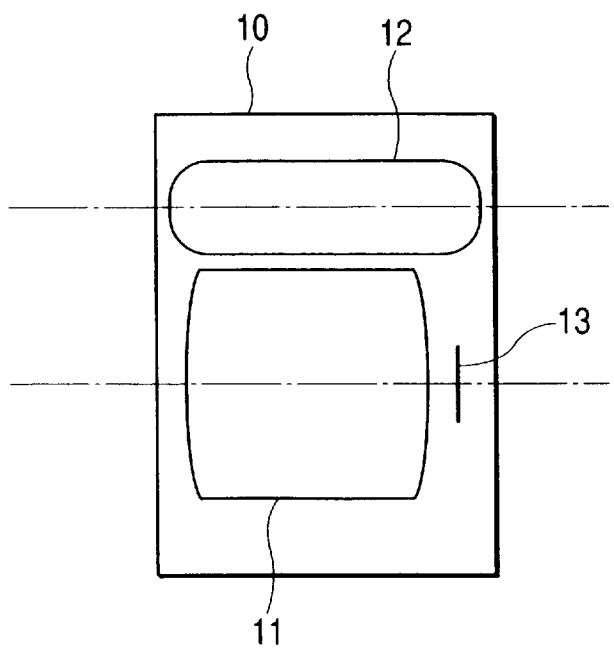

FIG. 34A is a front view of the photographing apparatus and FIG. 34B a cross-sectional side view thereof. In the figures, numeral 10 designates the main body (housing) of the photographing apparatus, 11 a photographing optical system using the zoom lens in either of Numerical Examples 1 to 8, 12 a finder optical system, and 13 a film as a photosensitive screen.

The compact photographing apparatus with high performance can be realized by applying the zoom lens in either of Numerical Examples 1 to 8 to the photographing optical system of the photographing apparatus as described above.

What is claimed is:

1. A zoom lens comprising the following lens units in the order named from the object side:

a first lens unit of a positive optical power, said first lens unit having a first lens subunit, a second lens subunit, and a third lens subunit of a positive optical power arranged in the order named from the object side, said second lens subunit being moved so as to have a component normal to an optical axis, thereby displacing an image; and a second lens unit of a negative optical power;

upon zooming, both said first lens unit and said second lens unit are moved so that a spacing between said first lens unit and said second lens unit changes, and wherein said first lens subunit has more lens elements than said third lens subunit, and wherein the lens units of the zoom lens comprise only the first lens unit and the second lens unit.

2. A zoom lens comprising the following lens units in the order named from the object side:

a first lens unit of a positive optical power, said first lens unit having a first lens subunit, a second lens subunit of a positive optical power, and a third lens subunit of a positive optical power arranged in the order named from the object side, said second lens subunit being moved so as to have a component normal to an optical axis, thereby displacing an image; and a second lens unit of a negative optical power;

upon zooming, both said first lens unit and said second lens unit are moved so that a spacing between said first lens unit and said second lens unit changes, and wherein said first lens subunit comprises a lens element adjacent on the object side to said second lens subunit, wherein said lens element has a positive optical power, and wherein the lens units of the zoom lens comprise only the first lens unit and the second lens unit.

3. A zoom lens comprising the following lens units in the order named from the object side:

a first lens unit of a positive optical power, said first lens unit having a first lens subunit, a second lens subunit of a positive optical power, and a third lens subunit of a positive optical power arranged in the order named from the object side, said second lens subunit being moved so as to have a component normal to the optical axis, thereby displacing an image; and a second lens unit of a negative optical power;

upon zooming, both said first lens unit and said second lens unit are moved so that a spacing between said first lens unit and said second lens unit changes, and wherein said first lens subunit has a plurality of lens elements of respective positive optical powers, and wherein the lens units of the zoom lens comprise only the first lens unit and the second lens unit.

4. A zoom lens comprising the following lens units in the order named from the object side:

a first lens unit of a positive optical power, said first lens unit having a first lens subunit, a second lens subunit of a positive optical power, and a third lens subunit of a positive optical power arranged in the order named from the object side, said second lens subunit being moved so as to have a component normal to an optical axis, thereby displacing an image; and a second hens unit of a negative optical power;

upon zooming, both said first lens unit and said second lens unit are moved so that a spacing between said first lens unit and said second lens unit changes, and wherein said third lens subunit consists of one lens element of a positive optical power, and wherein the lens units of the zoom lens comprise only the first lens unit and the second lens unit.

5. A zoom lens comprising the following lens units in the order named from the object side:

a first lens unit of a positive optical power, said first lens unit having a first lens subunit, a second lens subunit of a positive optical power, and a third lens subunit of a positive optical power arranged in the order named from the object side, said second lens subunit being moved so as to have a component normal to an optical axis, thereby displacing an image; and a second lens unit of a negative optical power;

said zoom lens varying a spacing between said first lens unit and said second lens unit in order to implement zooming, wherein the lens units of the zoom lens comprise only the first lens unit and the second lens unit, and wherein the following conditions are satisfied:

$$0.5 < flb/ft < 1.5$$

$$2 < TD1a/TD1c < 5$$

where ft is a focal length of the entire system at the telephoto extreme, flb is a focal length of said second lens subunit, TD1a is a distance from a surface closest to an object to a surface closest to the image in said first lens subunit, and TD1c is a distance from a surface closest to the object to a surface closest to the image in said third lens subunit.

6. The zoom lens according to claim 1, wherein the following condition is satisfied:

$$0.5 < flb/ft < 1.5$$

where ft is a focal length of the entire system at the telephoto extreme and flb is a focal length of said second lens subunit.

7. The zoom lens according to claim 1, wherein the following condition is satisfied:

$$2 < TD1a/TD1c < 5$$

where TD1a is a distance from a surface closest to an object to a surface closest to the image in said first lens subunit and TD1c is a distance from a surface closest to the object to a surface closest to the image in said third lens subunit.

8. The zoom lens according to claim 1, wherein said second lens subunit has a lens element of a positive optical power and a lens element of a negative optical power.

9. The zoom lens according to claim 1, wherein said first lens subunit has a plurality of lens elements of respective positive optical powers and a lens element of a negative optical power.

10. The zoom lens according to claim 1, further comprising:

a stop placed between said second lens subunit and said third lens subunit.

11. The zoom lens according to claim 2, wherein the following condition is satisfied:

$$0.5 < flb/ft < 1.5$$

where ft is a focal length of the entire system at the telephoto extreme and flb is a focal length of said second lens subunit.

12. The zoom lens according to claim 2, wherein the following condition is satisfied:

$$2 < TD1a/TD1c < 5$$

where TD1a is a distance from a surface closest to the object to a surface closest to the image in said first lens subunit and TD1c is a distance from a surface closest to the object to a surface closest to the image in said third lens subunit.

13. The zoom lens according to claims 2, wherein said second lens subunit has a lens element of a positive optical power and a lens element of a negative optical power.

14. The zoom lens according to claim 2, wherein said first lens subunit has a plurality of lens elements of respective positive optical powers and a lens element of a negative optical power.

15. The zoom lens according to claim 2, further comprising:

a stop placed between said second lens subunit and said third lens subunit.

16. The zoom lens according to claim 3, wherein the following condition is satisfied:

$$0.5 < flb/ft < 1.5$$

where ft is a focal length of the entire system at the telephoto extreme and flb is a focal length of said second lens subunit.

17. The zoom lens according to claim 3, wherein the following condition is satisfied:

$$2 < TD1a/TD1c < 5$$

where TD1a is a distance from a surface closest to the object to a surface closest to the image in said first lens subunit and TD1c is a distance from a surface closest to the object to a surface closest to the image in said third lens subunit.

18. The zoom lens according to claim 3, wherein said second lens subunit has a lens element of a positive optical power and a lens element of a negative optical power.

19. The zoom lens according to claim 3, wherein said first lens subunit has a plurality of lens elements of respective positive optical powers and a lens element of a negative optical power.

20. The zoom lens according to claim 3, further comprising:

a stop placed between said second lens subunit and said third lens subunit.

21. The zoom lens according to claim 4, wherein the following condition is satisfied:

$$0.5 < flb/ft < 1.5$$

where ft is a focal length of the entire system at the telephoto extreme and flb is a focal length of said second lens subunit.

22. The zoom lens according to claim 4, wherein the following condition is satisfied:

$$2 < TD1a/TD1c < 5$$

where TD1a is a distance from a surface closest to the object to a surface closest to the image in said first lens subunit and TD1c is a distance from a surface closest to the object to a surface closest to the image in said third lens subunit.

23. The zoom lens according to claim 4, wherein said second lens subunit has a lens element of a positive optical power and a lens element of a negative optical power.

24. The zoom lens according to claim 4, wherein said first lens subunit has a plurality of lens elements of respective positive optical powers and a lens element of a negative optical power.

25. The zoom lens according to claim 4, further comprising:

a stop placed between said second lens subunit and said third lens subunit.

26. A photographing apparatus comprising:

the zoom lens as set forth in any one of claims 1 to 5.

* * * * *

UNITED STATES PATENT AND TRADEMARK OFFICE
CERTIFICATE OF CORRECTION

PATENT NO.   : 6,493,142 B1
DATED        : December 10, 2002
INVENTOR(S)  : Yoshinori Itoh It is certified that error appears in the above-identified patent and that said Letters Patent is hereby corrected as shown below:

Column 7,
Line 48, "the that" should read -- that --.
Line 49, "be always" should read -- always be --.
Line 67, "$S_{oin}$" should read -- $S_{Oin}$ --.

Column 8,
Lines 30 and 40, "$S_{oin}$" should read -- $S_{Oin}$ --.
Line 46, "intrinsic" should read -- eigen- --.
Line 49, "vibration preventing" should read -- vibration-preventing --.

Column 19,
Line 32, "a zoom" should read -- zoom --.

Column 20,
Line 64, "hens" should read -- lens --.

Column 22,
Line 7, "claims" should read -- claim --.

Signed and Sealed this

Fifth Day of August, 2003

JAMES E. ROGAN
*Director of the United States Patent and Trademark Office*